United States Patent
Zahnert et al.

(10) Patent No.: US 10,225,428 B2
(45) Date of Patent: *Mar. 5, 2019

(54) IMAGE PROCESSING FOR HANDHELD SCANNER

(71) Applicant: ML Netherlands C.V., Amsterdam (NL)

(72) Inventors: Martin Georg Zahnert, Zurich (CH); Erik Fonseka, Mountain View, CA (US); Alexander Ilic, Zurich (CH); Simon Meier, Zug (CH); Andreas Breitenmoser, Knonau (CH)

(73) Assignee: ML Netherlands C.V., Amsterdam (NL)

( * ) Notice: Subject to any disclaimer, the term of this patent is extended or adjusted under 35 U.S.C. 154(b) by 20 days.

This patent is subject to a terminal disclaimer.

(21) Appl. No.: 15/048,875

(22) Filed: Feb. 19, 2016

(65) Prior Publication Data

US 2016/0173716 A1    Jun. 16, 2016

Related U.S. Application Data

(63) Continuation of application No. 12/781,391, filed on May 17, 2010, now Pat. No. 9,300,834.

(30) Foreign Application Priority Data

May 20, 2009  (EP) ..................................... 09160848
May 20, 2009  (EP) ..................................... 09160849

(Continued)

(51) Int. Cl.
*G06K 9/36*   (2006.01)
*H04N 1/107*  (2006.01)
(Continued)

(52) U.S. Cl.
CPC ............. *H04N 1/107* (2013.01); *G06F 3/033* (2013.01); *G06K 9/228* (2013.01); *G06K 9/6201* (2013.01);
(Continued)

(58) Field of Classification Search
None
See application file for complete search history.

(56) References Cited

U.S. PATENT DOCUMENTS 4,767,923 A    8/1988  Yuasa
4,797,544 A    1/1989  Montgomery et al.
(Continued)

FOREIGN PATENT DOCUMENTS

DE    19858935 A1    6/2000
EP    0277964 A1    8/1988
(Continued)

OTHER PUBLICATIONS

Extended European Search Report and Written Opinion dated Aug. 31, 2010 from corresponding European Application No. 10163475.6.

(Continued)

*Primary Examiner* — Tize Ma
(74) *Attorney, Agent, or Firm* — Wolf, Greenfield & Sacks, P.C.

(57) ABSTRACT

A computer peripheral that may operate as a scanner. The scanner captures image frames as it is moved across an object. The image frames are formed into a composite image based on computations in two processes. In a first process, fast track processing determines a coarse position of each of the image frames based on a relative position between each successive image frame and a respective preceding image determine by matching overlapping portions of the image frames. In a second process, fine position adjustments are (Continued)

computed to reduce inconsistencies from determining positions of image frames based on relative positions to multiple prior image frames. The peripheral may also act as a mouse and may be configured with one or more navigation sensors that can be used to reduce processing time required to match a successive image frame to a preceding image frame.

18 Claims, 22 Drawing Sheets

(30) Foreign Application Priority Data

| May 20, 2009 | (EP) | ................................ | 09160850 |
| May 20, 2009 | (EP) | ................................ | 09160851 |
| May 20, 2009 | (EP) | ................................ | 09160852 |
| May 20, 2009 | (EP) | ................................ | 09160853 |
| May 20, 2009 | (EP) | ................................ | 09160854 |
| May 20, 2009 | (EP) | ................................ | 09160855 |

(51) Int. Cl.

| H04N 1/387 | (2006.01) |
| G06T 7/00 | (2017.01) |
| H04N 1/195 | (2006.01) |
| G06F 3/033 | (2013.01) |
| G06K 9/22 | (2006.01) |
| G06K 9/62 | (2006.01) |
| G06T 7/30 | (2017.01) |

(52) U.S. Cl.
CPC ............ *G06T 7/30* (2017.01); *H04N 1/19505* (2013.01); *H04N 1/3876* (2013.01); *H04N 2201/0414* (2013.01)

(56) References Cited

U.S. PATENT DOCUMENTS

| 4,804,949 | A | 2/1989 | Faulkerson |
| 4,906,843 | A | 3/1990 | Jones et al. |
| 5,355,146 | A | 10/1994 | Chiu et al. |
| 5,574,804 | A | 11/1996 | Olschafskie et al. |
| 5,578,813 | A | 11/1996 | Allen et al. |
| 5,611,033 | A | 3/1997 | Pitteloud et al. |
| 5,685,002 | A | 11/1997 | Sano |
| 5,909,209 | A | 6/1999 | Dickinson |
| 5,917,935 | A | 6/1999 | Hawthorne et al. |
| 5,994,710 | A | 11/1999 | Knee et al. |
| 6,005,681 | A | 12/1999 | Pollard |
| 6,078,701 | A * | 6/2000 | Hsu .......................... G06K 9/32 |
| | | | 375/E7.086 |
| 6,233,363 | B1 | 5/2001 | Iida |
| 6,249,360 | B1 | 6/2001 | Pollard et al. |
| 6,304,248 | B1 | 10/2001 | Shiobara et al. |
| 6,304,284 | B1 | 10/2001 | Dunton et al. |
| 6,344,846 | B1 | 2/2002 | Hines |
| 6,348,981 | B1 | 2/2002 | Walsh |
| 6,392,632 | B1 | 5/2002 | Lee |
| 6,429,422 | B1 | 8/2002 | Bohn |
| 6,459,819 | B1 | 10/2002 | Nakao |
| 6,513,717 | B2 | 2/2003 | Hannigan |
| 6,525,306 | B1 | 2/2003 | Bohn |
| 6,648,483 | B1 | 11/2003 | Kuo |
| 6,657,667 | B1 | 12/2003 | Anderson |
| 6,710,768 | B2 | 3/2004 | Muranami |
| 6,783,069 | B1 | 8/2004 | Hecht et al. |
| 6,901,166 | B1 | 5/2005 | Nakayama |
| 6,965,460 | B1 | 11/2005 | Gann et al. |
| 7,038,664 | B2 | 5/2006 | Danzyger et al. |
| 7,075,572 | B2 | 7/2006 | Kinjo |
| 7,119,816 | B2 | 10/2006 | Zhang et al. |
| 7,123,292 | B1 | 10/2006 | Seeger et al. |
| 7,133,068 | B2 | 11/2006 | Fisher et al. |
| 7,221,810 | B2 | 5/2007 | Andreasson et al. |
| 7,317,448 | B1 | 1/2008 | Sasselli et al. |
| 7,424,218 | B2 | 9/2008 | Baudisch et al. |
| 7,439,954 | B2 | 10/2008 | Theytaz et al. |
| 7,474,767 | B2 | 1/2009 | Sen et al. |
| 7,518,767 | B2 | 4/2009 | Chen et al. |
| 7,796,304 | B2 | 9/2010 | Silverbrook |
| 7,855,812 | B2 | 12/2010 | Gelsomini et al. |
| 7,884,970 | B2 | 2/2011 | Hiroyasu et al. |
| 7,957,009 | B2 | 6/2011 | Silverbrook |
| 7,961,364 | B2 | 6/2011 | Lapstun et al. |
| 8,106,886 | B2 | 1/2012 | Chang |
| 8,120,820 | B2 | 2/2012 | Lapstun et al. |
| 8,179,563 | B2 | 5/2012 | King et al. |
| 8,189,965 | B2 | 5/2012 | Edgar et al. |
| 8,218,020 | B2 | 7/2012 | Tenchio et al. |
| 8,331,723 | B2 | 12/2012 | Ozluturk |
| 8,339,467 | B2 | 12/2012 | Zahnert et al. |
| 8,380,005 | B1 | 2/2013 | Jonsson et al. |
| 8,384,947 | B2 | 2/2013 | Edgar et al. |
| 8,416,468 | B2 | 4/2013 | Underwood et al. |
| 8,433,143 | B1 | 4/2013 | Carson et al. |
| 8,441,695 | B2 | 5/2013 | Zahnert et al. |
| 8,441,696 | B2 | 5/2013 | Zahnert et al. |
| 8,477,394 | B2 | 7/2013 | Jonsson et al. |
| 8,570,588 | B2 | 10/2013 | Edgar et al. |
| 8,582,182 | B2 | 11/2013 | Zahnert et al. |
| 8,693,047 | B2 | 4/2014 | Edgar et al. |
| 8,723,885 | B2 | 5/2014 | Zahnert et al. |
| 8,786,897 | B2 | 7/2014 | Edgar et al. |
| 8,904,479 | B1 * | 12/2014 | Johansson ............... G06F 21/36 |
| | | | 382/181 |
| 9,270,857 | B2 | 2/2016 | Edgar et al. |
| 9,300,834 | B2 | 3/2016 | Zahnert et al. |
| 9,465,129 | B1 | 10/2016 | Olsson et al. |
| 9,723,203 | B1 | 8/2017 | Ettinger |
| 9,912,847 | B1 | 3/2018 | Yuan et al. |
| 2002/0001418 | A1 | 1/2002 | Fahraeus et al. |
| 2002/0030748 | A1 | 3/2002 | Kitaguchi et al. |
| 2002/0181762 | A1 | 12/2002 | Silber |
| 2002/0190953 | A1 | 12/2002 | Gordon et al. |
| 2004/0028295 | A1 | 2/2004 | Allen et al. |
| 2004/0141157 | A1 | 7/2004 | Ramachandran et al. |
| 2004/0189674 | A1 | 9/2004 | Zhang et al. |
| 2004/0208369 | A1 | 10/2004 | Nakayama |
| 2004/0218055 | A1 | 11/2004 | Yost et al. |
| 2004/0239771 | A1 | 12/2004 | Habe |
| 2004/0264806 | A1 | 12/2004 | Herley |
| 2005/0057510 | A1 | 3/2005 | Baines et al. |
| 2005/0129291 | A1 | 6/2005 | Boshra |
| 2005/0231482 | A1 | 10/2005 | Theytaz et al. |
| 2005/0248532 | A1 | 11/2005 | Moon et al. |
| 2005/0270483 | A1 | 12/2005 | Fujimatsu et al. |
| 2006/0062427 | A1 | 3/2006 | Burkhart et al. |
| 2006/0170781 | A1 | 8/2006 | Sobol |
| 2007/0025723 | A1 | 2/2007 | Baudisch et al. |
| 2007/0031062 | A1 | 2/2007 | Pal et al. |
| 2007/0031063 | A1 | 2/2007 | Zhou |
| 2007/0076944 | A1 | 4/2007 | Bryll et al. |
| 2008/0130077 | A1 | 6/2008 | Park et al. |
| 2008/0168070 | A1 | 7/2008 | Naphade et al. |
| 2008/0215286 | A1 | 9/2008 | Mealy et al. |
| 2008/0219654 | A1 | 9/2008 | Border et al. |
| 2009/0021576 | A1 | 1/2009 | Linder et al. |
| 2009/0032600 | A1 | 2/2009 | Lapstun et al. |
| 2009/0060283 | A1 | 3/2009 | Bledsoe et al. |
| 2009/0080035 | A1 | 3/2009 | Downs |
| 2010/0054627 | A1 * | 3/2010 | Rosenberg ............ G06T 3/4038 |
| | | | 382/284 |
| 2010/0123907 | A1 | 5/2010 | Edgar et al. |
| 2010/0124384 | A1 * | 5/2010 | Edgar ................. G06K 9/00483 |
| | | | 382/313 |
| 2010/0194919 | A1 | 8/2010 | Ishii et al. |
| 2010/0295868 | A1 | 11/2010 | Zahnert et al. |
| 2010/0296129 | A1 | 11/2010 | Zahnert et al. |
| 2010/0296131 | A1 | 11/2010 | Zahnert et al. |
| 2010/0296133 | A1 | 11/2010 | Zahnert et al. |
| 2010/0296137 | A1 | 11/2010 | Zahnert et al. |
| 2010/0296140 | A1 | 11/2010 | Zahnert et al. |

(56) References Cited

U.S. PATENT DOCUMENTS

| | | |
|---|---|---|
| 2011/0025842 A1 | 2/2011 | King et al. |
| 2011/0228044 A1 | 9/2011 | Miyamoto et al. |
| 2011/0234497 A1 | 9/2011 | Zahnert et al. |
| 2011/0314049 A1 | 12/2011 | Poirier et al. |
| 2012/0128340 A1 | 5/2012 | Lai |
| 2012/0133746 A1 | 5/2012 | Bigioi et al. |
| 2012/0249554 A1 | 10/2012 | Chen et al. |
| 2013/0120595 A1 | 5/2013 | Roach et al. |
| 2013/0300740 A1 | 11/2013 | Snyder et al. |
| 2014/0072201 A1 | 3/2014 | Tilt |
| 2014/0118483 A1 | 5/2014 | Rapoport et al. |
| 2014/0321771 A1 | 10/2014 | Reinisch et al. |
| 2015/0015735 A1 | 1/2015 | Rav-Acha et al. |
| 2015/0077768 A1 | 3/2015 | Edgar et al. |
| 2015/0103189 A1 | 4/2015 | Karpenko |
| 2015/0199384 A1 | 7/2015 | Boncyk et al. |
| 2015/0339530 A1 | 11/2015 | Neckels et al. |
| 2016/0035082 A1 | 2/2016 | King et al. |
| 2016/0227181 A1 | 8/2016 | Ilic et al. |
| 2016/0309085 A1 | 10/2016 | Ilic |
| 2016/0328827 A1 | 11/2016 | Ilic et al. |
| 2016/0330374 A1 | 11/2016 | Ilic et al. |
| 2017/0034429 A1 | 2/2017 | Huysegems et al. |
| 2017/0118399 A1 | 4/2017 | Kim et al. |
| 2017/0118409 A1 | 4/2017 | Im et al. |

FOREIGN PATENT DOCUMENTS

| | | |
|---|---|---|
| EP | 1126404 A1 | 8/2001 |
| EP | 1164538 A2 | 12/2001 |
| EP | 2189926 A1 | 5/2010 |
| EP | 2339534 A1 | 6/2011 |
| EP | 16172980.1 | 1/2018 |
| GB | 2336195 A | 10/1999 |
| JP | 2000-175185 A | 6/2000 |
| JP | 2011-130282 A | 6/2011 |
| WO | WO 03/091868 A1 | 11/2003 |
| WO | WO 2006/085827 A1 | 8/2006 |
| WO | WO 2007/029903 A1 | 3/2007 |
| WO | WO 2015/028587 A2 | 3/2015 |
| WO | WO 2015/082572 A2 | 6/2015 |

OTHER PUBLICATIONS

European Search Report dated Nov. 29, 2010 from corresponding European Application No. 10163475.6.
Extended European Search Report dated Sep. 7, 2016 from corresponding European Application No. 16172971.0.
International Search Report and Written Opinion dated Jun. 1, 2011, from International Application No. PCT/EP2011/053775.
International Preliminary Report on Patentability dated Apr. 19, 2012, from International Application No. PCT/EP2011/053775.
International Search Report and Written Opinion for Application No. PCT/EP2014/068337 dated Mar. 17, 2015.
International Seach Report and Written Opinion for Application No. PCT/EP2014/076469 dated Jun. 30, 2015.
International Search Report and Written Opinion for Application No. PCT/EP2015/050038 dated Mar. 19, 2015.
International Search Report and Written Opinion for Application No. PCT./EP2015/050036 dated Apr. 7, 2015.
International Search Report and Written Opinion for International Application No. PCT/EP2015/060320 dated Aug. 4, 2015.
International Preliminary Report on Patentability for International Application No. PCT/EP2015/060320 dated Nov. 24, 2016.
[No Author Listed], DIY Mouse Scanner. ttp://www.diylive.net/index.php/2007/07/20/diy-mouse-scanner/> [retrieved on Feb. 8, 2010.] 1 page.
[No Author Listed], Learn how to use 123d Catch. 123d Catch. May 2, 2014; Retrieved from the internet: http://web.archive.org/web/20140502092851/http://www.123dapp.com/howto/catch [retrieved on Sep. 7, 2015]. 16 pages.
[No Author Listed], The basic rules for STL files. SDPRINTUK. May 3, 2014; Retrieved form the Internet: http://web.archive.org/web/20140503142737/http://www.3dprint-uk.co.uk/the-basic-rules-for-stl-files/ [retrieved on Sep. 7, 2015]. 1 page.
[No Author Listed], Turn ordinary photos into extraordinary 3D models with 123D catch. 123Catch. May 11, 2014; Retrieved from the Internet: http://web.archive.org/web/20140511055906/http://www.123dapp.com/catch [retrieved on Sep. 7, 2015]. 6 pages.
Brown, A Survey of Image Registration Techniques. ACM Computing Surveys. Dec. 1992; 24(4): 325-76.
Huang et al., Animated panorama from a panning video sequence. Image and Vision Computing New Zealand (IVCNZ), 2010 25th International Conference of, IEEE. Nov. 8, 2010. pages 1-8.
Kolev et al., Turning Mobile Phones into 3D Scanners. 2014 IEEE Conference on Computer Vision and Pattern Recognition, IEEE. Jun. 23, 2014; pp. 3946-3953.
Lin et al., Diffuse-Specular Separation and Depth Recovery from Image Sequences. Correct System Design. 2002;2352:16 pages.
Lopez et al., Graphics hardware accelerated panorama builder for mobile phones. Proc. of SPIE—IS&T Electronic Imaging. Jan. 19, 2009; 7256:72560D1-D9.
Lucas et al., An Iterative Image Registration Technique with an Application to Stereo Vision. Proceedings of Imaging Understanding Workshop. 1981; pp. 121-129.
Melantoni, 123D Design desktop 1.4: 3D file import and 3D printing enhancmeent. May 8, 2014; Retrieved from the Internet: http://blog123dapp.com/2014/05/123d-design-desktop-1-4-3d-file-import-and-3d-printing-enhancements. [retrieved on Aug. 7, 2015].
Nakao et al., An Image Input Unit Using Digital Mosaic Processing. NEC Research and Development. Apr. 1, 1999; 40 (2):259-66.
Tanskanen et al., Live Metric 3D Reconstruction on Mobile Phones. 2013 IEEE International Conference on Computer Vision. Dec. 1, 2013; pp. 65-72.
Yang et al., Inertial sensors image alignmnet and stitching for panorama on mobile phones. Proceedings of the 1st International Workshop on Mobile Location-Based Service, MLBS '11. New York, New York. Sep. 16, 2011. p. 21.
European Communication for European Application No. 16172980.1 dated Jan. 8, 2018.
[No Author Listed], capturing text for OCR in lowlight—ideal minimum MP + >?s. Cameras Forum—CNET. Https://www.cnet.com/forums/discussions/capturing-text-for-ocr-in-lowlight-ideal-minimum-mp-s-29389/ 2004. 5 pages.
Sammarco, 123D Catch—Tutorial. Digital Culture. 16 pages. Jan. 17, 2012.

\* cited by examiner

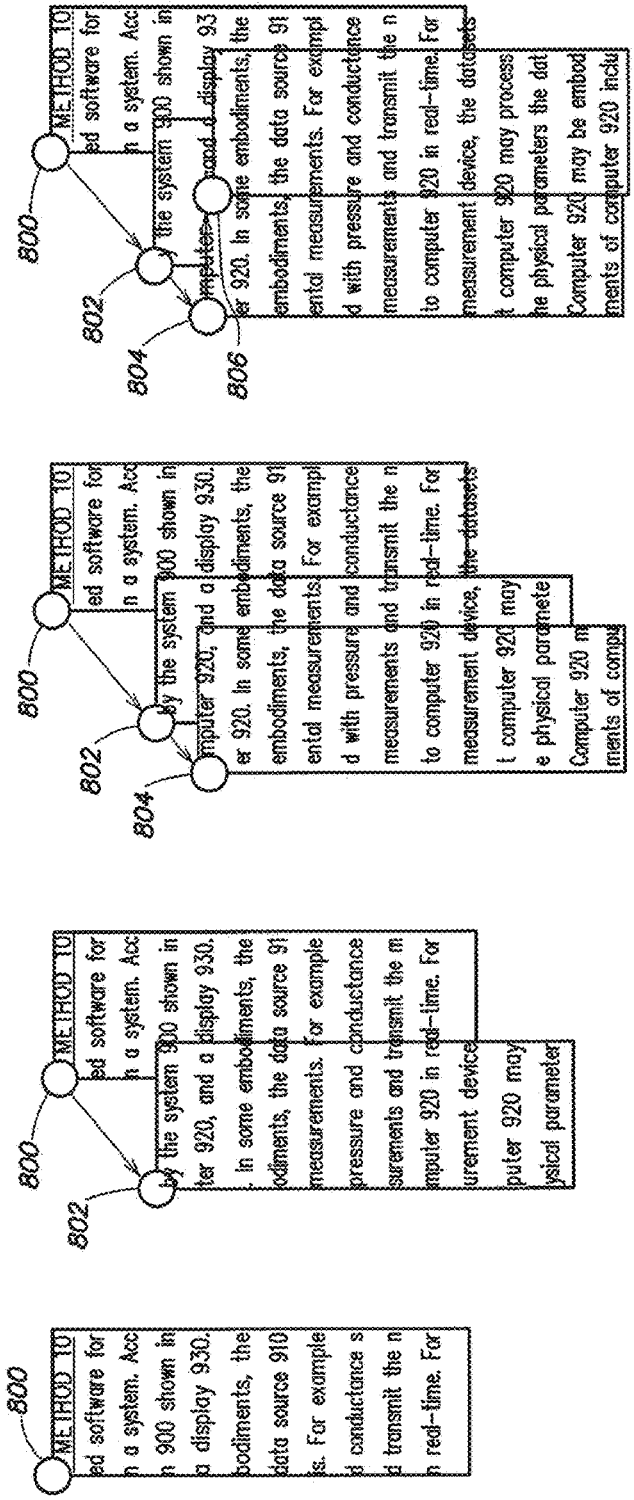
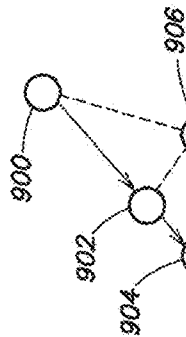
FIG. 8A
FIG. 8B
FIG. 8C
FIG. 8D
FIG. 9A
FIG. 9B
FIG. 9C
FIG. 9D

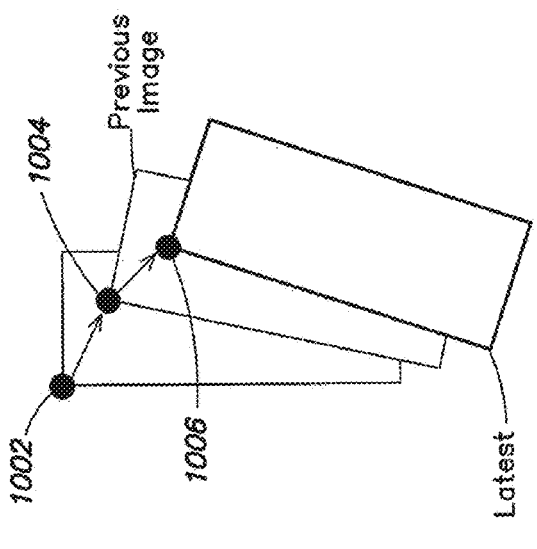
FIG. 10C
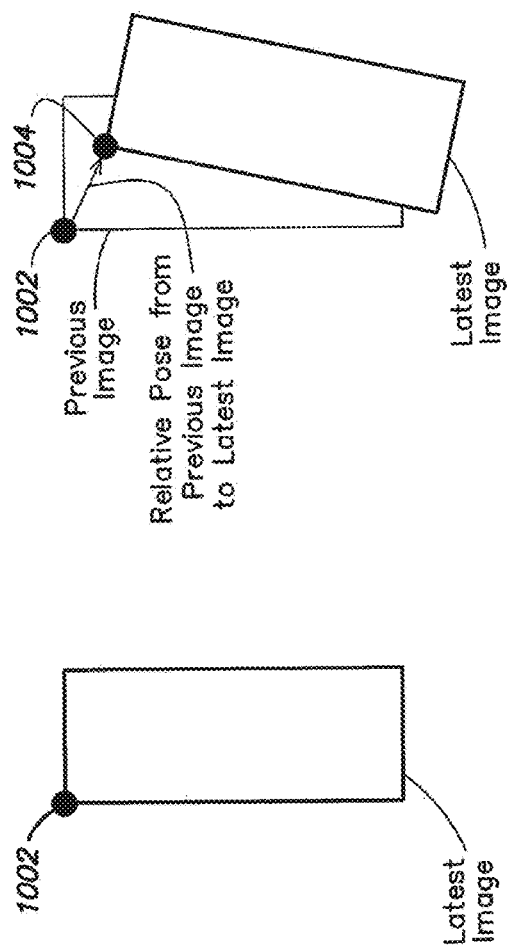
FIG. 10B
FIG. 10A
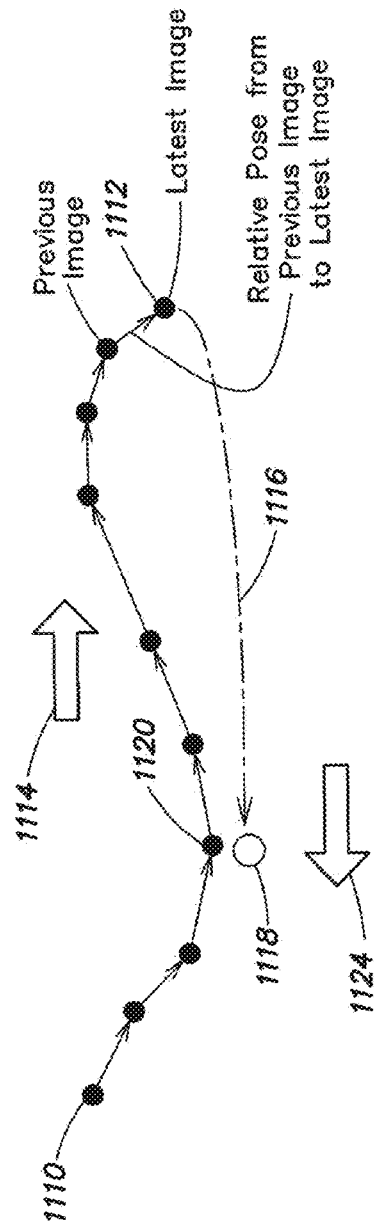
FIG. 11

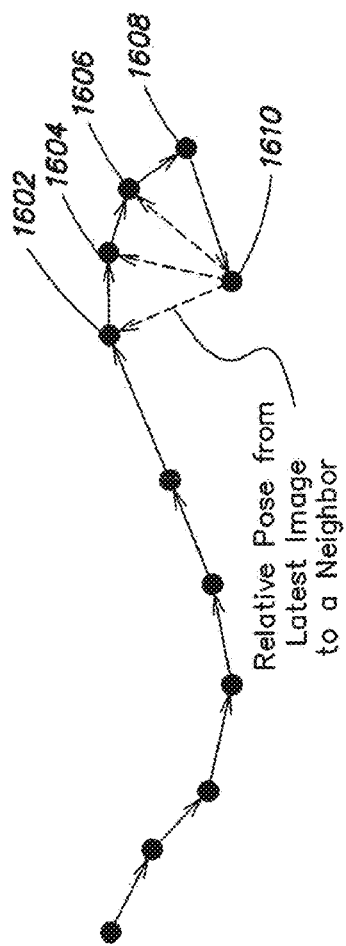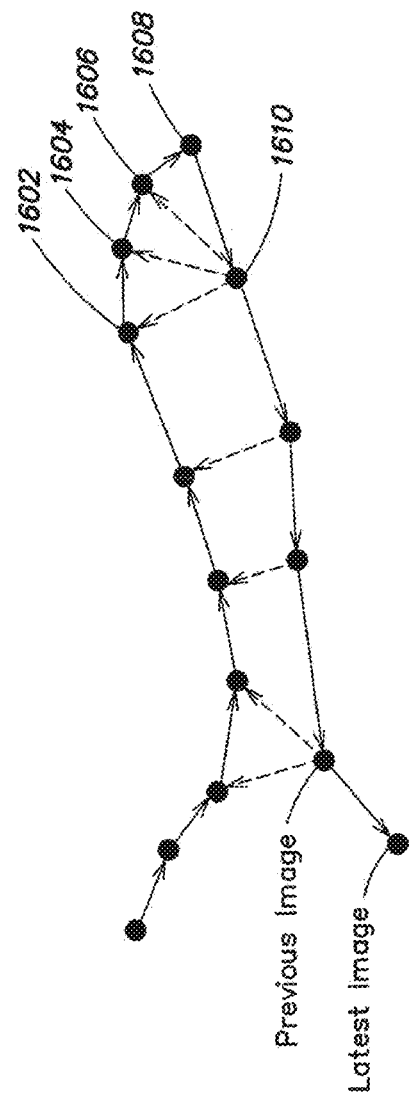

IMAGE PROCESSING FOR HANDHELD SCANNER

RELATED APPLICATIONS

The present application claims the benefit under 35 U.S.C. § 120 as a continuation application of U.S. application Ser. No. 12/781,391, entitled "IMAGE PROCESSING FOR HANDHELD SCANNER," filed on May 17, 2010, which claims the benefit under 35 U.S.C. § 119 of European application number 09160848.9, filed May 20, 2009, entitled "Verfahren und System zum Scannen von Bildern und Dokumenten" (METHOD AND SYSTEM OF SCANNING IMAGES AND DOCUMENTS), European application number 09160849.7, filed May 20, 2009, entitled "Verfahren und System zum Scannen von Bildern und Dokumenten" (METHOD AND SYSTEM OF SCANNING IMAGES AND DOCUMENTS), European application number 09160850.5, filed May 20, 2009, entitled "Verfahren und System zum Scannen von Bildern und Dokumenten" (METHOD AND SYSTEM OF SCANNING IMAGES AND DOCUMENTS), European application number 09160851.3, filed May 20, 2009, entitled "Verfahren und System zum Scannen von Bildern und Dokumenten" (METHOD AND SYSTEM OF SCANNING IMAGES AND DOCUMENTS), European application number 09160852.1, filed May 20, 2009, entitled "Verfahren und System zum Scannen von Bildern und Dokumenten" (METHOD AND SYSTEM OF SCANNING IMAGES AND DOCUMENTS), European application number 09160853.9, filed May 20, 2009, entitled "Verfahren und System zum Scannen von Bildern und Dokumenten" (METHOD AND SYSTEM OF SCANNING IMAGES AND DOCUMENTS), European application number 09160854.7, filed May 20, 2009, entitled "Verfahren und System zum Scannen von Bildern und Dokumenten" (METHOD AND SYSTEM OF SCANNING IMAGES AND DOCUMENTS), and European application number 09160855.4, filed May 20, 2009, entitled "Verfahren und System zum Scannen von Bildern und Dokumenten" (METHOD AND SYSTEM OF SCANNING IMAGES AND DOCUMENTS). The entire contents of the foregoing applications are incorporated herein by reference.

BACKGROUND

1. Field of Invention

This application relates generally to handheld computer-related devices that can be adapted to act as image scanners and more specifically to forming composite images from image frames generated by such handheld computer-related devices.

2. Related Art

Image scanners are frequently used in business and even home settings. A scanner can acquire, in digital form, an image of an object. Generally, the scanned object is flat, such as a document or a photograph. Once scanned, the image can be manipulated (e.g., rotated, cropped and color balanced), processed (e.g., copied to be pasted elsewhere) and further handled such as attached to an e-mail, sent over a telephone line as a fax or printed as a copy.

A scanner includes an image array, but the image array is generally smaller than the object to be scanned. The scanner can nonetheless acquire an image of the entire object because there is relative motion of the image array and the object during scanning. During this time of relative motion, the output of the image array represents different portions of the object at different times. As the scanner moves relative to the object, successive outputs of the image array are captured and then assembled into an image representing the entire item.

In some scanners, such as a flatbed scanner, the object to be scanned is held in a fixed position. The scanner is constructed such that the image array is mechanically constrained to move only along a predefined path relative to that fixed position. As a result, information about the relative position of the object and the image array can be used to position the successive outputs of the image array within an image such that the image accurately represents the object being scanned.

Other scanners are handheld such that mechanical constraints on the movement of the image array relative to the object to be scanned may be reduced. However, application of handheld scanners may still be limited by some constraints. For example, some handheld scanners may be constrained to move in only one or two directions when pressed against a surface containing an object to be scanned. As in a flatbed scanner, successive outputs of the image array are captured and assembled into an image. Though, without mechanical constraints imposed on relative motion of the image array and the object being scanned, accurately assembling successive outputs of the image array into an image is more complicated.

In some instances, handheld scanners are intended to only be effective on relatively small items, such as business cards, so that there are a relatively small number of outputs to be assembled into the image. In other instances, use of a handheld scanner is cumbersome, requiring a user to move the scanner in a predetermined pattern. For example, a user may be instructed to move the scanner across the object so that the output of the image array represents parallel strips of the object that can be relatively easily assembled into a composite image. In other cases, the output of handheld scanner is simply accepted as imperfect, appearing fuzzy or distorted as a result of the successive outputs of the image array being inaccurately assembled into an image.

Image processing techniques that can assemble successive outputs of a two-dimensional image array into a composite image are known in other contexts. These techniques are referred to generally as "image stitching." However, such image stitching techniques have not generally been applied in connection with handheld scanners. Image stitching techniques developed, for example, for processing cinematographic images or digital photographs may be too slow or require too much computing power to be practically applied to developing a composite image from a handheld scanner.

SUMMARY

In some aspects, the invention relates to improved techniques for assembling outputs of an image array of a scanner into a composite image. These techniques are well suited for application in connection with a computer peripheral that can operate as a hand-held scanner. They are also well suited for use with a computer peripheral that can, in some modes, operate as a conventional computer mouse and in, other modes, operate as the hand-held scanner. Accordingly, inventive aspects may be embodied as a method of operating a computing device that processes image data, such as may be acquired from such a computer peripheral. Inventive aspects may also be embodied as at least one non-transitory computer-readable storage medium comprising computer executable instructions.

One aspect of the invention is directed to a method of forming a composite image by combining a plurality of successive image frames. The method comprises, with at least one processor: for image frames of the plurality of successive image frames after a first image frame, determining a coarse position of the image frame based on a position of at least a preceding image frame; and for a subsequent image frame of the plurality of successive image frames: determining a difference between the determined coarse position of the subsequent image frame and a position determined by matching the subsequent image to at least one prior image frame other than an image frame preceding the subsequent image frame; and adjusting, based on the determined difference, the coarse position of image frames of the successive images frames between the prior image frame and the image frame preceding the subsequent image frame.

Another aspect of the invention is directed to at least one non-transitory, tangible computer readable storage medium having computer-executable instructions, that when executed by a processor, perform a method of forming a composite image by combining a plurality of image frames. The method comprises, for each image frame after a first image frame: determining a respective initial position of the image frame based on a position of at least a preceding image frame: and recording a position of the image frame in a data structure in computer memory, the recorded position being based on the respective initial position; and for each group of a plurality of groups, each group comprising a plurality of image frames recorded in the data structure: determining a metric of inconsistency of the positions recorded in the data structure, the metric of inconsistency reflecting a difference in position for one or more of the plurality of image frames in the group computed based on relative positions of a first portion of the plurality of image frames in the group and computed based on relative positions of a second portion of the plurality of image frames in the group; determining a respective updated position for each of at least a portion of the plurality of image frames in the group to reduce the metric of inconsistency; and updating the recorded position in the data structure for each of the at least the portion of the plurality of image frames based on the respective updated position for the image frame.

Yet another aspect of the invention is directed to at least one non-transitory, tangible computer readable medium having computer-executable instructions, that when executed by a processor, perform a method of forming a composite image by combining a plurality of image frames. The method comprises obtaining the plurality of image frames from a scanning device in conjunction with data indicating motion of the scanning device; iteratively processing successive image frames after a first image frame of the plurality of image frames to determine an initial position of each image frame based at least in part on the data indicating motion of the scanning device: concurrently with the iteratively processing: selecting a subset of the successive image frames and computing an adjusted position of each of the image frames in the subset.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A, 6B, 6C and 6D are schematic diagrams illustrating an exemplary process of scanning a document by acquiring a stream of images, in accordance with some embodiments of the invention;

FIGS. 8A, 8B, 8C and 8D are schematic diagrams illustrating an exemplary process of capturing a stream of image frames during scanning of an object, in accordance with one embodiment of the invention;

FIGS. 9A, 9B, 9C and 9D are conceptual illustrations of a process of building a network of image frames as the stream of image frame shown in FIGS. 8A, 8B, 8C and 8D is captured, in accordance with some embodiments;

FIGS. 10A, 10B and 10C are schematic diagrams illustrating another example of the process of capturing a stream of image frames during scanning of an object, in accordance with some embodiments of the invention;

FIG. 11 is a conceptual illustration of a process of building a network of image frames as the stream of image frame shown in FIGS. 10A, 10B and 10C is captured, in accordance with some embodiments of the invention;

FIGS. 16A and 16B are schematic diagrams illustrating building of a network of image frames as a user moves scanner mouse back and forth over an item, in accordance with some embodiments of the invention;

DETAILED DESCRIPTION

Figure 1:
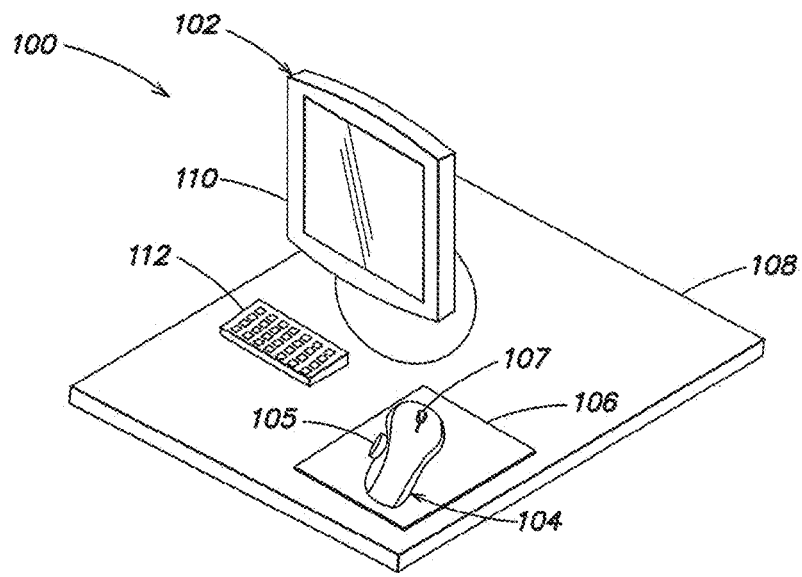
FIG. 1 is a sketch of an environment in which some embodiments of the invention may be implemented.

The inventors have recognized and appreciated that a handheld scanner can be easy to use and produce high quality images, even of relatively large objects, by applying an improved image stitching process. Known handheld scanners suffer from various shortcomings. Some scanners rely on constraining motion of the scanner into a predefined path as an object is scanned. However, such scanners have been found to be difficult to use or to produce poor quality images when the scanner is not moved along the predetermined path. Other scanners rely on navigation sensors on the handheld scanner to determine the position of successive image frames, even if the scanner is not moved along a predetermined path. However, navigation sensors have been found to be not accurate enough to provide good quality images. Yet other scanners have relied on image processing to position within a composite image portions (e.g., strips) of images captured by the handheld scanner. However, these techniques are either too slow or do not produce good quality images, particularly if the scanner traces over portions of the object that have been previously scanned.

According to some embodiments, a good quality composite image of scanned object can be quickly formed by determining relative position of successive image frames captured using a handheld scanning device. Relative positions, or poses, of the image frames in the composite image can be determined quickly enough that the composite image can be displayed to a human operator of the scanning device as the scanning device is being moved. As a result, the display can be "painted" as the user scans the object, revealing portions of the object that have already been scanned and portions that remain to be scanned. The display thus can provide important feedback to the user that may both facilitate faster scanning of an object and improve the user experience, particularly when motion of the scanning device over the object is not mechanically constrained.

In some embodiments, a stream of image frames taken while a scanning device is moving across an object are stitched together to form a composite image of the object. Image stitching involves multiple techniques to determine relative position of the image frames. These techniques may be applied sequentially. However, according to some embodiments, at least two of the frames positioning techniques are applied concurrently, with a first technique serving to provide coarse positioning of image frames in the stream as they are obtained. A second technique operates on the coarsely positioned image frames to adjust the position to achieve a finer alignment.

The coarsely positioned image frames may be displayed as the coarse position of each frame is determined. Each image frame may be presented on a display device in a position proportional to its determined position within the composite image. The coarse positioning can be performed fast enough that image frames can be displayed with a small delay relative to when the image frames are captured. The composite image on the display may appear to a user of the scanner as if the object being scanned is being painted on the display as the user moves the scanner over the object.

During the scanning process, as new image frames are being acquired and stitched into the composite image, a fine adjustment may be made to the determined relative positions of the image frames. Though fine adjustments may be made to improve the image quality as scanning progresses, the composite image based on the coarsely positioned images may be displayed for the user during scanning before the fine adjustments are made. The coarsely positioned image frames may act as an input for a more accurate image alignment technique that provides the fine adjustments.

Image frames may be stored in a way that facilitates fine adjustments and rendering a composite image based on the adjusted positions of the image frames without constraints on motion of the scanning device. Storage of the image frames, with information that defines an order for these image frames, also allows an accurate composite image to be presented, even if portions of the object are traced over by the scanning device during the scanning process. Accordingly, in some embodiments, when fine adjustments are made to a subset of the image frames, all or a portion of the composite image may be re-rendered, with the most recently acquired image frames overlying those previously acquired.

Image stitching techniques as described herein are not limited for use with small objects. They may be applied to scan objects with dimensions that are larger than a business card, such as more than 4 inches per side. In some embodiments, the techniques may be employed with objects, such as a piece of paper that is larger than 7 inches by 10 inches or even an object that is much larger, such as a poster hung on a wall. Further, there is no requirement that the user move the scanning device along a predefined path. A handheld scanning device according to some embodiments may still produce an accurate image, even if portions of the object being scanned are scanned over.

In some embodiments, the coarse positioning technique may be based on positioning each newly acquired image frame relative to one or more previously obtained image frames in a localized region of the composite image. In an exemplary embodiment described herein, coarse positioning may entail positioning each new image relative to an immediately preceding image frame. Though, it should be appreciated that coarse positioning may entail positioning each new image frame relative to more than one preceding image frame that is determined to depict at least a portion of the object being scanned that is represented in the new image frame.

In some embodiments, multiple coarse positioning techniques may be used together. For example, coarse positioning may be based on navigation information indicating motion of the scanning device and/or image matching techniques that are used to align succeeding image frames to preceding image frames. As a specific example, two such coarse positioning techniques are employed. In the first, navigation information indicating motion of the scanning device between the time the preceding image frame is captured and a time when a succeeding image frame is captured is used to determine an initial estimate of a position of the succeeding image frame relative to the preceding image frame. The navigation information may be generated by one or more navigation sensors on the scanning device. In the second, image matching may be used to register successive image frames to provide a relative pose between the image frames that is more accurate than can be achieved based on navigation information alone. A pose of an image may define its location in two or more dimensions relative to a frame of reference as well as its orientation with respect to a frame of reference, which may be defined by the initial position and orientation of the scanning device at the time a scan is initiated.

Though the initial estimate based on navigation information, in some embodiments, may provide an adequate course positioning of image frames, in other embodiments, a second coarse positioning technique may provide more accurate position information. In an exemplary embodiment described herein, coarse positioning based on image matching techniques is performed using the coarse positions generated based on navigation information as an input. The coarse positioning based on navigation information, for example, may be used to bound the computations aligning successive image frames based on matching overlapping portions of the image frames.

Regardless of whether or how the navigation information is used, the pose of the succeeding image frame yielding the highest degree of similarity in overlapping portions may be taken as defining the coarse position of the successive image frame. Such coarse positioning of successive image frames may generate a composite image that is accurate enough to provide useful information. Yet, because processing is performed only on "local" image frames that partially overlap a newly acquired image frame, each newly acquired image frame can be added to the composite image quickly enough to display the composite image to a user as a representation of progress of the scanning process.

One or more fine adjustment techniques also may be used. Fine adjustments may be made in parallel to the coarse positioning of successive image frames such that displayed image quality may improve as the scan progresses. Fine adjustments may be based on "global" positioning of image frames. Global positioning may involve determining a position of an image frame within the composite image based on positioning of image frames beyond the immediately preceding image frame. In some instances, global positioning may entail processing on all, or some subset, of the collected image frames as a group.

In some embodiments, the coarse positioning derived using local positioning techniques may be used as an initial estimate of positions in applying a global positioning technique. In some embodiments, the results of local positioning of the image frames may be stored in a data structure that can be taken as representing as a network of nodes, each node representing an image frame, connected by edges, each edge representing a relative displacement between the image frames corresponding to the nodes connected by the edge. The position of each image frame relative to some reference point can be derived based on combining relative positions of preceding image frames that trace out a path along the edges of the network from the reference point to the image frame. As successive image frames are obtained by a scanning motion that involves moving back and forth across an object in an unconstrained fashion, some image frames will overlap multiple preceding image frames, creating multiple paths through the network to an image frame. Because the relative displacement between each image frame is inaccurate, inconsistencies between the position of each image frame, when computed along different paths through the network, may result.

In the network as a whole, there may be multiple paths to each of multiple nodes, creating multiple sources of inconsistency in position information. A metric of inconsistency across the network may be computed. Information about the image frames, and their positions determined using a local positioning technique, may be stored such that a correction computed based on the identified inconsistency can be applied to the determined positions of the image frames. Such a corrected composite image may be used directly and/or as an input to a further fine adjustment technique.

Accordingly, inconsistencies in positioning of an image frame can be identified by processing successive image frames to coarsely position each new image frame using local comparison to previously positioned image frames. When a new image frame is found to overlap a neighboring image frame representing a previously positioned image frame, other than the preceding image frame, the position of the new image frame can be computed in at least two ways. In a first computation, the position of the new image frame can be computed relative to the preceding image frame. In a second computation, the position of the new image frame can be computed by matching the new image frame to the previously positioned neighbor image frame. A difference between these two computed positions can be taken as a measure of inconsistency for intermediate image frames that fall between the neighbor image frame and the preceding image frame in the succession of image frames.

Fine positioning of the image frames may entail adjusting previously determined positions of the image frames to reduce the inconsistency. For example, the intermediate image frames each can be repositioned such that the position of the new image frame when computed using the first computation, representing positioning relative to the preceding image frame, more nearly matches the position computed using the second computation, representing positioning relative to the neighbor image frames. In some embodiments, each intervening image frame may be repositioned in a way that reduces a metric of inconsistency over all of the intervening image frames.

In some embodiments, the image frames are represented in a data structure defining a network capturing relative positions of each image frame relative to other image frames to which it overlaps. Because of inaccuracies in the image matching process and other elements of the system, the network of relative positions will assign inconsistent positions to each of the image frames, depending on the path through the network. By adjusting the overall network to reduce the overall inconsistency, a more accurate composite image may be formed. In some embodiments, known techniques for minimizing inconsistency in a network may be employed.

The global positioning process that includes identifying and reducing inconsistency in the network may be repeated multiple times. The process may be repeated for different portions of the network or for different network configurations as more image frames are captured and more nodes and edges are added to the network. Further, the global positioning process and the coarse positioning process need not access the same data simultaneously, and the processes may proceed in parallel. Both processes may be performed while image frames are being captured through scanning, generating a composite image that can be displayed to a user during a scan operation, with resolution that improves over time.

In some embodiments, the composite image adjusted in this fashion may be taken as the final composite image. In other embodiments, further fine adjustments alternatively or additionally may be made to the determined position of image frames using image matching techniques applied to multiple image frames. Regardless, the composite image may then be further processed in any suitable way. The composite image, for example, may be displayed for a user or may be provided to one or more application programs that can manipulate, display or extract information represented in the composite image.

Techniques as described herein for forming a composite image from successive image frames may be used in conjunction with any suitable scanning device that can acquire such image frames. However, such techniques are well suited for use in conjunction with a scanner constructed as a peripheral attached to a personal computer. These techniques provide a desirable user experience despite constrains imposed by the environment, such as a need for low cost components, limited power and limited bandwidth and processing power.

As an example of a suitable scanning device, image capture components may be incorporated into a computer mouse, forming a scanner-mouse computer peripheral. Though, it should be appreciated that application of these techniques is not limited to use within a scanner mouse. The techniques may be used in any device suitably configured to capture successive image frames of an object. Examples of other suitable devices include a dedicated handheld scanner device and a cell phone or portable computer equipped with a camera.

When these techniques are applied in a scanner-mouse, the scanner-mouse can be coupled to a computer using known techniques for connecting computer peripherals to a computer. Image processing techniques may be implemented by programming a computer to which the scanner mouse is coupled. A scanned image may be rendered to a user of the scanner-mouse using a display for the computer. Though, it should be appreciated that it is not a requirement that a composite image formed using techniques as described herein be displayed to a user. In some embodiments, the composite image may be passed to software applications or other components within or coupled to the computer for processing.

Turning to FIG. 1, an example is provided of a system 100 employing techniques as described herein. System 100 comprises a computer 102, a scanning device is coupled to the computer and an object 106 to be scanned. FIG. 1 shows as an example of a scanning device scanner-mouse 104, which is here shown coupled to computer 102 as a computer peripheral.

Components of system 100 may be supported on any suitable surface 108. In this example, surface 108 is a flat horizontal surface, such as a desk or a table. Such a surface is suitable for scanning objects, such as pieces of paper containing text or photographs. Though, it is not a requirement that all of the components of the system be supported on the same surface or even that the surface be horizontal or flat. It is also not a requirement that the object be paper.

Object 106 may be of any suitable size, type and may comprise any suitable content. For example, the content of object 106 may be of any textual, image or graphical form or a combination thereof. In addition, the content of object 106 may be of any gradient. As regards a size of the scanned object, it may vary from, for example, a business or credit card or smaller to a document of dimensions that are equal to or exceed 4 inches per side. Moreover, in some embodiments, object 106 may comprise a piece of paper that is larger than 7 inches by 10 inches or a much larger object such as a poster.

Computing device 102 may be any suitable computing device, such as a personal computer. Scanner-mouse 104 may be coupled to computing device 102 via any suitable wired or wireless connection. For example, a Universal Serial Bus (USB) connector may be employed to couple computer mouse 104 to computing device 102. Processing of images collected by scanner-mouse 104 and visualization of results of the processing may be controlled via, for example, one or more processors of computing device 102, as discussed in more detail below.

In some embodiments of the invention, image stitching, comprising creating a composite image from a stream of image frames captured by the scanning device as an object is scanned, may be performed by any suitable components of computing device 102. Both coarse positioning of the image frames and a subsequent finer alignment of the image frames to generate a final composite image may be performed within computing device 102. Though, in some embodiments, information on the image frames comprising positional and rotational data and image data may be pre-processed in the scanning device in any suitable way. Further, in some embodiments, some or all of the steps of the image stitching process may be performed within the scanning device such as scanner-mouse 104. In yet further embodiments, generation of the composite image may be performed in a server or other computing device coupled to a computer 102 over a network or otherwise geographically remote from scanner-mouse 104. Accordingly, the processing of the image frames may be apportioned in any suitable way between the scanner-mouse computer peripheral and one or more computing devices.

System 100 comprises the scanning device which is, in this example, incorporated into a computer mouse and is therefore referred to as scanner-mouse 104. Object 106 placed on supporting surface 108 may be scanned by moving scanner-mouse 104 over object 106 in any suitable manner. In particular, in accordance with some embodiments of the invention, motion of scanner-mouse is not constrained within the plane defined by surface 108 and a person moving scanner-mouse 104 may move it freely back and forth over object 106 until the entire object is scanned.

FIG. 1 illustrates an example of a scanning device that provides functionalities of both a computer mouse and a scanner. Scanner-mouse 104 may be characterized by a size, look, and feel of a conventional computer mouse so that the device may be easily used by different users and in any setting. Though, embodiments of the invention are not limited to any particular size, dimensions, shape and other characteristics of the scanning device.

In this example, scanner-mouse 104 may comprise a button 105 that enables a user to switch between a scanner mode and a mouse mode. In the scanner mode, scanner-mouse 104 operates as a scanner, while in the mouse mode the scanning device functions as a pointing device commonly known as a computer mouse. Button 105 may be incorporated in a body of scanner-mouse 104 in any suitable manner. In this example, button 105 incorporated in the body of scanner-mouse 104 in a location that would be below a thumb of the user grasping the mouse. Because scanner-mouse 104 incorporates the functionality of a conventional computer mouse, the device may comprise any other input elements such as a wheel, one or more buttons, or keys, and others, collectively indicated in FIG. 1 as elements 107. Though, it should be appreciated that scanner-mouse 104 may comprise any suitable elements as embodiments of the invention are not limited in this respect.

In some embodiments, depressing button 105 may place scanner-mouse 104 in a scanning mode in which it generates image data in conjunction with navigation information indicating position of the scanner-mouse 104 at times when the image data was acquired. Depressing button 105 may also generate a signal to computer 102 to indicate that image data representing a scan of an object is being sent. Releasing button 105 may have the opposite result, reverting scanner-mouse 104 to a mode in which it generates conventional mouse navigation data and appropriately signaling computer 102 of the changed nature of the data generated by scanner-mouse 104.

Though, it should be appreciated that any suitable control mechanism may be used to switch between modes. Button 105 may be omitted in some embodiments of the invention. Accordingly, the switching between the scanner and mouse modes may be performed via any suitable alternative means. Thus, any components suitable to receive user input for switching between the modes may be employed. For example, in some embodiments, the switching between the scanner and mouse modes may be performed via computing device 102. In such scenarios, any suitable control included within a user interface of display device 110 may be used to accept input instructing scanner-mouse 104 to switch between the mouse and scanner modes. In addition, in some embodiments, scanner-mouse 104 may automatically switch between the scanner and mouse modes in response to a trigger. An example of a trigger may be associated with a determination that the scanning device is placed over an object (e.g., a document) to be scanned. Also, the scanning device may automatically switch between the modes based on certain characteristics of the scanned object.

As shown in FIG. 1, computing device 102 may be associated with any suitable display device 110. Display device 110 may include a monitor comprising a user interface. The user interface may be, for example, a graphical user interface which accepts user inputs via devices, such as a computer keyboard 112 and scanner-mouse 104 used in a mode as a conventional computer peripheral. It should be appreciated that system 100 may comprise any other suitable components which are not shown for simplicity of representation. Display device 110 may be used to present to the user an image of object 106 as object 106 is being scanned. During scanning, display 110 may depict portions of object 106 that have been traced over by movement of scanner-mouse 104. Such a display may be rendered quickly such that the user perceives the display being "painted" in real-time during scanning. In addition, display 110 may present a final image is formed through the scanning.

Computing device 102 may comprise image manipulation software so that a user may make modifications to or otherwise process a displayed composite image. Such processing that may be effectuated in any fashion and via any suitable means. Accordingly, the user may be enabled to control the way in which the composite image is presented on the display device. For example, the user may instruct that the composite image be presented to the user in an enlarged form. Alternatively, when the object being scanned is large (e.g., a poster), a respective composite image may be displayed at a smaller scale. Furthermore, the composite image may be presented in a modified form automatically, for example, to suit a particular application or in response to characteristics of the scanned object.

In addition, in some embodiments, a suitable component of computing device 102 may be used to adjust a size of the composite image displayed on display device 110. The size of the composite image may be adjusted in accordance with a way in which the user moves the scanning device over the object being scanned. Further, the user may be allowed (e.g., via a user interface) to select any suitable format for the composite image, which may be performed during the scanning process or at any other suitable time. Moreover, in some embodiments, the size of the composite image may be adjusted (e.g., cropped, skewed or scaled) to provide an aspect ratio and/or size suitable to a known page format such as, for example, ANSI A, ANSI B and any other suitable formats.

In embodiments in which the scanning device can operate in a scanning mode and as a convention computer peripheral, such as a mouse, scanner-mouse 104 may comprise any suitable components for it to operate as a conventional computer peripheral. In addition, scanner-mouse 104 has an image capture capability and may therefore output image data representing object 106 being scanned as a sequence of successive image frames. Accordingly, scanner-mouse 104 includes components for capturing image frames of an object, which may include a light source, an image array and suitable optical elements such as lenses and mirrors to provide optical paths between the light source and object 106 and between object 106 and the image array.

Figures 2A, 2B:
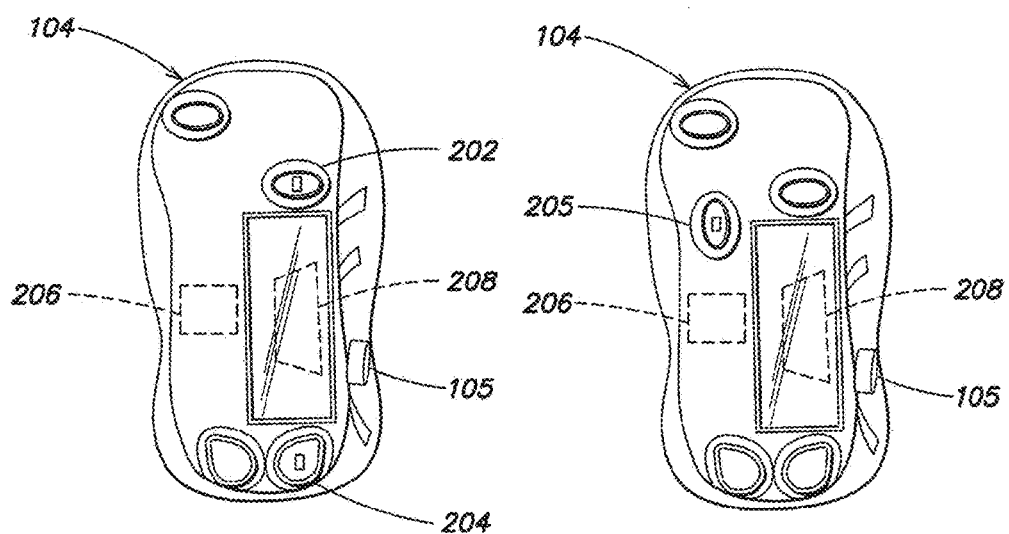
FIG. 2A is a sketch of a bottom view of a scanner-mouse computer peripheral in which some embodiments of the invention may be implemented.
FIG. 2B is a sketch of a bottom view of an alternative embodiment of a scanner-mouse computer peripheral in which some embodiments of the invention may be implemented.

FIG. 2A, illustrating a bottom surface of scanner-mouse 104, shows a scan window 208 through which the image sensor located within a body of scanner-mouse 104 may capture image frames of a scanned object (e.g., object 106 shown in FIG. 1). Scanner-mouse 104 may comprise any suitable image capturing device which may capture image frames. In some embodiments of the invention, the image capturing device may be a two-dimensional image array, such as a CCD array as is known in the art of still and video camera design. A location of the image array within scanner-mouse 104 is shown schematically in FIG. 2A as a box 206. Though, it should be recognized that the image array will be positioned in an optical path from light passing through window 208. The image array may be positioned directly in the optical path or may be positioned in the optical path as reflected using one or more reflective devices.

In addition, scanner-mouse may provide position information in conjunction with image data. Accordingly, scanner-mouse 104 may comprise navigation sensors shown in FIG. 2A as sensors 202 and 204. Sensors 202 and 204 may comprise sensors as known in the art (e.g., laser sensors) of mouse design. Though, the scanning device in accordance with some embodiments of the invention may comprise any suitable number of navigation sensors of any type.

Each of the navigation sensors 202 and 204 separately senses a motion of scanner-mouse 104 in x and y directions, which may be taken as two orthogonal directions in the plane defined by the lower surface of scanner mouse 104. As a result, a rotation of scanner-mouse 104 in that plane, denoted as e, may be derived either in scanner-mouse 104 or in computing device 102 from outputs of navigation sensors 202 and 204.

In some embodiments, navigation sensors 202 and 204 may be positioned at an adjacent window 208. This positioning may help ensure that when the scanning device is placed on an object being scanned such as a piece of paper, the navigation sensors do not protrude beyond the edges of the piece of paper. Nevertheless, the distance between the navigation sensors may be set to be large enough for the navigation sensors to be able to calculate rotational displacement of the scanning device with sufficient resolution. Accordingly, FIG. 2A illustrates navigation sensors 202 and 204 on opposing sides of window 208. Though, any suitable positioning of such sensors may be used.

Alternatively or additionally, other types of sensors may be included in scanner-mouse 104. As an example of another variation, instead of or in addition to laser sensors used to implement navigation sensors 202 and 204, scanner-mouse 104 may comprise other types of sensors that can collect navigation information, nonlimiting examples of which include one or more accelerometers, gyroscopes, and inertial measurement unit (IMU) devices. In addition to navigation information, such sensors may provide information on the user's current activity and may signify motion of the scanner-mouse that triggers operations relating to scanning. For example, a rapid back and forth movement, detected by a repeated, alternating high acceleration detected by such sensors, may be interpreted as a user input that ends the scanning process and discards an image acquired.

As an example of another variation, a contact sensor that may enable a rapid and reliable detection of the scanning device being lifted may be included. An output of a sensor indicating that scanner-mouse 104 has been lifted off a page being scanned may trigger an end or restart of a scanning process. In some embodiments, a contact image sensors (CISs) may be implemented as additional optical components, a light source and an image sensor incorporated into one module. Though, it should be appreciated that outputs of an image array that captures image frames of an object being scanned may similarly indicate that the scanner-mouse has been lifted.

It should be appreciated that scanner-mouse 104 may further comprise other components that implement mouse and scanner functionalities of the scanning device. Thus, scanner-mouse 104 may comprise a processor, memory, a power supply, a light source, various optical elements, a USB interface, and any other suitable components. The bottom surface of scanner-mouse 104 shown in FIG. 2A may also comprise pads, as known in the art, to aid in sliding the scanner-mouse.

In some embodiments, only one navigation sensor may be used. Accordingly, FIG. 2B illustrates scanner-mouse 104 that includes only one navigation sensor 205. In embodiments where one navigation sensor is utilized, the sensor may provide an output indicating motion of scanner-mouse 104 in the x and y directions. Nonetheless, a rotation of scanner-mouse 104 in the plane defined by the lower surface of scanner mouse 104 may be estimated based on the physics of movement of the human hand. In particular, the human hand is not capable of rotation so that it turns the scanner-mouse by an arbitrarily large amount between receiving two consecutive image frames. Rather, in some embodiments, between a time when successive image frames are captured, a typical rotation of the human hand may be about ten or less degrees. In addition, the human hand is not capable of changing the direction of rotation of the scanner-mouse so quickly that the direction of rotation can change between successive images. A technique for estimating a rotation from frame to frame is described below in connection with FIG. 19-22.

With the exception of having single sensor 205, scanner-mouse 104 shown in FIG. 2B may comprise the same components as those included in scanner-mouse 104 shown in FIG. 2A. Navigation sensor 205 may be positioned adjacent to window 208, as shown in FIG. 2B. Though, any suitable positioning of sensor 205 may be used.

Figure 3:
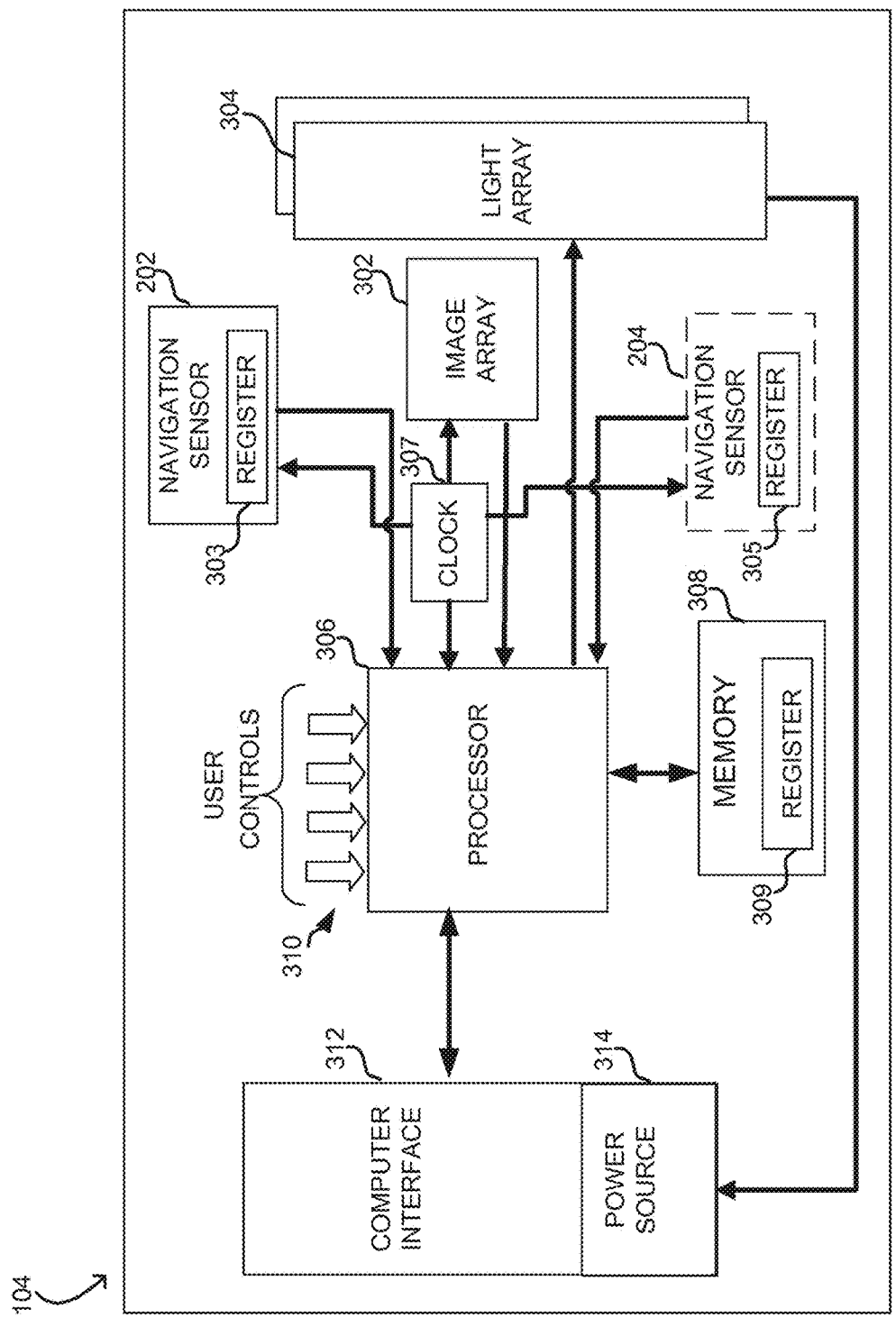
FIG. 3 is a functional block diagram of components of the scanner-mouse computer peripheral in which some embodiments of the invention may be implemented.

FIG. 3 illustrates an example of components of scanner-mouse 104, which may serve as a scanning device in accordance with some embodiments of the invention. Scanner-mouse 104 may comprise one or more sensors of any suitable types used to collect navigation information relating to position and orientation (rotation) movements of scanner-mouse 104 along a support surface (e.g., surface 108). In the example illustrated, the sensors comprise two navigation sensors such as sensors 202 and 204. Because in some embodiments only one navigation sensor may be used, as shown in connection with FIG. 2B, sensor 204 is shown by way of example only in a dashed line, to indicate that this sensor may not be included. It should be appreciated though that when only one navigation sensor is used, such a sensor may be positioned differently, as shown, for example, in FIG. 2B for sensor 205. The navigation sensors 202 and 204 output indication of movements of scanner-mouse 104.

Scanner-mouse 104 also comprises one or more image sensors which are shown by way of example only as an image array 302. The image array 302 may be a two-dimensional matrix of sensing elements, which may be of any suitable type. Though, it should be appreciated that any suitable image sensor may be utilized. Image array 302 may be positioned in box 206 (FIGS. 2A and 2B) in order to capture images of objects visible through window 208.

Further, scanner-mouse 104 may comprise a light source which is represented here by way of example only as light array 304. Light array 304 may comprise one or more arrays or Light Emitting Diodes (LED) or other suitable light emitting components. Additionally, scanner-mouse 104 may comprise optical components, which are not shown for simplicity of representation. The optical components, such as lens module(s), may provide an optical path. Any suitable systems of mirrors, prisms and other components may form the optical path to direct light from light arrays 304 through window 208 and to receive light from an object to be image through window 208 and direct it to image array 302.

In some embodiments, light array 304 may be configured such that the light reaching window 208 provides uniform illumination over window 208. Though, if uniform illumination is not achieved, suitable calibration techniques may be used. Also, light array 304 and image array 302, and the optical components creating optical paths between those components and window 208, may be arranged in such a way that the optical path for the incident light does not interfere with the optical path to the image array 302.

Various user controls 310 coupled to processor 306 may be used to receive user input for controlling operation the scanner-mouse 104. User controls 310 may comprise, for example, one or more keys, a scroll wheel (e.g., input elements 107 shown in FIG. 1) and an input element for switching between the mouse and scan modes (e.g., button 105 in FIG. 1).

Operation of scanner-mouse 104 may be controlled by processor 306. Processor 306 may be any suitable processor, including a microcontroller, a Field Programmable Gate Array (FPGA), Application Specific Integrated Circuit (ASIC) or any other integrated circuit, collection of integrated circuits or discrete components that can be configured to perform the functions described herein.

Processor 306 may be configured to perform the functions described herein based on computer-executable instructions stored in a memory 308. Memory 308 may be part of the same component as processor 306 or may be a separate component. Computer-executable instructions in memory 308 may be in any suitable format, such as microcode or higher level instructions. In some embodiments, though, memory 308 may be achieved by a circuit configuration that provides fixed inputs.

Accordingly, components of scanner-mouse 104 may be coupled to processor 308. Thus, it may be that processor 306 may receive and respond to an input indicating that the scanner-mouse 104 should switch between the mouse mode and scan mode. Additionally, processor 306 may receive and respond to inputs from various sensors (e.g., the image sensors such as image array 302, navigation sensors 202 and 204 and others).

Processor 306 may also generate control signals that turn on light array 304 and trigger image array 302 to capture an image frame. In some embodiments, these actions may be synchronized such that light array 304 is on while image array 302 is capturing an image, but off otherwise to conserve power.

Processor 306 may store, process and/or forward to other image data. In some embodiments, processor 306 may temporarily buffer image data in memory 308. Accordingly, memory 308 may represent one or more types of storage media, and need not be dedicated to storing computer-executable instructions such that memory 308 may alternatively or additionally store image data acquired from image array 302.

The image array 302 may be controlled to acquire image frames of the scanned object at a frame rate that allows acquiring overlapping image frames even when a user moves the rapidly scanner-mouse over the scanned object. In some embodiments, the frame rate and an angle of view may be adjustable. These settings may together define a size of an overlapping area of two sequential image frames.

In some embodiments, image array 302 is controlled to capture an image frames at a rate of about 60 frames per second. A frame rate of 60 frames per second may be employed in an embodiment in which the optical system captures an image frame represent an area of an object 106 (FIG. 1) that has a smallest dimension on the order of about 1.7 cm. Based on physics of human motion, that suggest a human is unlikely to move scanner mouse 104 at a rate faster than approximately 0.5 m/sec such parameters provide an overlap from one image frame to a next image frame of at least 50%. Such an overlap may ensure reliable registration of one image frame to a next, which may be used as a form of coarse positioning of image frames. As a specific example, image array 302, and the optical components (not shown), may be adapted to capture image frames representing an area of object 106 having a minimum dimension between 1 cm and 5 cm. Such a system may operate at a frame rate between about 20 frames per second and about 100 frames per second. Though, any suitably sized array may be used with any suitable frame rate.

It should be appreciated that image array 302 may be triggered to capture images in any suitable manner. Scanner-mouse 104 may comprise any suitable component or components that keep track of time and determines times when images are captured. Accordingly, in the example illustrated, scanner-mouse 104 may comprise control circuitry that includes clock 307, which may be a component as is known in the art, that generates signals that control the time at which one or more operations with scanner-mouse 104 are performed. In the embodiment illustrated, clock 307 is shown coupled to image array 302 and may control image array 302 to capture images at periodic time intervals.

In some embodiments, operation of other components, such as one or more navigation sensors 202 and 204 and processor 306, may also be controlled by clock 307. Navigation sensors 202 and 204 may receive a signal from clock 307 that triggers the navigation sensors to record navigation information at a periodic rate. Additionally, clock 307 may provide a signal to processor 306 that controls processor 306 to read navigation information from the sensors 202 and 204 close to a time at which image array 302 is triggered to capture an image. Though, the specific control circuitry used to time the functions performed by scanner-mouse 104 is not critical to the invention. In some embodiments, for example, operation of image array 302 may be controlled by processor 306 so that processor 306 triggers image array 302 to capture an image. Also, it should be appreciated that, though FIG. 3 shows a separate clock 307, timing functions may alternatively or additionally be provided by processor 306.

In some embodiments, processor 306 may be part of the control circuitry that synchronizes operations of the components of scanner-mouse 104. As a specific example, conventional navigation sensors include one or more registers that store values representing detected motion since the last reset of the register. Such position registers are illustrated as registers 303 and 305 in FIG. 3. Processor 306 may generate control signals to reset position registers 303 and 305 associated with navigation sensors 202 and 204, respectively, at any suitable time.

In some embodiments, processor 306 may reset the registers each time an image frame is captured. In this way, the values output by navigation sensors 202 and 204, which are derived from the position registers 303 and 305, may indicate movement of scanner mouse 104 between successive image frames. In embodiments where a single navigation sensor is employed, such as navigation sensor 205 (FIG. 2B), operation of this single navigation sensor may also be synchronized so that its position register is reset each time an image frame is captured. In other embodiments, processor 306 may generate control signals to reset position registers 303 and 305 at times when respective values are read from the registers, which may occur more frequently than when an image frame is read out of image array 302. Regardless of when registers 303 and 305 are read and reset, processor 306 may maintain information indicating motion of the scanner mouse relative to its position at the start of a scan, regardless of the number of image frames read. This cumulative position information may be stored in memory 308. In the example of FIG. 3, memory 308 is shown to have a register 309 holding this cumulative position information. In this example, each navigation sensor is shown to have a register and cumulative position information is shown stored in a register. This representation is used for simplicity. Navigation sensors 202 and 204, for example, may separately store navigation information associated with motion in the x-direction and the y-direction. Accordingly, more than one register may be present.

Regardless of the memory structure used to store such navigation information, when processor 306 reads the values from registers 303 and 305, the values may be used to update the values in register 309 to reflect any additional motion of the scanner mouse since the last update of the cumulative position register 309.

Within the scanner mouse 104, each image frame may be associated with navigation information that may be passed to computing device 102 for use in determining a coarse position of the image frame within a composite image to be formed. That navigation information may be in any suitable form. For example, navigation information may be expressed as frame to frame changes in position of each of the navigation sensors 202 and 204, from which a relative pose between frames can be determined. Though, it should be appreciated that relative poses could be computed in scanner mouse 104 and provided as the navigation information. Alternatively, in some embodiments, cumulative position information may be provided as the navigation information. In such embodiments, the computing device may compute frame to frame changes in position of the navigation sensors 202 and 204 based on changes in cumulative position information. From these values, relative poses between frames could be computed. Such an approach may be beneficial if there is a risk of dropped frames when image frames are transmitted through computer interface 312. Regardless of the specific format of the navigation information, information collected by processor 306 may be provided to another device, such as computer 102 (FIG. 1) for any suitable processing. That processing may include generating a composite image displaying it on a display device. Though, in some embodiments, the composite image may be at least partially created within the scanning device.

Accordingly, processor 306 may communicate with other devices through an interface, such as computer interface 312. Scanner-mouse 104 may be coupled to a computing device, such as, for example, computing device 102, and, in the example illustrated, computer interface 312 may implement communications between scanner-mouse 104 and computing device 102. Processor 306 may control selection of such information from the image and navigation sensors, forming the selected information into data packets and transmission of the data packets, via computer interface 312, to computing device 102. Accordingly, computer interface 312 may receive the data packets comprising data such as images captured by image and navigation sensors of scanner-mouse 104 and transmit the data to computing device 102 as the data is received. In the embodiment illustrated, computer interface 312 may represent a conventional computer interface for connecting computer peripherals to a computing device. As a specific example, computer interface 312 may be components implementing a USB interface.

Computer interface 312 may also be used to transfer control signals from the computing device to the scanning device. For example, a signal instructing a selection of the mouse mode or the scan mode may be sent from the computing device to the scanner-mouse computer peripheral. Alternatively or additionally, processor 306 may send command or status information through computer interface 312.

Computer interface 312 may alternatively serve as a source of power to energize components of the scanning device. As a specific example, a USB connection includes leads that, per the USB standard, supply up to 500 microAmps of power. Though, in some embodiments, the scanning device may communicate wirelessly with the computing device. In such scenarios, the scanning device may be powered by battery. In addition, the scanning device may be powered in any suitable manner, including via means combining wired and wireless functionalities.

In this example, light array 304 is connected to power source 314, which draws power through computer interface 312. In some embodiments, light arrays 304 require more power than can be supplied through computer interface 312. Accordingly, light arrays 304 may be strobed only while an image is being captured. Strobing may reduce the average power. To provide an appropriate power when light arrays 304 are on, power source 314 may contain an energy storage device. As a specific example, power source 314 may contain a 1000 microFarad capacitor that is charged from computer interface 312 and discharged to supply power when light array 304 is strobed.

Figure 4:
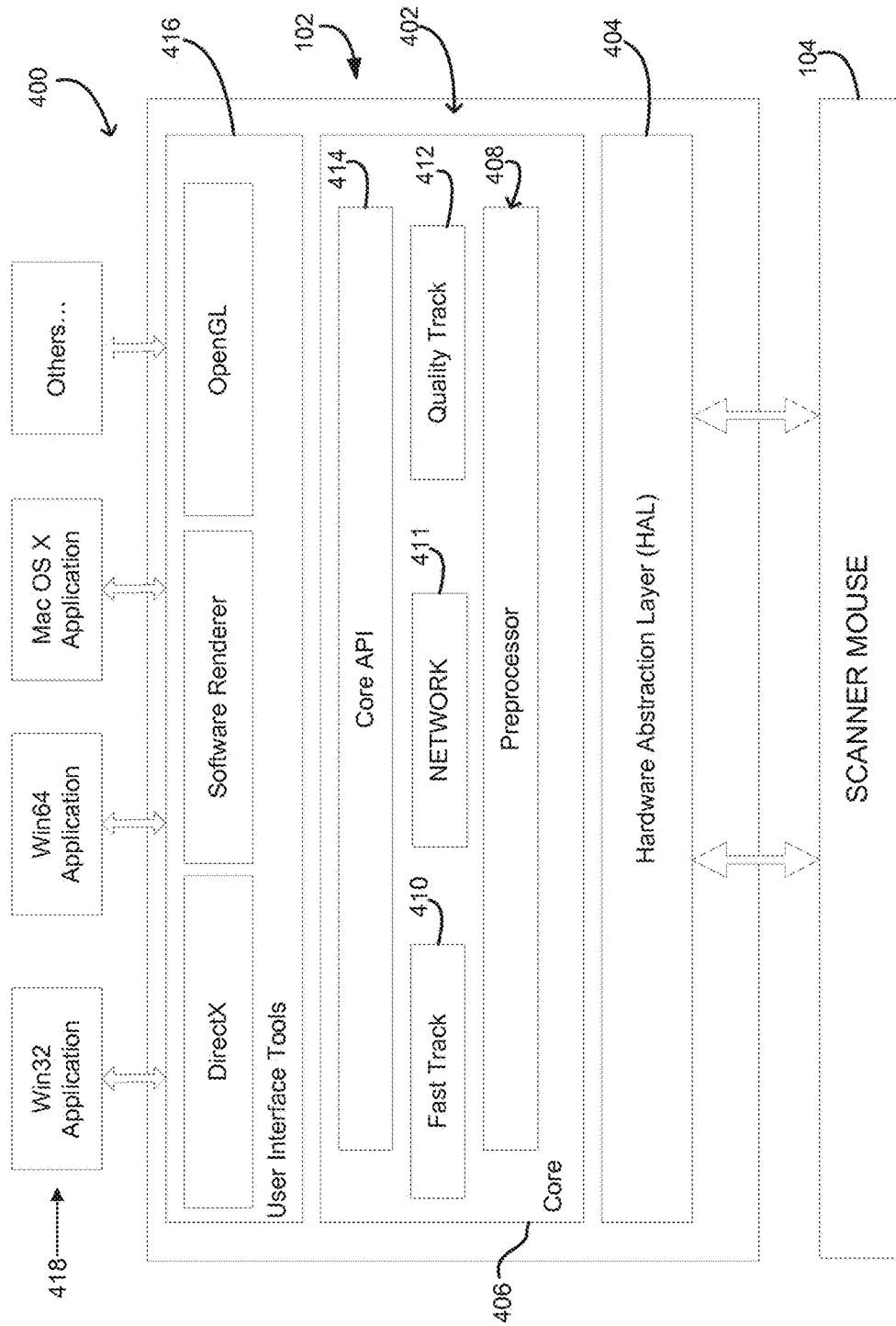
FIG. 4 is a schematic diagram of a system for image processing, in accordance with some embodiments of the invention.

The components illustrated in FIG. 3 may be operated in a scan mode, in which scanner-mouse 104 is moved over a scanned object and a stream of image frames is acquired. The image frames may be passed to a computing device for processing into a composite image. The composite image may be used by different applications. FIG. 4 illustrates an exemplary system 400 that may generate and use a composite image.

In this example, scanner-mouse 104 may be coupled with computing device 102. It should be appreciated that any suitable scanning and computing devices may be used as embodiments of the invention are not limited in this respect. Moreover, some embodiments of the invention may be implemented in a device incorporating functionalities of both the scanning device and the computing device as described herein.

In the example illustrated, computing device 102 may comprise framework 402 which comprises any suitable components having computer-executable instructions for implementing functions as described herein. In framework 402, a hardware abstraction layer 404 may operate as an interface between the physical hardware of computer and software components. In embodiments in which scanner mouse 104 communicates over a standard computer interface, HAL 404 may be a component of a conventional operating system. Though, any suitable HAL may be provided.

At a higher level, framework 402 comprises core 406 that may perform processing of image and navigation information as described to generate a composite image. Core 406 may comprise a preprocessor 408 for preprocessing the image and navigation information, which may be performed in any suitable manner. For example, preprocessing may entail extracting features from image frames to support feature-based image matching. Though, preprocessor 408 may preprocess image data and navigation information in any suitable way.

The preprocessed information may be the basis for processing to provide coarse and fine positioning of image frames. In the example illustrated in FIG. 4, a component 410 denoted by way of example only as "Fast track" of core 406 may perform the coarse positioning of image frames. Core 406 also comprises a component 412 denoted by way of example only as "Quality track" which may perform the fine positioning of image frames.

In some embodiments, successive image frames collected during a scan of an object are represented as a network 411 stored as a data structure in computer memory. The data structure may be configured in any suitable way to represent each image frame as a node in network 411. Edges between each pair of nodes may represent relative positioning of the image frames. Initially, nodes may be added to network by fast track 410 as image frames are received from scanner mouse 104. The initial edges in the network may be based on relative positions which may be derived from coarse positioning information generated by fast track processing 410. However, quality tack processing 412 may access network 411 and make fine adjustments to the edges in the network.

In some embodiments, processing in fast tack 410 is independent of processing in quality tack 412. Moreover, processing in quality track 412 can be performed without the entire network being constructed. Accordingly, fast tack processing 410 and quality tack processing 412 may be performed in separate processes. Separate processes may be implemented using features of computer systems as are known in the art. Many conventional computer systems have operating systems that provide separate processes, sometimes called "threads." In embodiments in which computer 102 contains a multi-core processor, each process may execute in a separate core. Though, it is not a requirement that fast tack 410 and quality tack 412 processing be performed in separate cores or even in separate processes.

Upon completion of processing of all image frames of a scan, network 411 may contain a final composite image, representing scanned object 106. A position can be assigned to each node in the network based on the position information defined by the edges of the network. Thus, the composite image can be represented by the collection of the image frames in positions indicated in the network. The edges in the network may be directional to preserve the order in which image frames were acquired. Accordingly, in embodiments in which an later image frame partially or totally overlaps an earlier image frame, the portion of the composite image where there is overlap may be represented by the most recently acquired composite image. Though, any suitable approach may be used to determine the content of a composite image when image frames overlap. The overlapping portions of the image frames, for example, could be average on a pixel-by-pixel basis.

Further, it should be appreciated that during scan operation, network 411 contains a representation of a composite image. Though, the image frames may be imprecisely positioned relative to each other, creating a blurring or jagged appearance to the composite image, if displayed.

To allow the composite image to be used outside of core 406 or to allow components outside of core 406 to control the image generation processes, core 406 may communicate with other components via a core application programming interface API 414.

In FIG. 4, framework 402 may also comprise user interface tools 416 providing different functionalities related to processing a composite image generated by core 406. These user interface tools may directly interface with a user, such as through a graphical user interface. Though, such user interface tools may interact with applications that in turn are interacting with a user or a running in response to actions by a user.

User interface tools 416 may be perform any suitable functions. An example of one tool may be a renderer, here implemented in software. Renderer may access network 411, through API 414 and render a composite image on a user interface of any suitable display, such as display 110. The renderer may render a completed composite image. Though, in some embodiments, renderer may continuously update the display as image frames are being added to network 411 by fast track processing 410 and image frames are adjusted in the network by quality tack processing 412. In this way, a user operating a scanning mouse may see the progress of the scan—which areas of an object have been scanned and which areas remain to be scanned.

In addition to rendering a composite image for a user, user interface tools 416 may receive user inputs that control operation of core 406. For example, user inputs may trigger a scan, end a scan, reset a scan or discard a scanned image. Further, in some embodiments, user inputs may control the size or aspect ratio of a scanned image or otherwise input values of parameters used in operation of core 406.

User interface tools 416 may be implemented in any suitable way to perform any suitable functions. In this example, components implemented according to DirectX and OpenGL are shown by way of example only. User interface tools 416 may comprise components implemented in any suitable way.

Moreover, user interface elements may exchange image data and commands with applications, rather than directly with a human user. A composite image of the scanned object may be utilized by any suitable application executed by computing device 102 or any other suitable device. The applications may be developed for any suitable platforms. In the example of FIG. 4, applications 418 such as Win32 application, Win64 application, Mac OS X application and "Others . . . " are shown by way of example only. Though, it should be appreciated that any suitable applications may utilize the composite image generated using techniques described herein as embodiments of the invention are not limited in this respect.

Framework 402 may operate in conjunction with any suitable applications that can utilize and/or further process the composite image in any suitable way. Different applications that can be stored in memory of computing device 102 or be otherwise associated with computing device 102 (e.g., via the Internet) may enable processing of the image information to extract any suitable information. Thus, some of such applications may determine context and other different properties of the image information. The image information may also be analyzed to extract and process content of the image, which may involve identifying whether the image comprises a business or a credit card, pictures, notes, text, geometric shapes or any other elements. Any suitable text and image recognition applications may be utilized. Further, any suitable statistical information on the image content may be extracted.

In scenarios where the image information on the scanned object comprises text, suitable applications may detect certain information in the text and provide the user with additional information related to the text. For example, in one embodiment, an application may identify certain words in the text, for example, those that are not included in a dictionary, and obtain information relating to these words (e.g., via the computing device connected to the Internet). The application can also identify the relevance of word groups, sentences and paragraphs, which may then by highlighted on the composite image via any suitable means. As another example, a suitable application may detect literature references in the text, and, in response, the references may also be obtained via the Internet. Thus, a composite image generated by framework 402 may be used in any suitable way, and the manner in which it is used is not critical to the invention.

Figure 5:
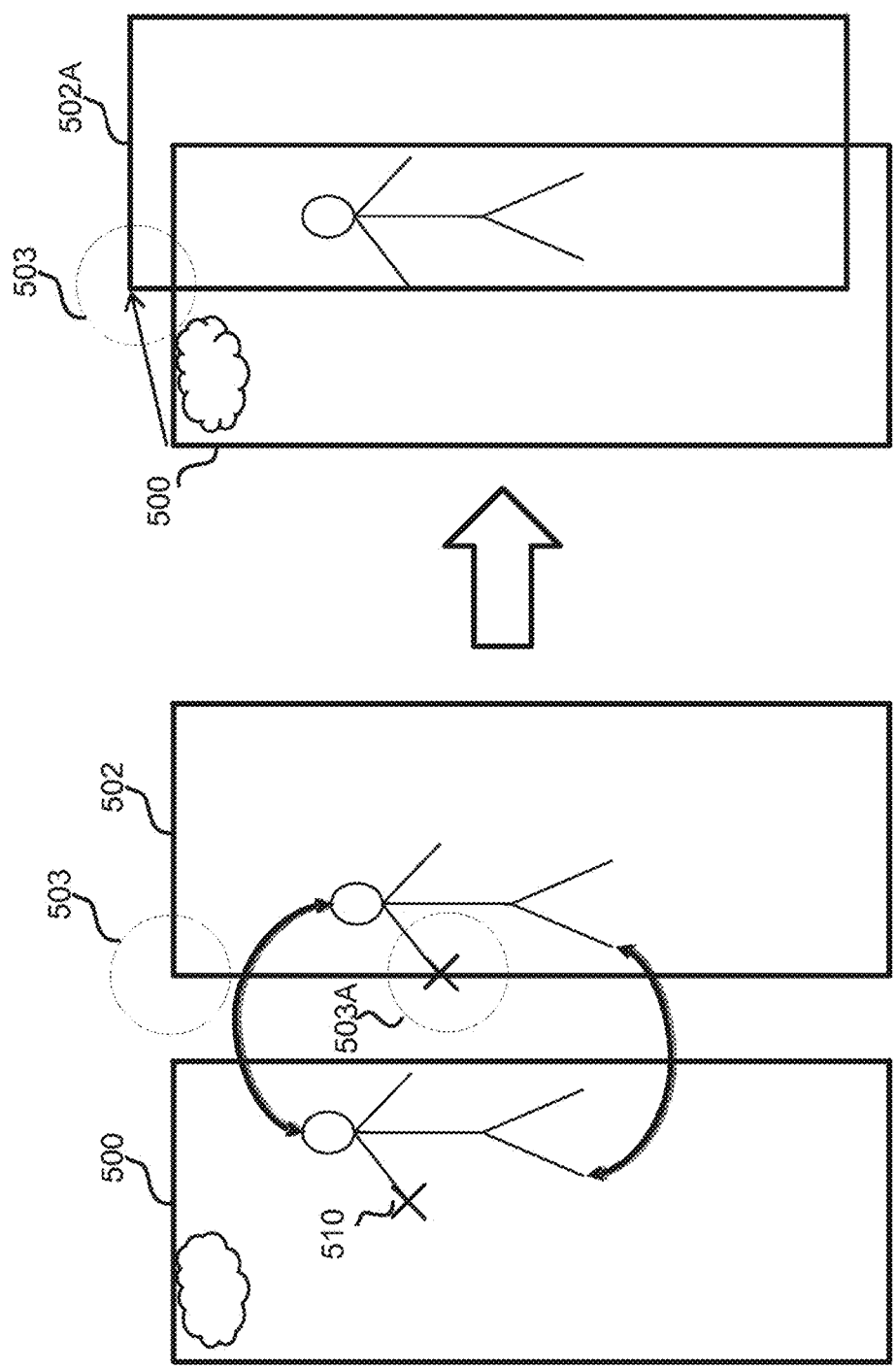
FIG. 5 is a schematic diagram that illustrates adjusting a pose of an image frame by aligning the image frame with a preceding image frame, in accordance with some embodiments of the invention.

Turing to FIG. 5, an example of an approach for coarse positioning of two consecutive image frames is illustrated. Coarse positioning of image frames of a scanned object may comprise aligning consecutive image frames based on matching portions of the image frames showing corresponding portions of the object being scanned. FIG. 5 schematically illustrates such a process of aligning two image frames based on matching portions of the image frames corresponding to respective portion of the object being scanned. In this example, an image frame 500 represents a preceding image frame and image frame 502 represents a succeeding image frame taken as a scanning device moves over the object being scanned. Though, image frame 502 may be aligned with any one or more image frames that partially overlaps with image frame 502, based on matching content of the image frames within the overlapping areas.

During the coarse positioning, an initial pose of image frame 502 may first be estimated based on information from one or more navigation sensors (e.g., navigation sensors shown in FIGS. 2A and 2B). The initial pose estimate may be associated with some imprecision expressed as a zone of uncertainty 503, as shown in FIG. 5. Though not readily illustrated in a two dimensional drawing, the zone of uncertainty may represent uncertainty in both displacement and orientation. In embodiments where one navigation sensor is used, the zone of uncertainty may be different from a zone of uncertainty used when more than one navigation sensor in employed.

In some scenarios, the zone of uncertainty may be small enough that an initial pose estimate may provide adequate coarse positioning of image frame 502. However, in some embodiments, alternatively or additionally, a second coarse positioning technique based on matching content in a portion of image frame 502 with content in a corresponding portion of image frame 500 may be used.

The pose of image frame 502 that results in a suitable match of content in the overlapping areas may be taken as the position of image frame 502 relative to image frame 500. The pose that provides a suitable match may be determined based on aligning features or other image content. Features, such as corners, lines and any other suitable features, may be identified using known image processing techniques and may be selected for the matching in any suitable way.

In some embodiments, the matching process may be simplified based on navigation information. It may be inferred that the pose of image frame 502 that aligns with image frame 500 provides a pose within area of uncertainty 503. To reduce processing required to achieve alignment and to thus increase the speed of the local positioning of image frames, in some embodiments, the navigation information may be used. If image frame 502 in aligned with image frame 500 using feature matching, processing required to find corresponding features can be limited by applying the zone of uncertainty 503. For example, image frame 500 includes a feature 510. A corresponding feature should appear in image frame 502 within a zone of uncertainty 503A around a location predicted by applying navigation information that indicates motion of scanner-mouse 104 between the times that image frame 500 was acquired and image frame 502 was acquired. Accordingly, to find a feature in image 502 corresponding to feature 510, only a limited number of features need to be compared to feature 510.

If other matching techniques are employed, navigation information may also be used in a similar way. For example, overlapping regions in different poses of image frame 502 are iteratively compared on a pixel-by-pixel basis, the navigation information can be used to identify overlapping portions to be compared and to limit the number of poses to be tried to find a suitable match.

Regardless of the matching technique employed, any suitable criteria can be used to determine a suitable match. In some embodiments, a match may be identified by minimizing a metric. Though, it should be appreciated that a suitable match may be determined without finding an absolute minimum. As one example, a pose of image 502 may be selected by finding a pose that minimizes a metric expressed as the sum of the difference in positions of all corresponding features. Such a minimum may be identified using an iterative technique, in which poses are tried. Though, in some embodiments, known linear algebraic techniques may be used to compute the pose yielding the minimum.

In FIG. 5, image frames 500 and 502 contain matching portions comprising equal image content which is shown by way of example only as a strawman. Once the equal image content in image frames 500 and 502 is identified using any suitable technique, the image frames may be aligned using the equal image content. In FIG. 5, image frame 500 aligned with image frame 502 is shown by way of example only as image frame 502A.

In embodiments of the invention, scanning of an object may be performed by moving a scanner-mouse computer peripheral over the object. A stream of image frames may thus be captured which are then stitched together to form a composite image representing the object. As a user is moving the scanning device over the object and new image frames in the stream are being captured, their respective coarse positions may be determined. Each coarsely positioned image frame may be presented on a display device in a position proportional to its determined position within the composite image. The coarse positioning can be performed fast enough that image frames may be displayed to the user on the display device with a small delay relative to when the image frames are captured. As a result, a composite image representing a progression of the scanning process of the object being scanned appears to be painted on the display device. Furthermore, a fine adjustment may be made to the relative positions of the coarsely positioned image frames.

FIGS. 6A-D illustrate a process of scanning an object by capturing a stream of successive image frames of the object, in accordance with some embodiments of the invention. In these examples, the object being scanned comprises a text document 600. As the scanning device moves over the object, images of the object are captured at intervals, which are illustrated to be periodic in this example, thus resulting in a sequence of image frames. Each succeeding image frame may be initially positioned based on a respective preceding image frame to obtain an estimate of an initial pose of the succeeding image. As described above, navigation information representing movement of the scanning device obtained from the navigation sensors may be used to simplify the processing.

The image frames are shown in FIGS. 6A-D as superimposed over text document 600 to demonstrate exemplary movements of the scanning device over the text document. It should be appreciated that each subsequent image frame may be oriented in any suitable way with respect to a preceding image frame as embodiments of the invention are not limited to any particular movement of the scanning device over an object being scanned. In the embodiment illustrated, an image frame is positioned based on comparison to an immediately preceding image frame, which is not a requirement of the invention. A succeeding image may be locally positioned by being aligned with respect to any other preceding frames if there is overlap.

Figures 6A, 6B:
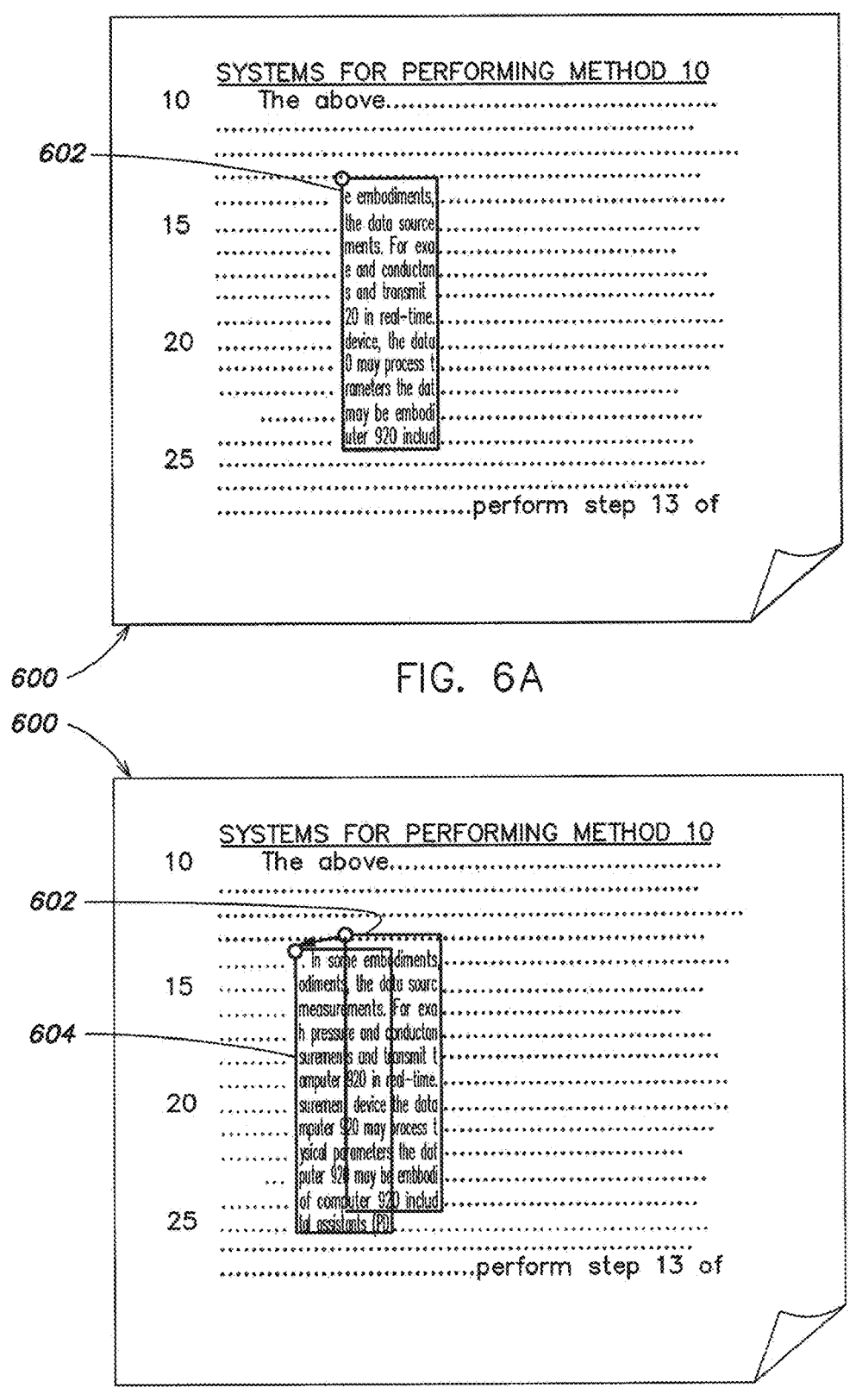

FIG. 6A shows that a first image frame 602 in a stream of image frames may be captured as the scanning of text document 600 begins, upon any suitable trigger. For example, image frame 602 may depict a portion of document 600 visible through window 208 of scanner-mouse 104 at the time button 105 was pressed.

Next, as shown in FIG. 6B, a succeeding image frame 604 may be captured that partially overlaps image frame 602. In some embodiments, the scanning device may capture the stream of image frames at a rate that ensures that each new image frame partially overlaps at least one of the preceding image frames.

Figure 6C:
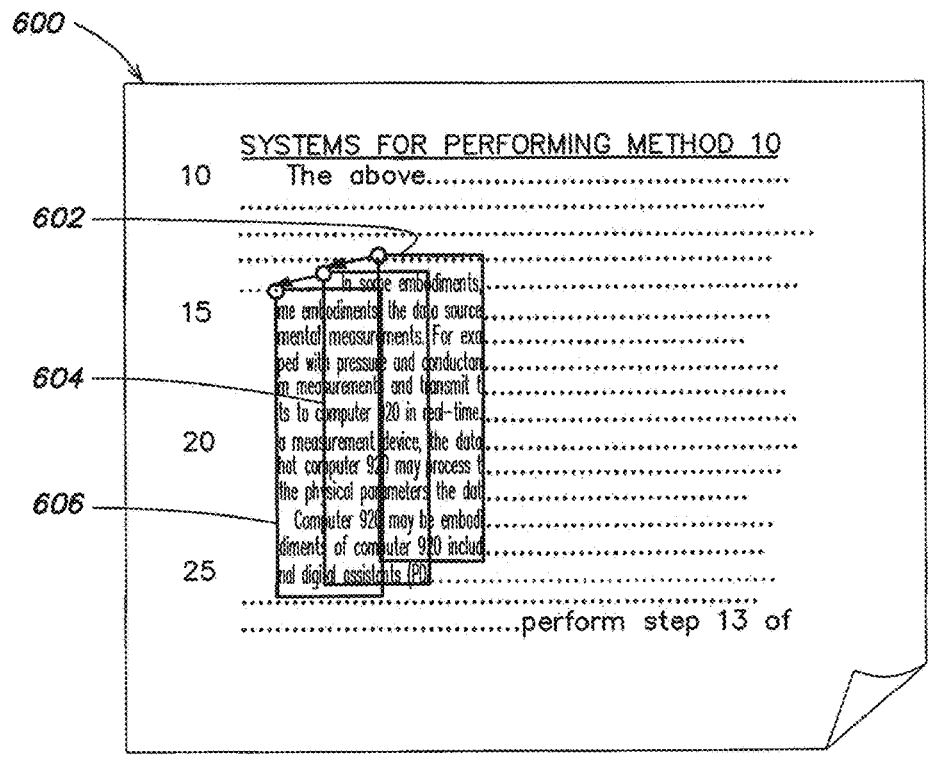
Figure 6D:
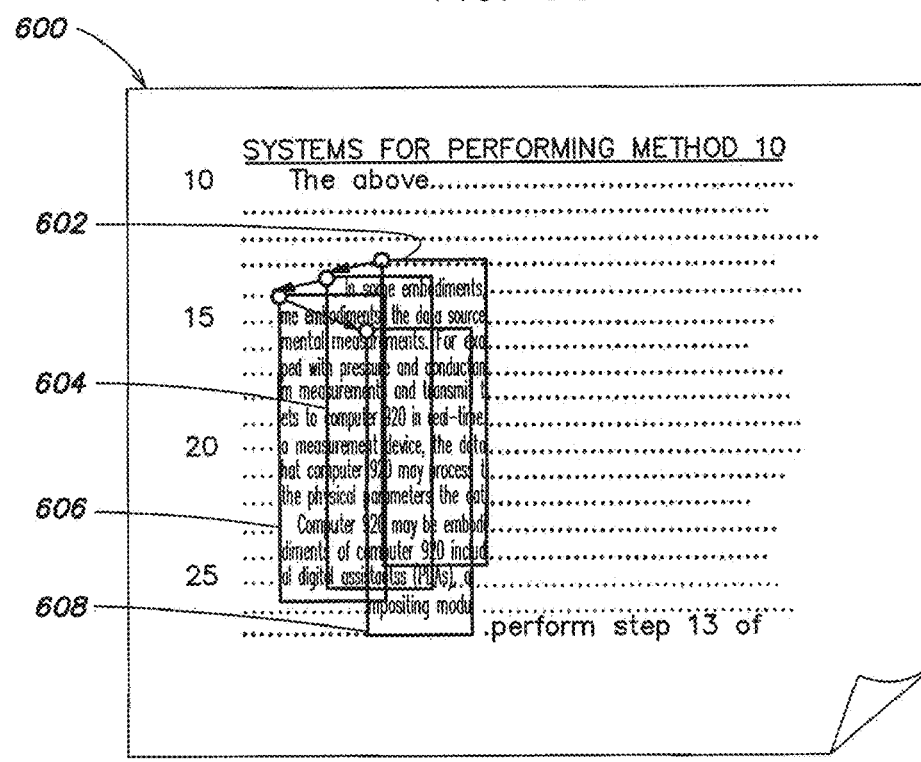

As new image frames are being captured as part of the stream of image frames, a subsequent image frame 606 that partially overlaps preceding image frame 604 may be captured, as shown in FIG. 6C. Further, a new image frame 608 may be captured, as illustrated in FIG. 6D. Image frame 608 partially overlaps image frame 606.

Because motion of scanner-mouse 104 is not constrained, each new image frame may overlap an immediately preceding image frame as well as other neighbor preceding frame. As illustrated in the example of FIG. 6D, respective areas of overlap of image frame 608 with image frames 602 and 604 are larger than an area where image frame 608 overlaps with the immediately preceding image frame 606. However, in accordance with some embodiments, each new image frame is, for coarse positioning in fast track processing, is positioned relative to an immediately preceding image frame.

Figure 7A:
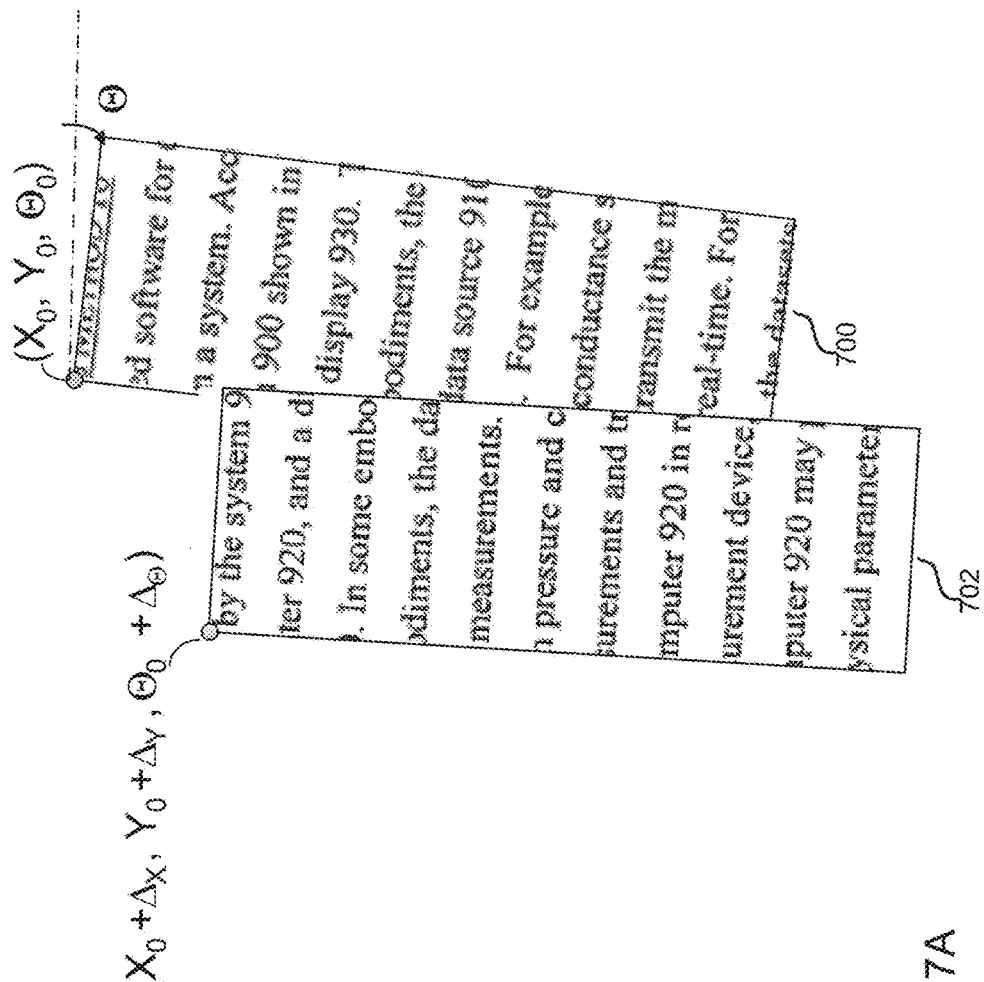
FIGS. 7A and 7B are schematic diagrams of an example of adjusting a relative position of an image frame of an object being scanned by aligning the image frame with a preceding image frame, in accordance with some embodiments of the invention.
Figure 7B:
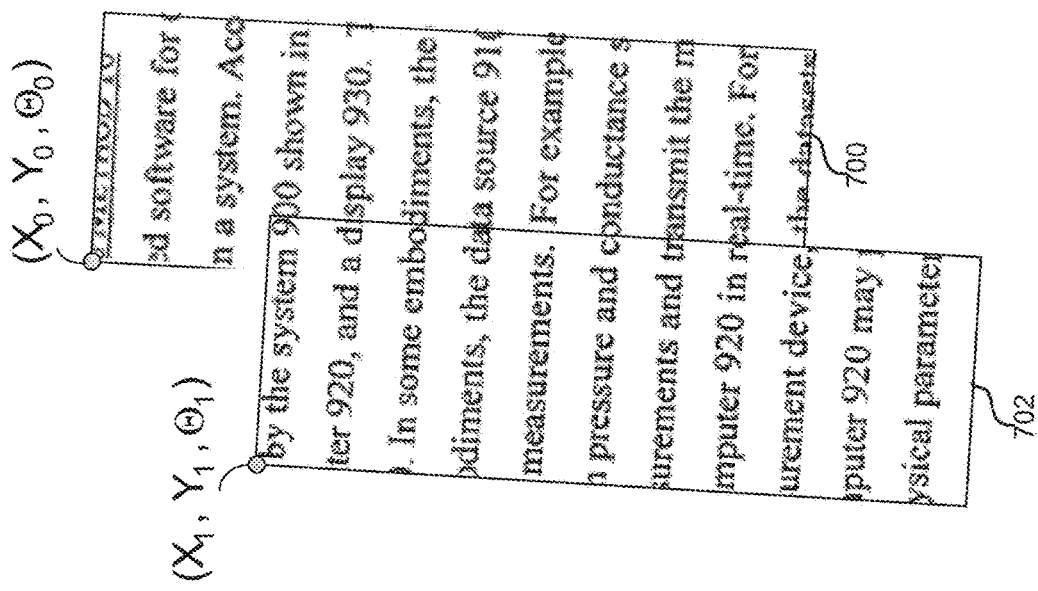

FIGS. 7A and 7B illustrate example of a first step that may occur in a process of determining a position of a subsequent image frame relative to a preceding image frame. The first step may be determining an initial estimate of a pose of an image frame with respect a preceding image frame. In the example shown in FIGS. 7A and 7B, an image frame 700 and next an image frame 702 may be captured as a user moves a scanning device (e.g., scanner-mouse 104) over an object to be scanned. In this example, the object comprises a text document.

FIG. 7A illustrates initial estimate of a pose of image frame 702 based on navigation information obtained by one or more navigation sensors (e.g., navigation sensor 202, or both navigation sensors 202 and 204). Initial estimate of pose of image frame 702 may be based on a change of output of the navigation sensors between the times at which image frames 702 and 704 are captured. In FIG. 7A, a pose of image frame 700 is schematically shown as $(X_0, Y_0, \Theta_0)$. In this example, $X_0$ and $Y_0$ denote a position of image frame 700 in x and y dimensions, respectively, while $\Theta_0$ denotes a rotation of the image frame.

If image frame 700 is the first image frame in the stream, its position may be taken as an origin for a frame of reference in which other image frames will be positioned. If image frame 700 is not the first image frame in the stream, it may have a position determined relative to a preceding image frame that, in turn may either define the origin or have a position relative to the origin, through one or more intermediate image frames. Regardless of how many image frames are in the series, relative image poses of the image frames may define positions for all image frames.

Regardless of the position in the stream, each succeeding image frame after the first may be captured and processed as image frame 702. An initial pose of image frame 702 may be determined with respect to the pose $(X_0, Y_0, \Theta_0)$ of image frame 700. During a time between when image frame 700 is captured and when image frame 702 is captured, the navigation sensors indicate a change in the position of the scanning device by a value of $\Delta x$ in the x direction and by a value of $\Delta y$ in the y direction. Also, in embodiments in which multiple navigation sensors are used, the navigation sensors may indicate a rotation of the scanning device by a value of $\Delta \Theta$. In embodiments in which only a single navigation sensor is used, a value of $\Delta \Theta$ may nonetheless be employed. In such embodiments, the rotation may be estimated based on the assumption on physics of movements of the human hand and using rotation estimated for previously positioned preceding image frames. The value of value of $\Delta \Theta$ may be determined according to processing as described below. Accordingly, the initial estimate of the pose of image frame 702 with respect to image frame 700 may be denoted as $(X_0 + \Delta x, Y_0 + \Delta y, \Theta_0 + \Delta \Theta)$.

FIG. 7A illustrates a degree of misalignment between image frames 702 and 700 that would provide a poor quality image. As shown in this example, the respective portions of the text of the scanned object do not match. To align image frame 702 with the preceding image frame 700 so that a good quality image can be generated, a matching portion of the image frames may be determined and the image frames may be aligned based on these portions. In some embodiments, those portions that are within a zone of uncertainty are first explored to position image frame 702 with respect to image frame 700. Any suitable technique may be used for the matching, which may be iteratively attempting to find a suitable match between the image frames. FIG. 7B shows image frame 702 aligned with image frame 700 based on the respective content of the image frames which is, in this example, the text. The adjusted pose of image frame 702 is shown by way of example only as $(X_1, Y_1, \Theta_1)$. These values may represent the pose of image frame 702 relative to the origin of the frame of reference. Though, because these values are derived based on positioning image frame 702 relative to image frame 700, they may be regarded and stored as relative values.

Image frames that are locally positioned with respect to preceding image frames may be stored as a network of image frames, which may then be used for global positioning or other processing. The network may comprise nodes, representing image frames, and edges, representing relative position of one node to the next.

FIGS. 8A-D in conjunction with FIGS. 9A-9D illustrate the above concept of building a network of image frames based on local positioning of image frames. A reference point on each image frame, here illustrated as the upper left hand corner of each successive image may be used to represent the position of the image frame. Relative displacement of the reference point, from image frame to image frame, may be taken as an indication of the relative position of the image frames.

FIG. 9A-D represent respective nodes that may be added to the network as new image frames are acquired and locally matched with one or more previous image frames. Though, in the illustrated embodiment, each new image frame is matched to its immediately preceding image frame. In the network, any frames that have been locally matched will be represented by an edge between the nodes representing the frames that have been matched. Each edge is thus associated with a relative pose of an image frame with respect to a preceding image frame.

In FIGS. 8A-8C, image frames 800, 802 and 804 are successively processed. As each new image frame is acquired, its initial pose estimated from navigation information may be adjusted to provide an improved estimate of relative position of the new image frame, by aligning the new image frame with a preceding image frame. Thus, FIG. 8B shows that, as a new image frame 802 is captured, its pose may be determined by matching image frame 802 with a preceding image frame, which is, in this example, is image frame 800. A relative pose of image frame 802 with respect to image frame 800 is thus determined. Similarly, when the next image frame 804 is captured, its relative pose with respect to the preceding image frame 802 may be determined in the same fashion, as shown in FIG. 8C.

FIGS. 9A-C conceptually illustrate the building of a network to represent the matching of successive image frames in a stream to determine their relative poses. As shown, nodes 900, 902 and 904 representing the image frames 800, 802 and 804, respectively, may be added to the network. In this example, each directed edge schematically indicates to which prior image frame relative pose information is available for a pair of frames. It should be appreciated that FIGS. 9A-9D conceptually represent data that may be stored to represent the network. The network may be stored as digital data in a data structure in computer memory. The data structure may have any suitable format. For example, each node may be stored as digital data acting as a pointer to another location in memory containing bits representing pixel values for an image frame. Other identifying information associated with a node may also be stored, such as a sequence number to allow the order in which image frames were captured to be determined. Likewise, edges may be stored as digital data representing the nodes that they join and the relative pose between those nodes. One of skill in the art will appreciate that any suitable data structure may be used to store the information depicted in FIGS. 9A-9D.

As the stream of image frames is acquired, a user may move the scanning device back and forth across an object to be scanned, possibly tracing over regions of the object that were previously imaged. Accordingly, a new image frame that overlaps multiple preceding image frames may be captured. In the illustrated example, new image frame 806 that overlaps image frames 800, 802 and 804, as shown in FIG. 8D. A respective new node 906 may be added to the network to represent image frame 806, as illustrated in FIG. 9D.

In the figures, dark arrows illustrate an order in which image frames are captured, and the image frames may be said to be "layered" on top of each other as they are captured, so that the most recently captured image frame is placed, or layered, on top of prior image frames. The dark arrows also indicate the relative positions initially used to add image frames to the network as part of fast processing.

In addition, the possibility of a new image frame overlapping multiple preceding image frames provides a possibility for a more accurate positioning of image frames based on global information, meaning information other than a match to an immediately preceding image.

Dashed lines shown in FIG. 9D may be a relative position of an image frame with respect to an overlapping image frame other than an immediately preceding image frame. Thus, node 906 is shown to be connected, via respective edges, to nodes 902 and 904 which represent respective overlapping neighbor image frames. These edges may be added as part of processing in the quality track and may be used to more finely determine positions of image frames, as described in greater detail below.

Though FIGS. 8A-8D could be taken as demonstrating a sequence of image frames as they are captured, they could also be taken as a demonstration of what could be displayed for a user based on the network being built, as illustrated in FIGS. 9A-9D. As each image frame is captured and locally positioned, it may be presented on a display device in a position proportional to its determined position within the composite image represented by the network. For example, as the scanning process of the text document begins, image frame 800 is first displayed. Next, when the user moves the scanning device and image frame 802 is captured, respective larger portion of the composite image of the text document may be displayed to the user with a small delay, which may not be perceived by the user as disrupting or slowing down the scanning process. Thus, the composite image on the display may appear to the user as if the object being scanned is being painted on the display as the user moves the scanning device over the object.

Image stitching techniques in accordance with some embodiments of the invention may be used to generate a composite image of a scanned object of any suitable type. As shown in the above examples, the object being scanned may be a text document, an image, a graph, or any combination thereof. Further, content the object may be in represented in grayscale or it may comprise various colors. Image frames representing text, such as is illustrated in FIGS. 8A-8D, may contain multiple edges or other features that may be used in aligning image frames. For example, such features as lines and corners may be used if the scanned object includes text and/or image(s). Though techniques as described herein are not limited to such embodiments.

FIGS. 10A-10C show that a relative pose of each new image frame may be determined by matching the image frame with a preceding image frame, even if the image does not represent or other content with many features that can be easily identified. To perform the matching, identical content in the matched image frames is determined and may be matched other than based on corresponding features. For examples regions may be matched based on a pixel-to-pixel comparison, comparisons of gradients or other image characteristics.

For example, image frames may be aligned using area-based matching. As shown in image frames illustrated in FIGS. 10A-10C, the content of an object being scanned (e.g., a photo rather than text) may be an image having content of different color gradient across the image. Hence, the area-based matching may be suitable for aligning image frames of such object. Also, FIGS. 10B and 10C illustrate that motion of a scanning device between successive image frames may involve rotation in addition to displacement in an x-y plane. Rotation may be reflected in the angular portion of the relative pose between frames.

FIG. 11 is another example of constructing a network of image frames as new image frames are captured and respective nodes representing the frames are added to the network. As in the example of FIGS. 9A-9D, the network is represented graphically, but in a computer, the network may be represented by digital values in a computer memory.

FIG. 11 shows the state of the network after a scanning device has been moved in one swipe, generally in the direction 1114. In this example, the pose of the first image frame in the network, represented by node 1110, may be taken as a reference point. The pose of any other image frame in the network may be determined by combining the relative poses of all edges in a path through the network from node 1110 to the node representing the image frame. For example, the pose of image frame associated with node 1112 may be determined be adding the relative poses of all edges in the path between node 1110 and 1112. A pose of each image frame, determined in this way, may be used for displaying the image frame as part of a composite image.

Determining a pose of an image frame based on adding relative poses along a path through the network also has the effect of accumulating errors in determining relative pose of each image frame area also accumulated. Such errors can arise, for example, because of noise in the image acquisition process that causes features or characteristics in one image frame to appear differently in a subsequent image frame. Alternatively, features in consecutive image frames with similar appearances, that actually correspond to different portions of an object being scanned, may be incorrectly deemed to correspond. Thus, for any number of reasons, there may be errors in the relative poses. For image frames along a single swipe, though, these errors in relative pose may be small enough so as not to be noticeable.

However, as a user swipes a scanning device back and forth across an object, motion of the scanning device in direction 124 will generate image frames acquired at a later time adjacent image frames acquired at an earlier time. In particular, as the path through the network proceeds beyond node 1112 along segment 1116, eventually, a node 1118 on the path will have a position near node 1120. When this occurs, the accumulated errors in relative positions along the path, including segment 1116, may be substantial enough to create a noticeable effect in a composite image including image frames associated with nodes 1118 and 1120, if both nodes are positioned on based on accumulated relative poses in paths from node 1110. Positioning of image frames in the composite image, for example, may create a jagged or blurred appearance in the composite image.

Figure 12A:
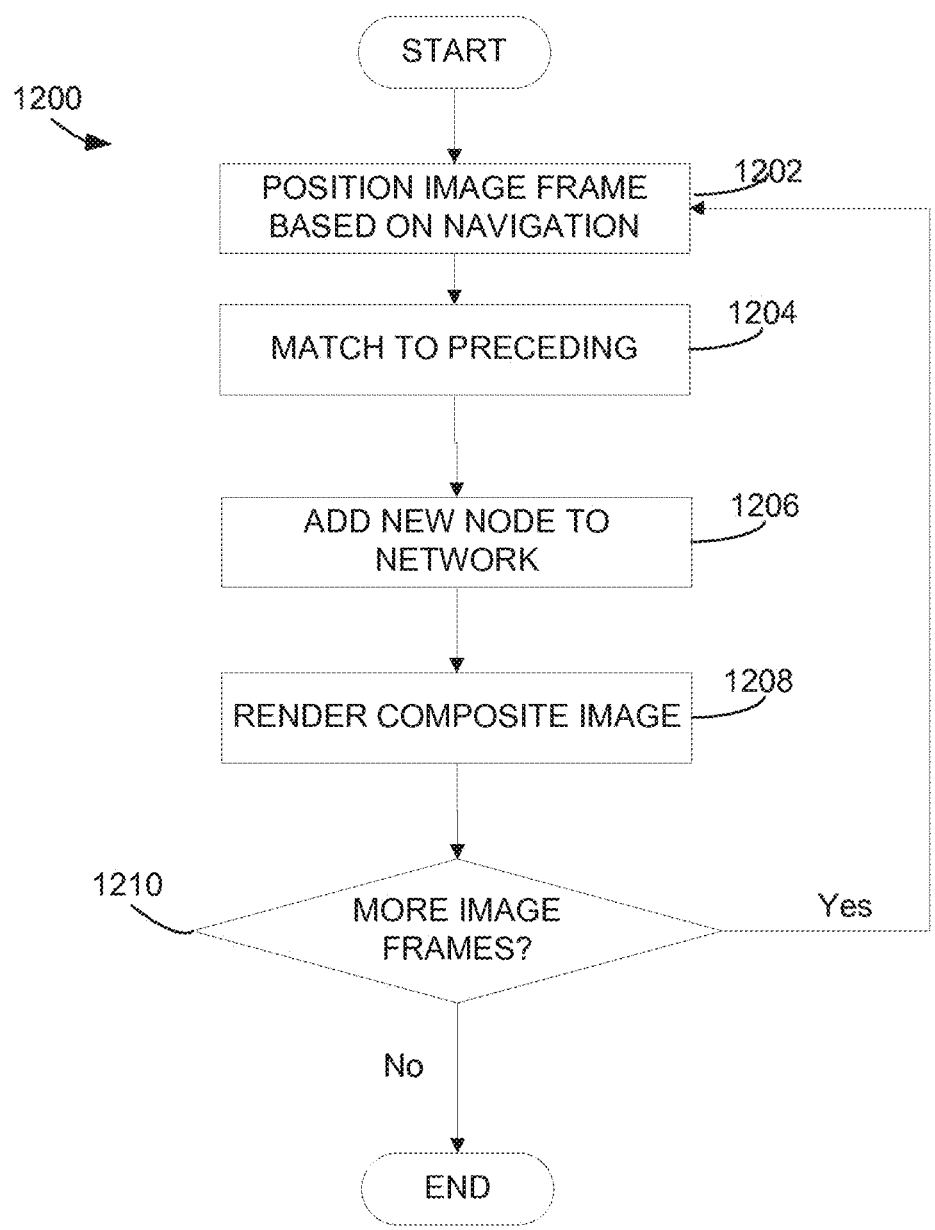
FIG. 12A is a flowchart of a local alignment of image frames, in accordance with some embodiments of the invention.
Figure 12B:
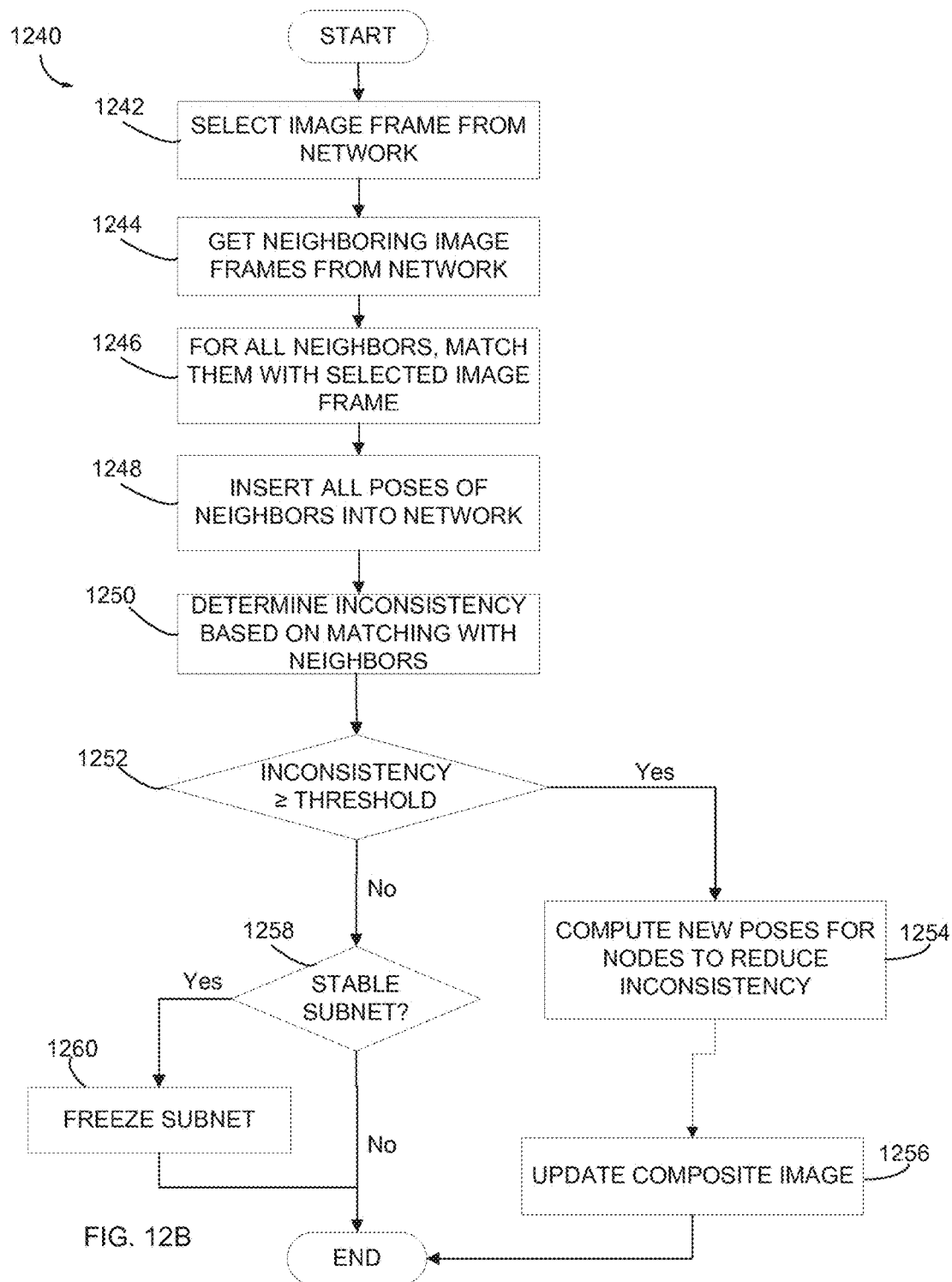
FIG. 12B is a flowchart of a global alignment of image frames, in accordance with some embodiments of the invention.

To provide an image of suitable quality, quality track processing may be performed on the network. This processing may adjust the relative pose information along the edges of the network to avoid the effects of accumulated errors in relative pose. Accordingly, during the scanning process in accordance with come embodiments of the invention, as new image frames are being captured and stitched into the composite image, a fine adjustment may be made to the determined relative positions of image frames already in the network. Fine adjustments may be made in parallel to the coarse positioning of successive image frames such that displayed image quality may improve as the scan progresses. Fine adjustments may be based on global positioning of image frames which may involve determining a position of an image frame within the composite image based on positioning of image frames other than the immediately preceding image frame. FIGS. 12A and 12B illustrate coarse positioning and find positioning, respectively, according to some embodiments.

FIG. 12A illustrates a process 1200 of coarse positioning of image frames as part of a process of stitching of image frames to generate a final composite image of an object being scanned. In some embodiments of the invention, process 1200 may involve coarse positioning, or alignment, of image frames to first locally position the frames.

Process 1200 may start an any suitable time. For example, the process 1100 may start when a scanning device, instructed to begin scanning of an object, captures a first image frame. For example, in embodiments where the scanning device comprises a scanner-mouse peripheral coupled to a computing device (e.g., scanner-mouse 104), the scanner-mouse may receive a signal to switch to a scan mode. The signal may be received via any suitable input element associated with the scanner-mouse (e.g., a button such as button 105). Alternatively, the signal may be received via the computing device (e.g., via a control on a user interface). Moreover, in embodiments where the scanning device comprises other device such as a cell phone or a PDA, the signal to initiate scanning may be provided via any other suitable means. When the scanning is initiated, a first image frame in the stream may be captured and an initial estimate of its pose may be estimated based on a position of the scanning device.

Regardless of how process 1200 is initiated, the process may be performed during scanning of an object using the scanning device. Thus, process 1200 comprises processing steps that may be applied as each new frame is being captured as part of the stream of image frames.

At block 1202, a new current image frame in the stream may be positioned by estimating its relative pose based on navigation information obtained from sensors tracking position and orientation of the scanning device as the device is moved over the object being scanned. The sensor may comprise, for example, navigation sensors (e.g., navigation sensors 202 and 204). In embodiments where one navigation sensor is employed (e.g., navigation sensor 205 shown in FIG. 2B), processing at block 1202 involves estimating a rotation of the current image frame, which is described below in connection with FIG. 19.

For each image frame after the first, the current image frame may be regarding as succeeding another image frame in the series and its relative pose may be determined relative to this preceding image frame. The navigation information indicating motion of the scanning device between the time the preceding image frame is captured and a time when a succeeding image frame is captured is used to determine an initial estimate of a relative pose of the succeeding image frame relative to the preceding frame.

At block 1204, the current image frame may be matched to a preceding image frame to provide an adjusted relative pose that is more accurate than the initial estimate of the relative pose. The matching of the frames may be performed based on one or more features in the image frames. The relative pose of the succeeding image frame may be determined by matching at least a portion of the succeeding image frame to a portion of the preceding image frame. The relative pose of the succeeding frame for such a match may be taken as the relative pose between the preceding and succeeding image frames.

Figure 18:
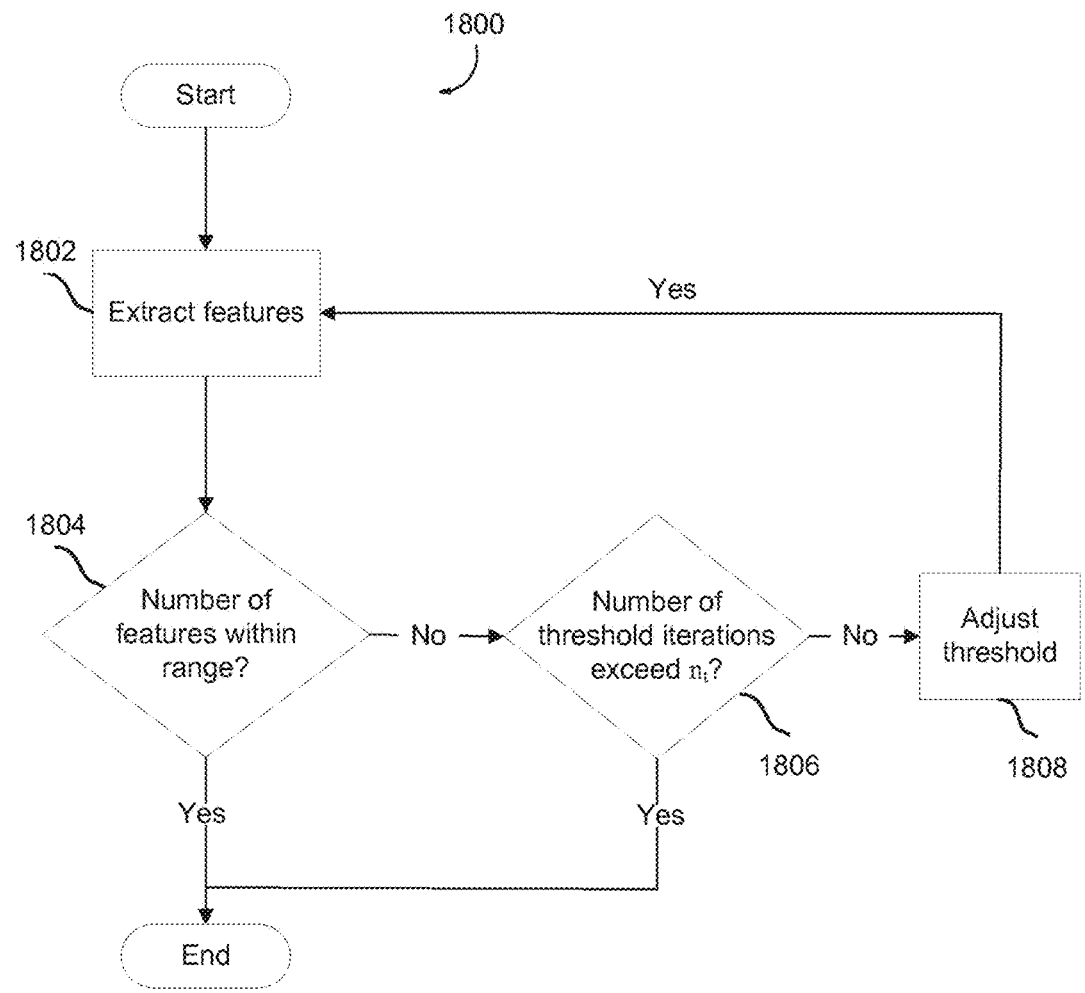
FIG. 18 is a flowchart of an adaptive feature selection, in accordance with some embodiments of the invention.

Matching portions of the image frames may be done by feature matching and selection a relative pose to minimize an error in the distance between corresponding features in the image frames. The features may be selected in any suitable way, but in some embodiments, features may be selected adaptively, as discussed in more detail below in connection with FIGS. 15 and 18. An area-based matching may be employed additionally or alternatively, and the selection of whether a feature based or area-based matching is used may be made dynamically based on the content of the image frames.

The image frames may be represented as a network capturing a relative pose of each image frame relative to each of one or more other image frames with which it overlaps. Accordingly, when the current image frame is captured and locally positioned with respect to a previously positioned image frame, a respective node representing the current image frame may be added to the network of image frames, as shown at block 1206. The network comprises nodes connected via edges, with a node representing an image frame and an edge between two nodes representing that respective image frames have been matched and a relative pose between the respective image frames has been determined. Though, in the embodiment described herein, local positioning comprises positioning relative to an immediately preceding image frame and only one edge is added during local positioning for each new image frame.

As the scanning progresses, the respective portions of the object being scanned, represented by the processed image frames, may be displayed to a user of the scanning device using any suitable display device, based on the coarse positioning of the image frames. Hence, as the succeeding image frame is captured, a composite image may be updated to present the portion of the object scanned thus far, which creates the appearance for the user that the user is "painting" the display by moving the scanning device across an object. Accordingly, at block 1208, the composite image may be updated and rendered to the user of the scanning device on the display device to display a further portion of the object corresponding to the current image frame. Because the user may thus observe the progress of the scanning, such visualization improves the user experience and allows for prompt user feedback.

At block 1210, it may be determined whether more images frames will be captured and locally aligned via process 1200. Such determination may be performed in any suitable manner. Though, in some embodiments, user input will be provided to end the scanning process, which will signal that no further image frames will be processed. The scan process may end, for example, if a user depresses or releases a control, such as button 105. In other embodiments, the scanning process may end if the user picks up the scanning device so that it is no longer in contact with the object being scanned. Such a motion may be detected by an accelerometer in the scanning device, a contact sensor or by detecting a change in light on a sensor on the surface of the scanning device adjacent the object being scanned.

During local positioning of image frames, as each successive image frame is matched with a preceding image frame and its relative pose with respect to one or more overlapping prior image frames (i.e., either an immediately preceding frame or other prior image frames) is determined, a positioning error in the relative positions of successively captured image frames may be accumulated. The error may be associated with inaccuracies in the image matching process and other elements of the scanning system (e.g., sensors collecting navigation information). Because of the positioning error, the composite image may comprise distortions.

Accordingly, in some embodiments of the invention, to create an improved final composite image, a finer alignment of a relative position of each locally positioned image frame may be performed. The finer alignment, which may also be referred to as a global positioning of image frames, may involve adjusting relative positions of the image frames to decrease the positioning error. Fine alignment may be considered to be performed independently of and in parallel with the coarse positioning of successive image frames such that displayed image quality may improve as the scan progresses.

FIG. 12B is a flowchart of overview of a process 1240 of global alignment of image frames in accordance with some embodiments of the invention. Process 1240 may start at any suitable time during scanning of an object using a scanning device, as a network of image frames is being built from locally positioned image frames. It should be appreciated that the global alignment of the image frames may be performed as each image frame is captured and locally aligned via the coarse positioning of image frames, as described in connection with FIG. 12A. Though, it should also be recognized that global alignment, performed in quality track 412 (FIG. 4) may run in a separate process from the coarse alignment process of FIG. 12A, which may be performed in fast track 410 (FIG. 4). Accordingly, there is no requirement that process 1240 be performed on image frames as the same rate as process 1200. Further, there is no requirement that process 1240 be performed for every image frame, though a better quality image result if process 1240 is performed for each frame as it is added to the network.

Accordingly, in FIG. 12B, process 1240 starts at block 1242 where an image frame is selected from the network. The selected image frame may be the latest image frame captured as a part of a stream of image frames and locally positioned within the network of image frames.

At block 1244, neighboring image frames of the selected image frame may be identified in the network. Neighboring image frames may be identified as those overlapping with the selected image, other than an immediately preceding image frame. As described above, the network contains edges, defining relative poses between image frames, which may be combined into a pose for each image frame with respect to an origin. This pose information may be used to identify image frames representing overlapping portions of the object being scanned, allowing neighboring image frames to be identified. The identified image frames will, in most instances, only partially overlap the selected image frame. Though, in some embodiments, the neighboring image frames identified at block 1244 will overlap with the selected image frame by at least some threshold amount that will permit a reliable determination of relative pose between the image frame selected at block 1242 and the neighbors identified at block 1244. This overlap, for example, may be at least 30% overlap in some embodiments, though any suitable threshold may be used. If not neighbors are identified, the process 1240 may loop back to block 1242 until another image frame is available for which there are neighboring images.

Next, the identified neighboring images may be matched with the selected image, as shown in block 1246. As a result of the matching, relative poses of the selected image frame with respect to the neighboring image frames may be computed. Thus, new edges may be added to the network to represent the computed relative poses.

In some embodiments, the selected image may be matched with each neighboring image frame pair-wise. Though, in other embodiments, a match may entail concurrently finding relative positions of the selected image frame and all neighbors. Such a match may be performed using any suitable matching technique, including feature matching or area matching techniques as described above for pair-wise matching of image frames. However, rather than determining the relative position of two image frames that meets some criteria, matching more than two image frames may entail determining relative positions of all the image frames being matched that meets some criteria. As an example, the relative positions of the selected image frame and its neighbors may be determined by solving a linear algebraic equation that minimizes a measure of squared error between corresponding features in the image frames. Such a solution has more degrees of freedom than a solution used to determine relative poses pair-wise, because the relative pose of each additional image frame introduces more degrees of freedom. However, the same computational techniques, including solutions involving iterative attempts to find the best match, may be employed.

Such matching may be performed using any suitable techniques, including those described throughout this application. For example, processes described in connection with FIGS. 14 and 15 may be utilized. Regardless of how the matching is performed, once matching portions are identified, the relative poses that yield those matches may be identified as the relative poses of the selected image with respect to the neighboring images.

Regardless of how the relative poses are determined, process 1240 may continue to block 1248, where the relative poses calculated at block 1246 may be inserted in the network. At this point, no new nodes are being added to the network and the process at block 1248 involves inserting edges to the network, with the added edges representing relative poses of the selected image frame with respect to neighboring image frames previously in the network.

FIGS. 16A and 16B are conceptual illustrations of the processing performed at 1244, 1246 and 1248. In FIG. 16A, a new image frame, represented by node 1610 has been captured and added to the network based on an initial pose with respect to a preceding image frame determined by matching the new image frame with the preceding image frame, represented by node 1608. Construction of the network as shown in FIG. 16A may occur as part of the fast track processing represented in process 1200.

The network may then be adjusted as in process 1240. In this example, node 1610 may represent the selected image frame and relative pose for that image frame may be computed by matching the new image frame to preceding neighbor image frames, other than the immediately preceding image frame, with which the selected image frame overlaps. In this example, image frames represented by a group of nodes containing nodes 1602, 1604 and 1606 may be taken as the neighboring image frames.

The computed relative poses for the selected image frame and its neighbors may be added to the network in a form of edges. Thus, FIG. 16A illustrates edges (shown in dashed line) representing the relative poses between node 1610 and neighbors 1602, 1604 and 1606, respectively.

Depending on the technique for matching a selected image frame with its neighbors, node 1608, representing the immediately preceding image frame in the sequence, may be included in the group of nodes representing neighbors. If node 1608 is regarded as representing a neighbor, an existing edge between nodes 1608 and 1610 may be replaced with an edge computed during matching of a selected image frame to its neighbors. As a specific example, in embodiments in which matching a selected image frame to its neighbors involves concurrently matching multiple image frames, recomputing a relative pose between a selected image frame and an immediately preceding frame may produce more consistent relative pose information.

Similar processing may continue for each new image frame that overlaps with more than one preceding image frame, as shown in FIG. 16B.

The relative poses calculated by matching selected image frames to groups of neighboring image frames may create inconsistencies in the network because the added edges create multiple paths through the network to a node. The inconsistency results because a different pose may be computed for an image frame by accumulating the relative poses along the different paths to the node. Processing in quality track 412 (FIG. 4) may entail reducing this inconsistency.

Figure 17A:
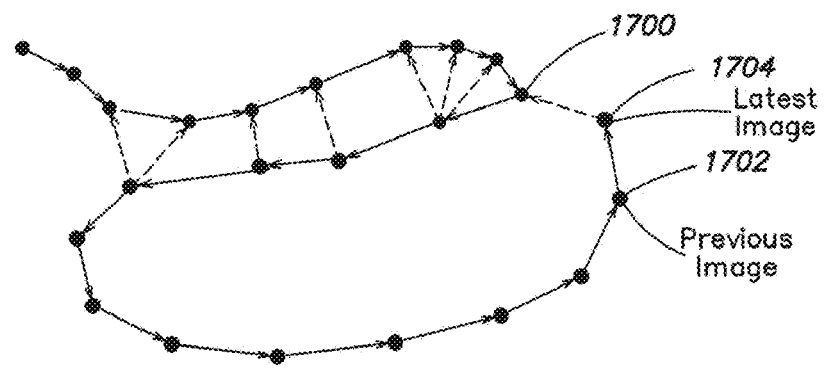
FIGS. 17A, 17B and 17C are schematic diagrams illustrating a global alignment of relative positions of image frames in the network of image frames, in accordance with some embodiments of the invention.
Figure 17B:
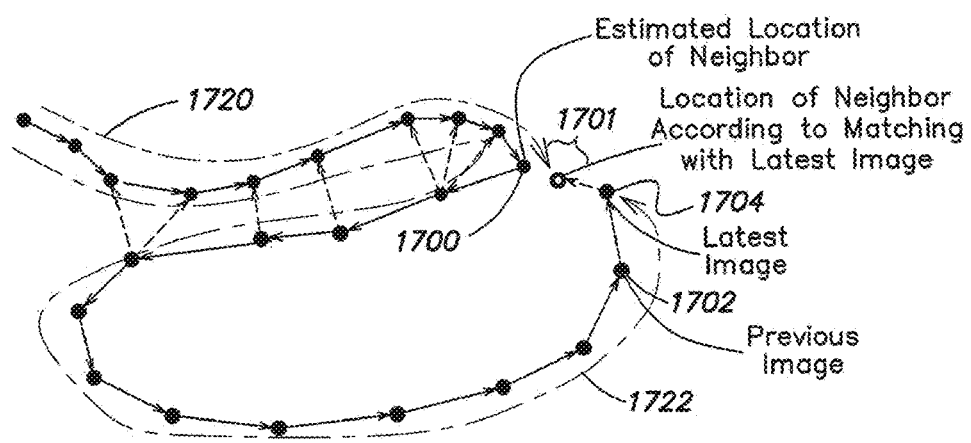
Figure 17C:
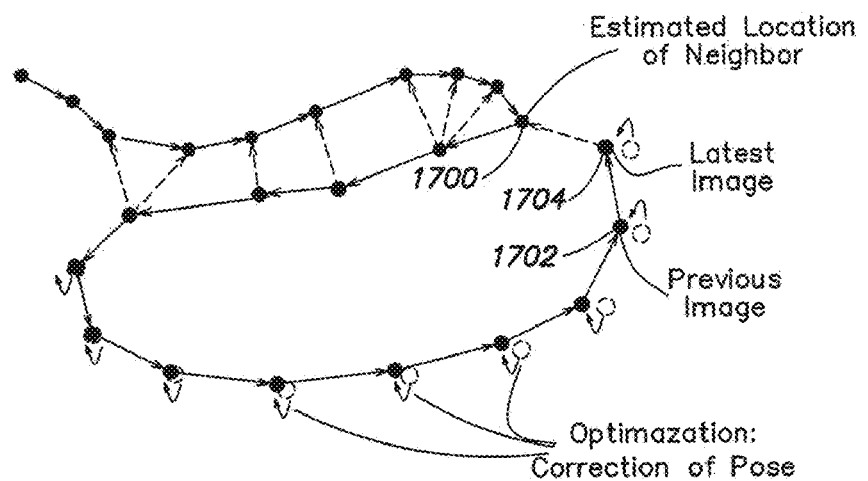

The inconsistency in the network is illustrated, for example, in connection with FIGS. 17A-17C. FIGS. 17A-17C illustrate that the network built as shown in connection with FIGS. 16A-16B has been expanded as a user moves a scanning device back and forth across an object. In a sense, a sequence of image frames is closed into a "loop," which is shown by way of example only as any suitable configuration sequence of image frames may be substituted.

FIG. 17A illustrates the network comprising multiple nodes, though only three of which, 1700, 1702 and 1704, are labeled for clarity. Node 1704 represents the selected image frame, node 1702 represents a previous image, and node 1700 represents a previously positioned image frame. In this stream of image frames, the image frame associated with node 1704 overlaps with image frame associated with node 1700, and is identified as a neighboring image frame.

Because of inaccuracies in the image matching process and other elements of the system, the network of relative positions will assign inconsistent positions to each of the image frames, depending on the path through the network. FIG. 17B shows a path 1722 through the network representing the edges in the order in which nodes were added to the network. The edges along path 1722 may be the edges added to the network as part of fast track processing 410. Path 1720 represents a path that includes an edge between nodes 1700 and 1704 added as part of processing at block 1248. As depicted graphically in FIG. 17B, the computed pose at node 1704 may be different, depending on whether the computation is based on relative poses along path 1720 or path 1722.

This difference represents an inconsistency in the network. Further inconsistencies may exist if there are more than two paths two a node. Additionally, similar inconsistencies may exist for other nodes in the network. These inconsistencies may be combined into an overall metric on inconsistency, such as for example, the sum of all inconsistencies or the sum of the square of all the inconsistencies. Though, linear algebraic techniques are known for reducing the inconsistency in network, and any suitable technique, including known techniques for network processing may be employed.

Regardless of what technique is used, by adjusting the overall network to reduce the overall metric of inconsistency, a more accurate composite image may be formed. Fine positioning of the image frames may comprise adjusting previously determined positions of the image frames to reduce the inconsistency. In some embodiments, each intervening image frame may be repositioned in a way that reduces a metric of inconsistency over all of the intervening image frames, as illustrated schematically in FIG. 17C.

Returning to FIG. 12B, inconsistency in the network may be determined, at block 1250 by computing differences in poses for each of one or more nodes computed along different paths through the network to the node. These paths may be along edges initially added as part of fast track processing or as added or adjusted during quality track processing. These inconsistencies may be combined into a metric of inconsistency across the network as a whole. The metric may be computed as a sum of squares of individual inconsistencies or using known network processing techniques or in any other suitable way.

Regardless of how the metric of inconsistency is computed, at decision block 1252, it may be determined whether the inconsistency is equal to or above a threshold. For example, the threshold may depend on a desired quality and/or speed of acquisition of the composite image. As a specific example, it may be desired that the processing as described herein may result in an image that can be displayed with good quality at a resolution of 300 dpi, a commonly used quality for printers. Such a resolution may be translated into an acceptable inconsistency, such as 0.06 mm or less. Accordingly, a threshold may be set such that an adjustment may be performed if an inconsistency for any image frame is exceeds this amount. Though, a threshold meeting quality and speed criteria may be determined in any other suitable way, including empirically.

If at block 1252 it is determined that the inconsistency is equal to or above the threshold, the network may be improved by decreasing the inconsistency. Accordingly, if at block 1252, the metric of inconsistency is equal to or above a threshold, process 1240 may branch to block 1254 where the poses of the images in the network may be updated. In some embodiments, adjustment of relative poses of nodes of the paths through the network may be distributed so that the difference (e.g., a mean error) between the recomputed relative poses and the respective relative poses found in the network before the relative poses are recomputed is minimized across the nodes. The difference is thus used to adjust positions of intermediate image frames that fall between the neighbor image frame and the preceding image frame of the selected image in the succession of image frames. Though, any suitable technique may be used to reduce inconsistency, including solving using linear algebraic techniques a multivariate set of equations, with the equations representing expressions of variables representing poses associated with nodes along paths that yielded inconsistencies. Solution of such a set of equations may reflect values of the variables, i.e. poses of image frames, that reduces or minimizes inconsistency. Though, it should be appreciated that network processing techniques are known and can be used.

Once the network is updated at block 1254, the process may proceed to block 1256. At block 1256, a composite image being rendered may be updated. The entire composite image may be re-rendered based on the updated network.

Though, in some embodiments, only the portions of the network impacted by edges that were adjusted may be rendered. Such portions may be identified based on nodes joined by networks that were adjusted or downstream nodes that couple to those nodes, such that the pose of the downstream node is directly or indirectly computed relative to a node having a pose that is changed. The process may then end.

Referring back to decision block 1252, if it is determined that the inconsistency is less than the threshold, process 1240 may branch to decision block 1258, where it may be determined whether a stable subnet of image frames is identified among the image frames forming the composite image. The subnet may be referred to as stable when, for a subnet of sufficient size, the inconsistency is relatively small. A value which is considered "small" and a subnet of sufficient size may be determined in any suitable manner, including through empirical selection to yield adequate quality and speed of processing. In addition, known techniques for processing networks may be used to identify a stable subnet.

Subsequently, if it is determined, at block 1258, that the stable subset is present within the network, process 1240 may "freeze" such subnet, at block 1260. The "freezing" comprises identifying poses of image frames represented by the nodes of the stable subnet as final. These poses are not adjusted further as the scanning progresses and the composite image is updated. Thus, the image frames associated with the stable subnet may be treated as one larger image frame. Other image frames may be matched to this larger image frame, though, in quality track processing, the positions of the image frames within the subnet may not be adjusted and paths through that subnet may not be regarded in measuring inconsistency.

Process 1240 may then end. If it is determined, at block 1258, that the stable subset is not present within the network, process 1240 may likewise end. Though, it should be appreciated that process 1240 represents one iteration of a process that may be repeated iteratively as a nodes are added to a network. Accordingly, upon ending, process 1240 may be repeated, using a different selected image frame and the process may be repeated until the entire network is deemed to be stable or all captured images have been selected. Though, in some embodiments, process 1240 may be repeated until any suitable criteria is met.

Figure 13:
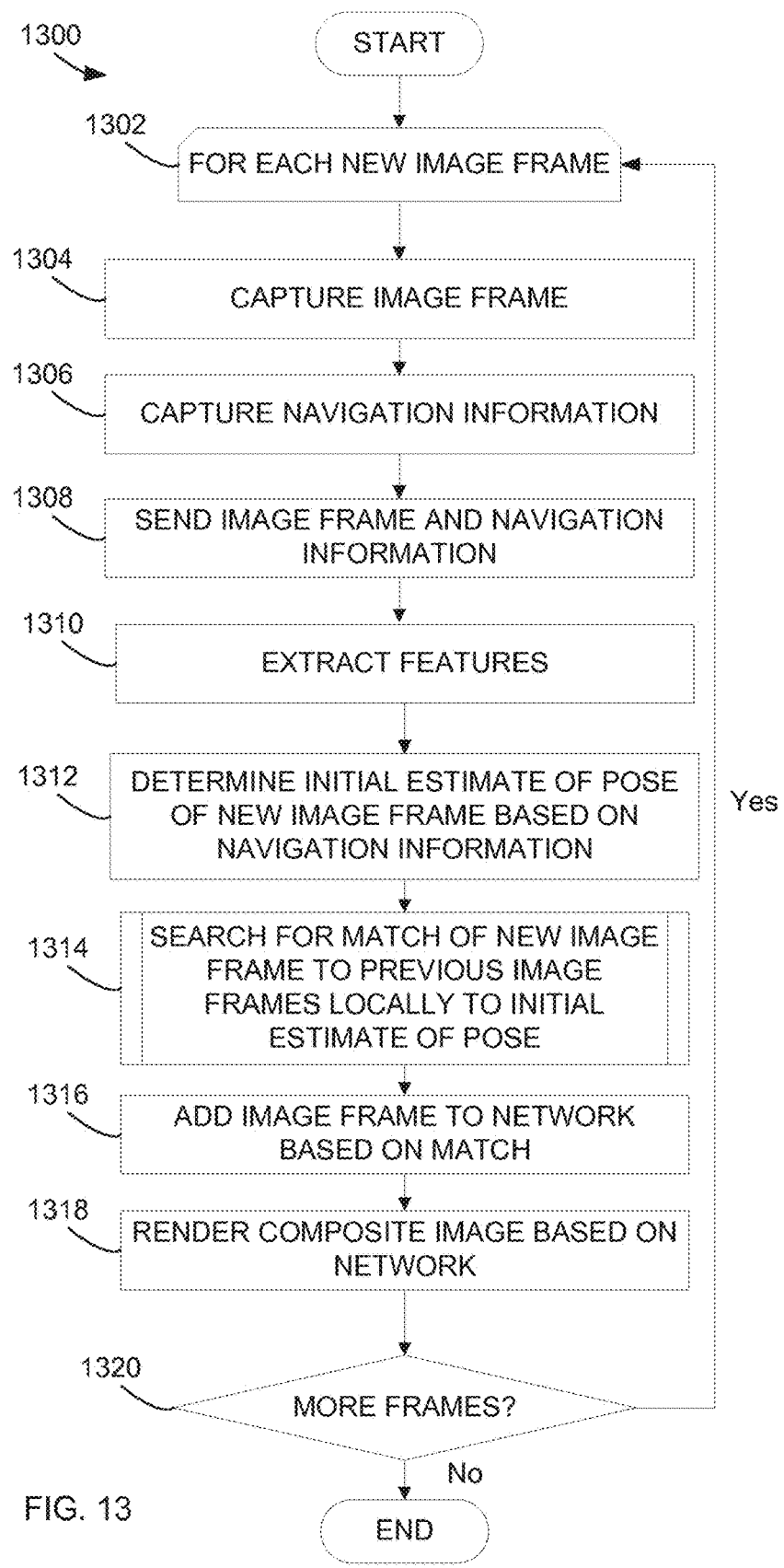
FIG. 13 is a flowchart of a local alignment of image frames, in accordance with some embodiments of the invention.

Various approaches for coarse alignment of image frames and fine adjustment may be used. FIG. 13 illustrates in more detail a process 1300 of such coarse alignment of image frames that may be performed by a component of a computing device, such as computing device 102.

Process 1300 may start at any suitable time. For example, process 1300 may be initiated when a scanning device such as a scanner-mouse described in accordance with some embodiments of the invention is employed to scan an object. As indicated in FIG. 13 by block 1302, process 1300 may be performed for each new image frame, as it is captured as part of a stream of image frames collectively used to obtain a composite image of the object being scanned.

As a first step of process 1300, a new current image frame, also referred to herein as a succeeding image frame, may be captured, at block 1304. The image frame may be captured via any suitable image sensor(s) such as an image array (e.g., image array 304 shown in FIG. 3). The first image frame may be regarded as establishing a frame of reference. For each image frame after the first, navigation information indicating motion of the scanning device between the time a preceding image frame is captured and a time when each succeeding image frame is captured may be captured, at block 1306. Though, it should be appreciated that capturing the image frame and the navigation information may be performed in any suitable order. In some embodiments, a frame rate and a rate at which the navigation information is acquired may be synchronized such that navigation information is provided with the image frame. Though, the specific technique used to associate navigation information with succeeding image frames is not a limitation on the invention.

Next, at block 1308, data comprising the image frame and the navigation information may be sent to a suitable location from which they may be accessed by comprising component (s) for collectively processing the data. In embodiments where the scanning device comprises a scanner-mouse coupled to a computing device, the data may be processed in the computing device, via one or more processors. In embodiments implemented using an exemplary inventive framework described in connection with FIG. 4, the data may be processed in the core of the framework (e.g., core 406 of framework 400). Nevertheless, in some embodiments, component(s) adapted to process the image frame and the navigation information, may be located within the scanning device. Alternatively or additionally, the processing of the image frame and the navigation information may be apportioned in any suitable manner along the scanning device and the computing device.

After the image frame and the navigation information are sent to the components adapted to process the data, as a first step, features that may be useful for aligning the current image frame with a preceding image frame may be extracted, at block 1310. The features may be extracted using any suitable feature extraction technique. Furthermore, the featured may be of any suitable type such as lines, corners, etc. An example of a feature extraction in accordance with some embodiments is shown in more detail below in connection with FIG. 18. Also, it should be appreciated that embodiments of the invention are not limited to matching of image frames based on features, because area-based matching may additionally or alternatively be used.

Next, at block 1312, an initial estimate of a pose of the new image frame may be determined based on the navigation information. The initial estimate of the pose is determined with respect to a pose of the preceding image frame, as shown, for example, in FIGS. 7A and 7B. The initial estimate may be then adjusted locally, by matching locally the current image frame with one or more of the previous overlapping image frames (e.g., image frames captured prior to the current image frame). Thus, at block 1314, process 1300 searches for a match of the current new image frame to a preceding image frame by attempting to find a relative pose of the current image frame that results in alignment of the current image frame with the preceding image frame based on a criteria defining a most appropriate match. An exemplary matching process is illustrated below in connection with FIG. 15.

The matching may utilize features extracted at block 1310. Though, adaptive feature selection may be performed, as shown in more detail in connection with FIGS. 15 and 18.

As a result of processing at block 1314, a relative pose of the current image frame that achieves match with the preceding image frames is determined. Thus, the initial estimate of the relative pose of the current image frame, based on navigation information, may be adjusted based on the local image frame matching.

After the current image frame is matched with the preceding image frame, the image frame may be added to the network based on the match, at block 1316. Hence, a respective node representing the image frame is added to the network. The node may be connected to the preceding node in the network via an edge representing the relative pose of the node with respect to the preceding node.

In embodiments of the invention, the coarse alignment of image frames by matching each incoming frame locally with a preceding image frame allows quickly stitching the image frames together. Thus, as an image frame is captured and positioned, the frame may be added to the composite image displayed on a suitable display device. The composite image may thus be rendered to the user on a user interface with a small delay so that the image appears to be painted as the scanning progresses. Thus, at block 1318, the composite image may be rendered on the display device, based on the network of the image frames. Because the user may thus observe the progress of the scanning, such visualization improves the user experience and allows for prompt user feedback.

At block 1320, process 300 may then determine whether more image frames may be captured. This may depend on whether the scanning of the object is still in progress. If this is the case, process 1300 may return to block 1302 to perform a processing of a new image frame as described above. Alternatively, if it is determined at block 1320 that no further image frames are captured, process may end. However, it should be appreciated that FIG. 13 illustrates only the coarse alignment of each new image frame and that the new image frame as all as other frames in the network may then be globally aligned for finer adjustment of the image frames within the composite image.

Process 1300 may end in any suitable manner. For example, in embodiments where the scanning device comprises a scanner-mouse, the device may be switched back to the mouse mode. Furthermore, the scanning device may be lifted above the surface being scanned. Also, the scanning of the object may be complete, meaning that no further improvements to the composite image are possible.

Figure 14:
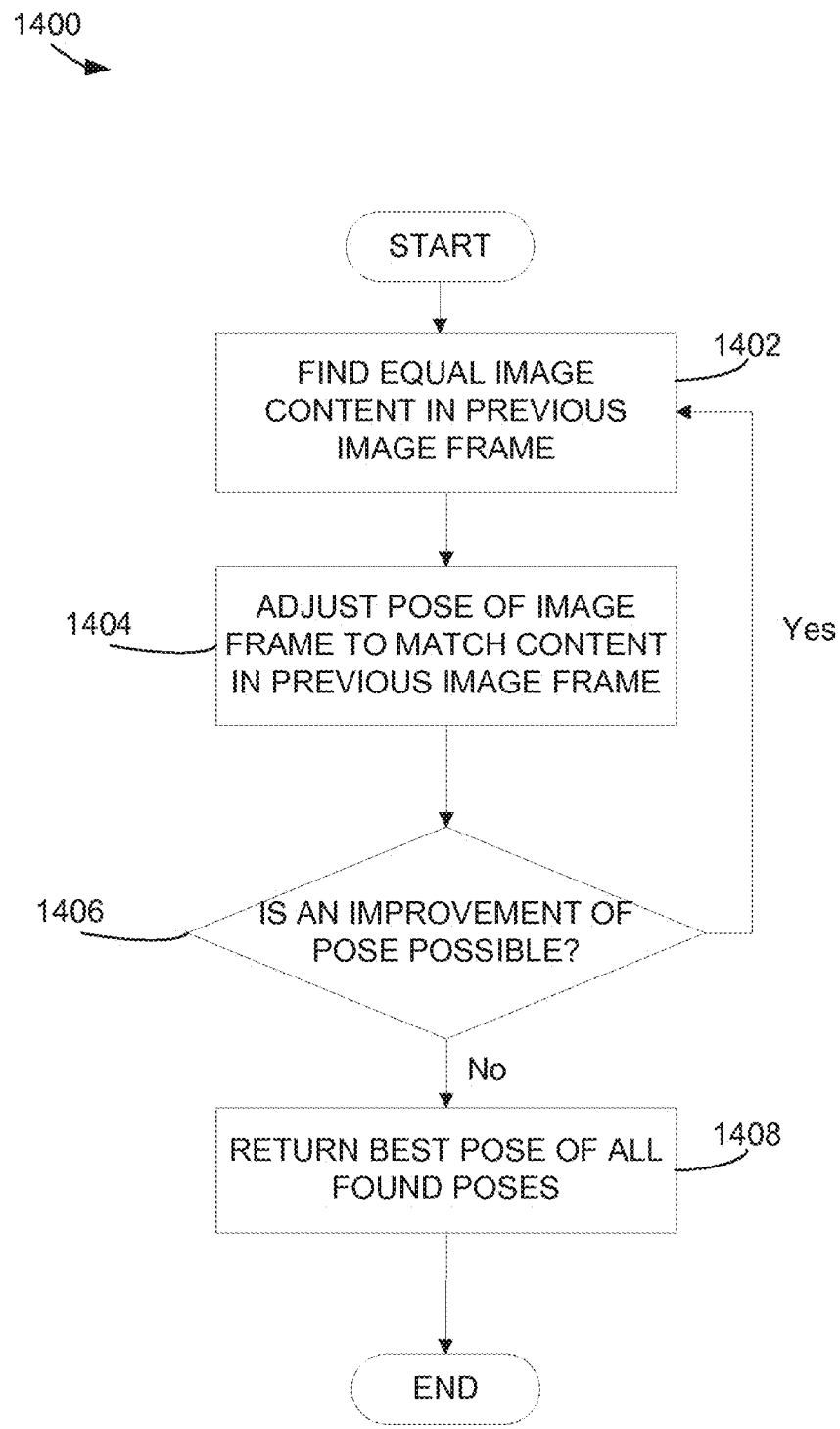
FIG. 14 is a flowchart of an overview of a process of matching an image frame with a preceding image frame, in accordance with some embodiments of the invention.

Further, an overview of a process 1400 that represents processing at block 1314 in FIG. 13 in accordance with some embodiments of the invention is provided with reference to FIG. 14. Process 1400 may start any at suitable time when an image frame is matched with a previous image frame. The previous frame may be, for example, an immediately preceding image frame in the stream of image frame, as used to position a succeeding image frame in the coarse alignment of image frames. Though, the process of FIG. 14 may be used for determining relative pose of any two image frames. Accordingly, the preceding image frame may be a neighbor preceding image frame, other than the immediately preceding image frame for some embodiments of the process of FIG. 14.

At block 1402, equal content may be found between the current image frame and the previous image frames, which may be performed using any suitable technique. The equal content may comprise any suitable features and/or portions of the image frames. In some embodiments, identification of equal content may be guided by navigation information, providing an initial estimate of alignment between image frames. At this step, a metric of the match between overlapping portions of image frames may be computed.

Process 1400 may then continue to block 1404, where the relative pose of the current image frame relative to the previous image frame may be adjusted. As part of this adjustment, a metric indicating the degree of match may be computed.

At decision block 1406 it may be determined whether a further improvement to the adjusted relative pose is possible. Such a condition may be detected, for example, if adjustment of the relative pose improved the metric of match between the image frames. Further improvement may also be possible if adjustment in the relative pose in all possible dimensions have not yet been tried. Conversely, it may be determined that no further improvement is possible if adjustments in all possible dimensions have been tried and none resulted in improvement.

If the improvement is possible, process 1400 may branch back to block 1402, where other portions of the image frames representing equal content (e.g., feature(s) and/or area(s)) may be identified for the matching. Thereafter, processing may proceed to block 1404 where further adjustments to the relative pose may be tried.

If it is determined at decision block 1406 that no further appreciable improvement is possible, the adjusted pose may be identified as the "best" pose of all of the determined poses. Any suitable criteria may be used for characterizing a pose as the "best." For example, in some embodiments, the "best" pose may comprise a pose to which only suitably small adjustments are possible which do not warrant for further processing. This pose may thus be returned as an output of process 1400, at block 1408.

FIG. 14 provides an overview of the image frame matching process is accordance with some embodiments of the invention. A more detailed example of the matching process according to some embodiments is shown in connection with FIG. 15.

Figure 15:
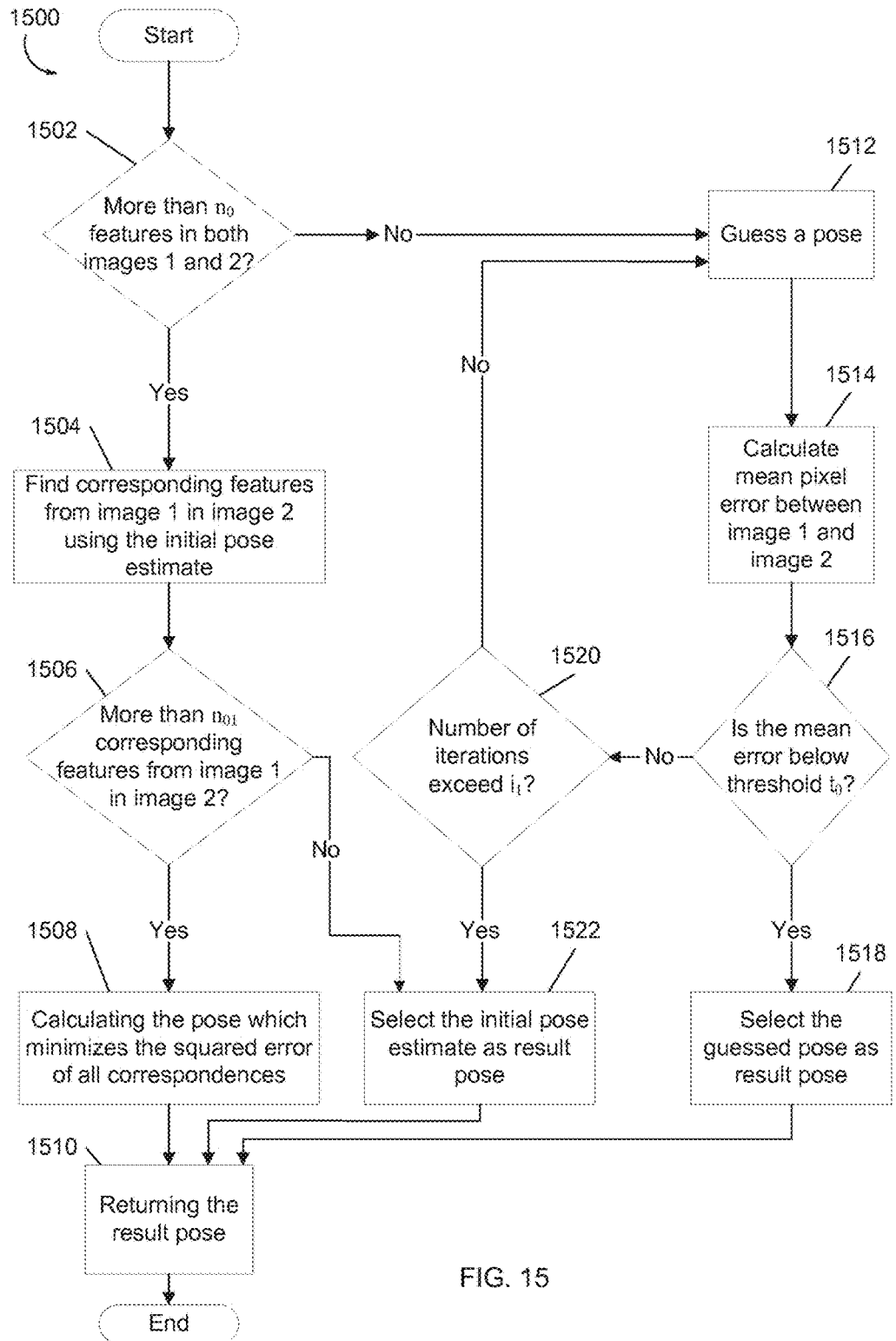
FIG. 15 is a flowchart of an example of the process of matching an image frame with a preceding image frame, in accordance with some embodiments of the invention.

In FIG. 15, a process 1500 of matching of overlapping image frames may start at any suitable time. In some embodiments, process 1500 may begin when features are extracted from the overlapping image frames being matched. The features may be any suitable features examples of which comprise corners, lines and any other elements. Each feature is associated with a location within the image. In this example, process 1500 of matching two image frames referred to as image 1 and image 2, respectively, is illustrated. Specifically, process 1500 is used to compute a pose of image 1 with respect to image 2.

Process 1500 begins after features have been extracted from the images to be matched. Such feature extraction may be performed as part of preprocessing of images or as part of fast track processing, before process 1500 is executed, or at any other suitable time. At block 1502, it may be determined whether there are more than a certain threshold number of features in both of images 1 and 2. In this example, the threshold number of features is denoted as no. The $n_0$ defines a minimum number of features that is sufficient to perform the alignment based on feature matching. Any suitable value may be used for $n_0$ and such a value may be determined in any suitable way, including empirically.

If it is determined, at block 1502, that the number of features exceeds the threshold no, process 1500 may branch to block 1504 where corresponding features from images 1 and 2 are identified. In particular, at block 1504, for each feature in image 1, a corresponding feature in image 2 may be identified. Each pair of such respective features found in both images 1 and 2 may be referred to as an association.

Next, at block 1506, it may be determined whether a number of identified associations are above a threshold, denoted as $n_1$ in this example. The threshold $n_1$ may denote a minimum number of associations that can be used to determine a relative pose between the two images. In one embodiment, $n_1$ may have a value of 2 meaning that at least two features equal between images 1 and 2 need to be identified. Though, embodiments of the invention are not limited in this respect and any suitable threshold may be substituted.

If it is determined at block 1506 that the number of associations exceeds the threshold $n_1$, process 1500 may branch to block 1508 where a pose of image 1 with respect to image 2 may be calculated using the identified associations.

In practice, a pose that exactly aligns all of the associations is not possible. For example, locations of features within the images may be determined with some imprecision because the image may have some distortions (e.g., due to optics distortion in an image array). Moreover, in some scenarios, the associations may be identified incorrectly (e.g., when image frames comprise features that are not straightforward to extract). Accordingly, because these errors, exact matching may not be possible. Rather, a suitably close approximation may be determined. In the example of FIG. 15, at block 1508 the pose that minimizes the quadratic error between the associations is calculated, as the approximation. It should be appreciated however that any suitable techniques may be applied.

Next, at block 1510, the calculated relative pose of image 1 with respect to image 2 may be returned to be used in any suitable processing. Thus, the pose may be used in local positioning of image frames. For example, a node representing image frame 1 and an edge representing the calculated pose may be added to a network of image frames, as described above. Process 1500 may then end.

As shown in FIG. 15, if it is determined, at block 1506 that the number of associations does not exceed the threshold $n_1$, which may indicate that a number of corresponding features sufficient for matching has not been identified, process 1500 may branch to block 1522, where the initial pose estimate for image 1 is selected as a pose to be returned. Accordingly, process 1500 continues to block 1510 to return the initial pose estimate, based on navigation information, as the output of the matching.

Referring back to block 1502, if it is determined, at this block, that the number of features extracted in both images to be matched does not exceed the threshold no, process 1500 may branch to block 1512 where a pose where an area based matching process may begin. Various relative poses are tested to determine whether a pose leading to a suitable match can be identified. The poses tried may be iteratively "guessed," via any suitable technique. The technique may involve guessing a pose within a space of possible poses and in some embodiments may incorporate some aspect of randomness.

Though, in some embodiments, guessing of poses may be based on a priori information, such as the navigation information and a search pattern in which the pose guessed at each iteration is guessed based on whether the pose guessed in a prior iteration increased or decreased a degree of match relative to a prior pose guessed.

As shown in FIG. 15, a process of guessing the pose is iterative. Accordingly, a suitable iterative technique may be applied to calculate a sequence of guessed poses to select the most suitable. Regardless, after the pose is guessed at block 1512, process 1500 may continue to block 1514 where an error, representing differences on a pixel-by-pixel basis between overlapping portions of images 1 and 2 may be calculated, based on the guessed pose of image 1. The error may provide a measure of how well the two images match if they are aligned when the guessed pose is used. For example, a mean quadratic error between corresponding pixels in images 1 and 2 may be calculated.

The result of the error calculation may be then processed at block 1516, where the error may be compared to a threshold to determine whether this error is acceptable to consider a match between the two images as a correct match. In the example illustrated, at block 1516, the error is evaluated by determining whether it is below threshold to. The threshold may be set in any suitable way and to any suitable value.

Consequently, if it is determined, at block 1516, that the error is below the threshold to, the guessed pose may be selected to be returned as the output of process 1500, at block 1518. The selected guessed pose may then be returned, at block 1510, upon which process 1500 may end.

Conversely, if it is determined at block 1526 that the error is not below a threshold, the process may reach block 1520. If the number of iterations has not exceeded a limit, expressed as i1, the process may loop back to block 1512, where another pose is guessed. Processing may proceed iteratively in this fashion until a suitable match is found at block 1516 or the number of iterations, i1 is exceeded. If the number of iterations is exceeded, the process proceeds to block 1522, where the initial pose, based on navigation information may be returned.

The process of stitching of image frames according to some embodiments of the invention comprises first coarsely positioning the image frames to present a composite image to a user with a small delay, which may be described as a "real-time" display. The coarse positioning of the image frames comprises positioning the image frames based on the local matching, which may position the frames with some inconsistencies. To reduce the inconsistencies, the image stitching involves a process of finer positioning of the coarsely positioned image frames.

Advantageously, the matching of image frames as described in connection with FIG. 15 is performed so as to allow presenting the composite image to the user quickly enough to appear to be in real time to the user, meaning that the delay between moving the scanning device over a portion of an object and the system presenting an image of that portion is so small that the user perceives motion of the scanning device to be controlling the display. Multiple criteria may be used to end the process of matching 1500 and to thus provide as a result of the matching a calculated result pose of a current image frame, denoted as image 1 in this example. These criteria may be reflected in the parameters n0, n1, t0 and i1, which result in an alignment being computed based on feature matching, if sufficient features can be determined to align. Area matching may be used if in adequate features are not identified. Regardless of which approach is used, if the result is not adequate or cannot be determined quickly enough, navigation information may be used as an initial pose—recognizing that adjustments may subsequently be made as part of global alignment.

Both coarse and fine alignment of image frames in accordance with some embodiments of the invention employ matching of image frames. To provide fast but accurate processing of image frames in accordance with some embodiments of the invention which allows the fast rendering and update of a composite image to the user as an object is being scanned, distinctive features may be selected for matching of the image frames with sufficient accuracy. The matching may be based on any suitable features. In some embodiments of the invention, adaptive feature matching may be employed, which is illustrated by way of example in FIG. 18.

The adaptive feature matching is premised on an assumption that suitable features in an image may be represented as those portions of an image having a characteristic that is above a threshold. For example, if a feature to be identified is a corner, intensity gradients in a subset of pixels may be computed. If the gradients in each of two directions exceed some threshold, the subset of pixels may be regarded as a corner. Lines may be identified by a gradient, in a subset of pixels exceeding a threshold. Though, it should be appreciated that any suitable characteristics can be used to identify any suitable type of feature.

Regardless of the feature and the characteristic, more pronounced features may allow for faster and more accurate matching of images. Accordingly, in some embodiments, features are selected adaptively based on image content to ensure that a sufficient number of features, yielding good matching characteristics, are identified.

In the example of FIG. 15, a threshold is denoted as t. The threshold may correspond to a value for a characteristic that may depend on the nature of the feature. As noted above, for corners, the characteristic may be based on gradients in multiple directions, but for other types of features, values of other characteristics may be measured and compared to the threshold.

Process 1800 may start at any suitable time when features are extracted for use in matching image frames, at block 1802. In the example illustrated, the threshold t may be used to define as is a value determining whether a group of pixels in an image frame constitutes a feature. Various feature extraction approaches are known in the art. In some embodiments, the features to be extracted are corners and a known technique to identify pixels representing a corner may be applied at block 1802. Though, such techniques will be applied such that only corners, having characteristic exceeding the threshold t, may be identified.

Next, at block 1804, it may be determined whether the number of extracted features, based on the current value of the threshold, is within a predetermined range defined by a lowest boundary and a highest boundary (e.g., between 150 and 200 features). The range may be determined in any suitable way and may be bounded by any suitable values. For example, it may depend on size of the image frames, expected degree of overlap between image frames or other characteristics of the system.

Regardless, of how the range is set, if it is determined at block 1804 that the number of extracted features is within the predetermined range, process 1800 may end. The extracted features may then be associated with the image frame and used for subsequent matching operations involving that image frame.

Alternatively, if it is determined at block 1804 that the number of extracted features is outside of the predetermined range, the process may be repeated iteratively using a different threshold. Accordingly, the process may branch to decision block 1806 where it may be determined whether the threshold has been changed more a certain number of times, denoted as $n_t$.

If it is determined that the threshold has been changed more than $n_t$ times, process 1800 may end. As noted in connection with FIG. 15, image frames may be aligned based on feature-based matching if sufficient features exist. Though, if there are not sufficient features, another technique, such as area based matching may be used. Accordingly, the process of FIG. 18 may be performed for a limited number of iterations to avoid excessive time spent processing images that contain content not amendable to feature extraction.

Conversely, if it is determined that a number of times the threshold has been changed does not exceed $n_t$, the threshold may be adjusted. As an example, if the number of the extracted features is smaller than a lower boundary of the predetermined range defined for the number of features, the threshold t may be decreased. If the number of the extracted features is larger than the upper boundary of the predetermined range, the threshold t may be increased. Such an adjustment may ensure that a suitable number of distinctive features are identified and made available for fast and accurate alignment of image frames.

After the threshold t is adjusted, process 1800 may return to block 1802 where a further attempt is made to extract features based on the new threshold.

Having thus described several aspects of at least one embodiment of this invention, it is to be appreciated that various alterations, modifications, and improvements will readily occur to those skilled in the art.

For example, it is described above that a network is processed as a whole to reduce inconsistency. It should be appreciated that it is not necessary that the entire network be processed at one time. Portions of the network, representing subsets of the nodes and their associated edges, may be processed. The portions may be selected in any suitable way, such as by selecting only those nodes in paths to a newly added node.

As another example, an embodiment is described in which a node is added to a network based on a match between an image frame and an immediately preceding image frame as part of fast track processing. An embodiment is also described in which a match to neighboring nodes results in additional edges added to the network in a quality track processing. It should be appreciated that addition of edges may be performed in any suitable process. For example, fast track processing may entail addition of edges of neighboring nodes as well as for an immediately preceding node.

Also, an embodiment was described in which each image frame generated by a scanning device is captured and processed. In some scenarios, a user may move a scanning device so slowly that there is sufficient overlap between multiple image frames in a portion of a stream of image frames generated by the scanning device that the latest image frame may be aligned with the earliest image frame in that portion of the stream. In this case, the intervening frames in that portion of the stream need not be processed. In some embodiments, preprocessor 408 may detect such a scenario and delete the intervening frames from the stream provided to fast track processing 410.

Also, it was described that user interface tools 416 render a composite image from a network. Rendering may involve transferring all of the image frames reflected by nodes in the network into a display buffer in an order in which the image frames were captured. Such processing may result in most recent image frames overlaying older image frames. In some embodiments, older image frames that are completely overlaid by newer image frames may be omitted from the network or may be ignored during rendering of a composite image. Though, other alternatives are possible.

For example, when the network contains overlaying image frames containing pixels that represent the same portions of the object being scanned, these image frames may be averaged on a pixel-by-pixel basis as a way to reduce noise in the composite image display. Averaging may be achieved in any suitable way. For example, the pixel values may be numerically averaged before any pixel value is written to the display buffer or overlaying image frames may be given display characteristics that indicate to components of an operating system driving a display based on the content of the frame buffer that the newer image frames should be displayed in a semi-transparent fashion.

As an example of another possible variation, it was described that a pose for each node in a network, relative to a point of reference, was computed from relative poses between nodes. This computation may be performed at any suitable time. For example, a pose of each node may be computed and stored in memory in conjunction with the node when edges to the node are determined or updated. Though, the pose of each node may be recomputed from the network when the pose is used.

As yet another variation, in some embodiments, only one navigation sensor may be used to position an image frame, as shown in FIG. 2B. In such scenarios, rotation of the scanner-mouse between successive image frames may be estimated using measurements of movement of the scanner-mouse in the x and y directions measured by one navigation sensor (e.g., sensor 205 in FIG. 2B) in conjunction with a projection of rotation based on a measured rotation in a preceding interval.

FIG. 12A described above illustrates a process 1200 of coarse positioning of image frames that may be performed during scanning of an object using the scanning device. The coarse positioning is performed as part of a process of stitching of image frames to generate a final composite image of an object being scanned.

Figure 19:
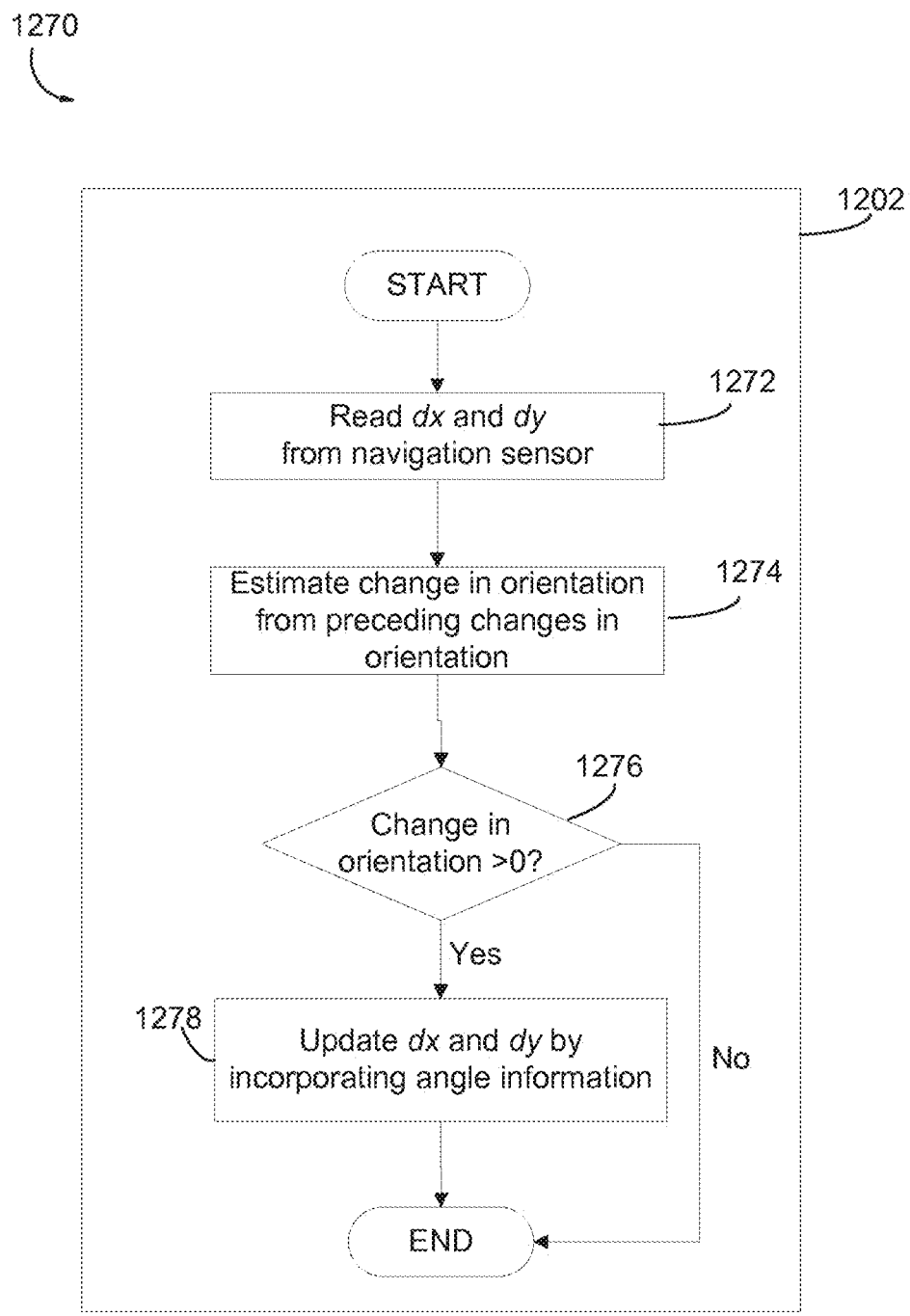
FIG. 19 is a flowchart of a process of estimating a rotation of an image frame when one navigation sensor is used, in accordance with some embodiments of the invention.

At block 1202 of FIG. 12A, a new current image frame in the stream may be coarsely positioned by estimating its relative pose based on navigation information obtained from sensors tracking position and orientation of the scanning device as the device is moved over the object being scanned. In embodiments where one navigation sensor is used to track position of the scanner-mouse in only two dimensions, an orientation of the current image frame with respect to a preceding image frame cannot be measured directly, but may be estimated. FIG. 19 illustrates a process 1270 of estimating the position of the image frame in embodiments where one navigation sensor, measuring displacement in two dimensions is used. In some embodiments, process 1270 may be a part of processing performed at block 1202 in FIG. 12A, as show in FIG. 19.

At block 1272, dx and dy may be read from the navigation sensor, which may be a laser sensor. In this example, dx denotes a change in the position of the scanner-mouse in the x direction and dy denotes a change in the position of the scanner-mouse in the y direction from a time when the preceding image frame is captured and a time when the current image frame is captured.

Although the scanner-mouse might have rotated between the time when the preceding image frame is captured and the time when the current image frame is captured, such rotation is not measured because only one measurement of each of dx and dy is obtained from the single navigation sensor. It is not possible to resolve differences in the position of the sensor that are based on translation of the entire scanning device and those that are based on rotation. Accordingly, it may not be determined whether dx and dy reflect only a change in the position or both the change in the position and orientation of the scanner-mouse.

The values of dx and dy may represent a sum of all movements of the scanner-mouse from the time when the preceding image frame is captured and the time when the current image frame is captured. This sum of the movements may be taken as a result of a path along a segment (arc) of a circle followed by the scanner-mouse as it moves in the circle. The sum represents the movements of the scanner-mouse housing along the segment of the circle. Thus, while the rotation of the scanner-mouse is not directly measured (since only one navigation sensor is used), a length of the segment of the circle may be obtained using the dx and dy.

At block 1274, process 1270 estimates the change in orientation of the scanner-mouse between the time when the preceding image frame is captured and the time when the current image frame is captured. The change in orientation is estimated using incremental movements representing changes in orientation of all image frames preceding the current image frame. Each image frame preceding the current image frame is coarsely positioned based by being matched to a previously positioned neighbor image frame.

In some embodiments, a current change in orientation of the current image frame with respect to a preceding image frame, denoted as $d\phi_k$, may be estimated as equal to $d\phi_{k-1}$, which is a change in orientation of the preceding image frame with respect to an image frame that, in turn, precedes it.

In some embodiments, to improve accuracy of the orientation estimation, a weighted sum of N estimated rotations $d\phi_{k-i}$, where i={1 . . . N–1}, calculated for N preceding image frames may be used as an estimate of the current change in orientation $d\phi_k$. Furthermore, each of the $d\phi_{k-i}$ may be weighted by being multiplied by a weight value which defines a degree to which this change in orientation $d\phi_{k-i}$ contributed to the estimation of the current change in orientation $d\phi_k$.

The weight values may be defined so that changes in orientation determined for image frames that were captured farther in time from the time when the current image frame is captured may contribute to the estimation of the current change in orientation to a smaller degree (i.e., multiplied by smaller weight value) than the changes in orientation determined for image frames that were captured closer in time to the time when the current image frame is captured. In this way, a change in orientation determined for an image frame immediately preceding image frame would contribute to a largest degree than changes in orientation determined for all other image frames preceding the current image frame. Though, it should be appreciated that any suitable weight values may be used. The sum of weighs used to estimate the current change in orientation equals to one.

Figure 20:
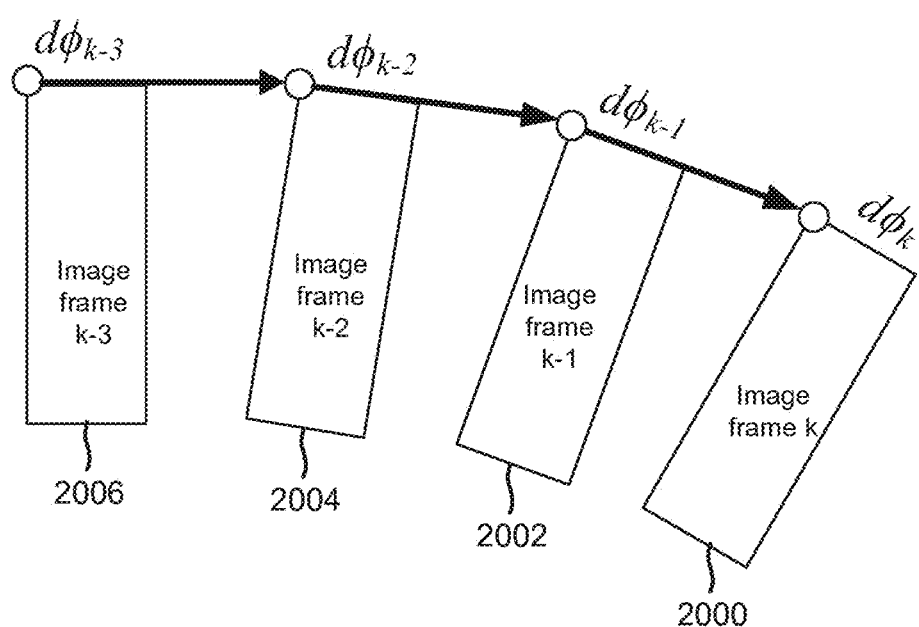
FIG. 20 is a schematic diagram illustrating positioning of image frames when one navigation sensor is used, in accordance with some embodiments of the invention.

FIG. 20 schematically illustrates a current image frame 2000 whose change in orientation with respect to an immediately preceding image frame is determined based on a weighted sum of respective changes in orientation determined for all preceding image frames 2002, 2004 and 2006. It should be appreciated that any suitable number of the preceding image frames may be used to estimate a change in orientation for the current image frame. In addition, in embodiments where a stable subset is identified and "frozen" so that poses of image frames represented by the nodes of the stable subnet are treated as one larger image frame, a change in orientation from the pose of this larger image may be used to estimate the change in orientation for the current image frame.

In this example illustrated in FIG. 20, the current image frame is denoted as an image frame k and preceding image frames are denoted as k–i, where i={1 . . . n}, with n being a number of preceding image frames. Each image frame k–i preceding the current image frame has been coarsely positioned be being matched to a previously positioned neighbor image frame. The change in orientation for the current image frame k may be defined as:

$$d\phi_k = \sum_{i<k}^{k<n} w_i \times d\phi_i, \quad (1)$$

where $$\sum_{i<k}^{k<n} w_i = 1. \quad (2)$$

Figure 21A:
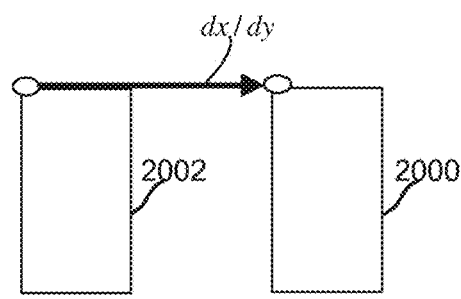
FIG. 21A-D are flowcharts of a process of adjusting a position of an image frame when one navigation sensor is used, in accordance with some embodiments of the invention.

In FIG. 19, after the change in orientation $d\phi_k$ for the current image frame k is estimated at block 1274, it may be determined, at decision block 1276, whether the dx and dy determined for the current image frame may be updated by determining whether the change in orientation $d\phi_k$ is estimated to be greater than zero. Accordingly, if it is determined, at block 1276, that the change in orientation $d\phi_k$ is estimated to be not greater than zero (i.e., zero), which indicates that no rotation of the scanner-mouse occurred between the time when the preceding image frame is captured and the time when the current image frame is captured, no updating of the dx and dy may be performed and process 1270 may end. In this case, a relative pose of the current image frame may be estimated as the dx, dy and zero rotation. FIG. 21A illustrates such example where dx and dy, denoted as dx/dy, for current image frame 2000 are estimated relative to the position of preceding image frame 2002.

If it is determined, at block 1276, that the change in orientation $d\phi_k$ is estimated to be greater than zero, which indicates that a rotation of the scanner-mouse occurred between the time when the preceding image frame was captured and the time when the current image frame was captured, process 1270 may continue to block 1278 where the dx and dy determined for the current image frame may be updated.

Figure 21B:
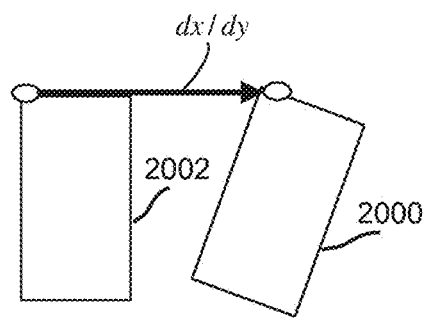
Figure 21C:
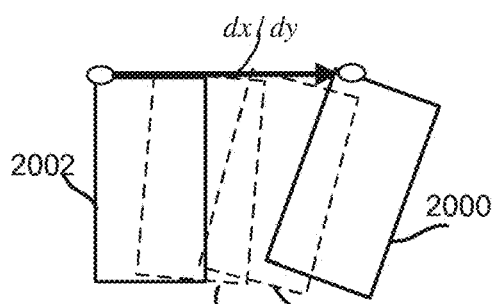
Figure 21D:
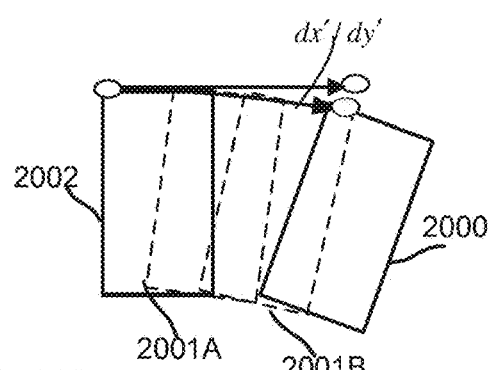

When the change in orientation $d\phi_k$ is estimated to be greater than zero, the dx and dy may be updated because a path from the preceding image to the current image followed by the scanner-mouser terminates at a position different from the one estimated using the dx and dy. FIGS. 21B, 21C and 21D illustrate such example.

As shown in FIG. 21B, because $d\phi_k$ is estimated to be greater than zero, current image frame 2000 may be oriented at an angle with respect to preceding image frame 2002. Accordingly, the dx and dy, denoted as dx/dy, for current image frame 2000 may be updated based on the estimated change in orientation $d\phi_k$ and using the assumption that the scanner-mouser moves in a circle between the time when the preceding image frame is captured and the time when the current image frame is captured.

The scanner-mouse may be assumed to move along a segment of a circle between the time when preceding image frame 2002 is captured and the time when current image frame 2000 is captured. Accordingly, the change in orientation $d\phi_k$ may be assumed to result from a number of smaller movements so that the change may be represented as being proportionally distributed equally over the whole movement of the scanner-mouse between the time when preceding image frame 2002 is captured and the time when current image frame 2000 is captured. This representation of the change in orientation $d\phi_k$ is illustrated in FIG. 21C, where the scanner-mouse assumes two positions, shown as hypothetical image frames 2001A and 2001B, between the time when preceding image frame 2002 is captured and the time when the current image frame is captured.

FIG. 21C illustrates that the position of current image frame 2000 as determined by the dx and dy differs from where such position would be when the path along a segment of the circle is followed. Accordingly, when the scanner-mouse follows such path, the dx and dy estimated for current image frame 2000 may be updated to position current image frame 2000 in accordance with the path.

In the path, the total movement of the scanner-mouse may result from a sum of a number of small steps from the time when preceding image frame 2002 is captured and the time when current image frame 2000 is captured. At each step in the movement of the scanner-mouse, the scanner-mouse may be rotated, which is schematically shown in FIG. 21C as "image frames" 2001A and 2001B. Such incremental rotations together result in the change of orientation $d\phi_k$ of current image frame 2000 with respect to preceding image frame 2002. As a result, the path from preceding image frame 2002 to current image frame 2000 results in a curve represented by a segment on the circle. The length of the segment may be defined as dx/dy. Because the segment of the circle is curved, the segment terminates at a position which is different from the position estimated for current image frame 2000, as shown in FIG. 21A.

Figure 22:
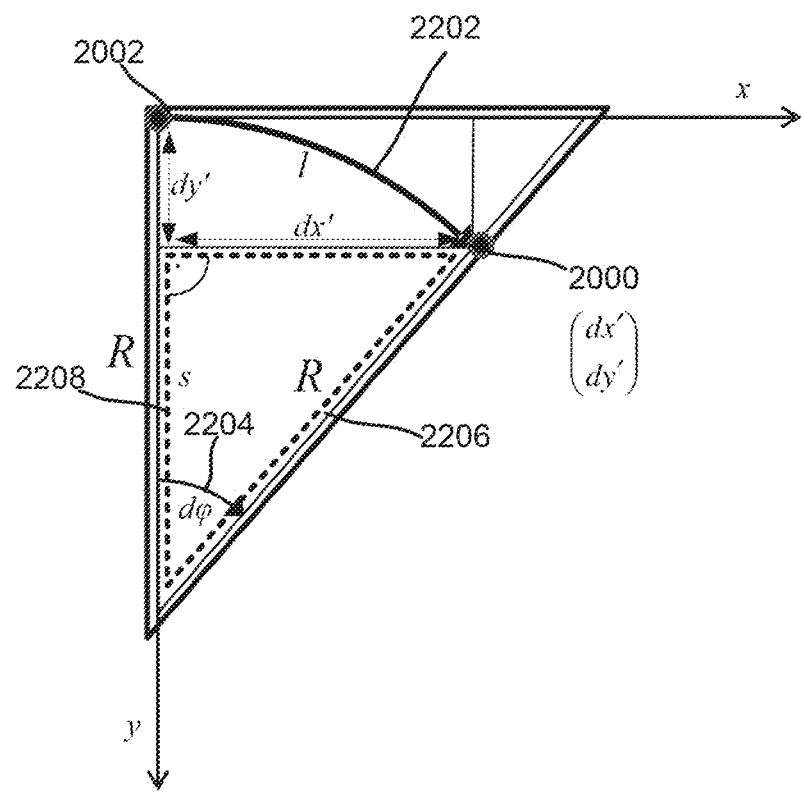
FIG. 22 is a schematic diagram illustrating mathematics of adjusting a position of an image frame when one navigation sensor is used, in accordance with some embodiments of the invention.

When the path traversed by the scanner-mouse between the time when the preceding image frame is captured and the time when the current image frame is captured is represented as a number of small steps along a segment of a circle, the dx and dy estimated for current image frame 2000 may be updated as described below in connection with FIG. 22. FIG. 22 illustrates the path along the segment 2202 of length l followed by the scanner-mouse between preceding image frame 2002 and current image frame 2000 whose respective positions are shown as points 2002 and 2000, respectively.

In FIG. 22, radii R of the circle connecting points 2002 and 2000 denoting the position of the preceding and current image frames, respectively, form an angle $d\phi$. The position of image frame 2000 with respect to image frame 2002 is defined as a change in the x and y directions.

The length l of the segment 2202 of the circle may be represented as:

$$l = \sqrt{(dx^2 + dy^2)}. \quad (3)$$

The radius R of the circle may be defined as the length of segment arc divided by an angle representing this segment, which is indicated by a numerical reference 2204 in FIG. 22:

$$R = \frac{l}{d\phi}. \quad (4)$$

Combining equations (3) and (4), the radius R may be defined as:

$$R = \frac{\sqrt{dx^2 + dy^2}}{d\phi}. \quad (5)$$

A triangle 2206 in FIG. 22 shown in dashed line is a right angle triangle; therefore, its side s along the y direction, indicated by a numerical reference 2208, may be calculated as follows:

$$s = \cos d\phi \cdot R. \quad (6)$$

If expression (5) is inserted into expression (6), the side s may be defined as follows:

$$s = \cos d\phi \cdot \frac{\sqrt{dx^2 + dy^2}}{d\phi}. \quad (7)$$

Because the triangle 2206 is right, another side of the triangle 2206, dx', that is opposite to the angle dϕ, may be expressed as:

$$dx' = \sin d\phi \cdot R. \quad (8)$$

If in the equation (8) the radius R is substituted to its definition in expression (5), the updated value of dx' may be defined as:

$$dx' = \sin d\phi \cdot \frac{\sqrt{dx^2 + dy^2}}{d\phi}. \quad (9)$$

As illustrated in FIG. 22, dy' is equal to the radius R minus the side s in the triangle 2206. Accordingly, dy' may be expressed as:

$$dy' = R - s. \quad (10)$$

When equations (5) and (7), defining R and s, respectively, are inserted into expression (10), dy' may be expressed as:

$$dy' = \frac{\sqrt{dx^2 + dy^2}}{d\phi} - \cos d\phi \cdot \frac{\sqrt{dx^2 + dy^2}}{d\phi}. \quad (11)$$

Accordingly, updated values for dx' and dy' may be calculated as described above. The pose of the current image frame 2000 is thus defined as the dx' and dy'. The positioned image frame 2000 may then be matched with the preceding image frame 2002, as described, for example, in connections with block 1204 in FIG. 12A. Subsequent processing of image frame 2000 may be further performed, as described in conjunction with FIG. 12A. Position of image frame 2000 may also be adjusted as part of the global alignment of image frames described in connection with FIG. 12B.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic device comprising a display screen, wherein the portable electronic device is smart phone or tablet computer configured to execute computational operations in a plurality of processing threads:
    obtain a plurality of image frames in conjunction with data indicating motion of the portable electronic device;
    iteratively process successive image frames after a first image frame of the plurality of image frames to determine an initial position of each image frame based at least in part on the data indicating motion of the portable electronic device, wherein:
    iteratively processing successive image frames to determine an updated position of each frame by, for each successive image frame:
        identifying a plurality of features in a portion of the successive image frame and corresponding features in a portion of a preceding image frame, the portion of the successive image frame and the portion of the preceding image frame being selected based on the determined initial positions of the preceding image frame and the successive image frame; and
        determining the updated position of the successive image frame based on a position relative to the preceding image frame, the position relative to the preceding image frame based on differences in position in pose of the successive image frame and the preceding image frame when the plurality of features and the corresponding features are matched; and
    selecting a subset of the successive image frames and computing an adjusted position of each of the image frames in the subset, wherein the subset comprises a plurality of the successive image frames, wherein computing the adjusted position is performed in a separate processing thread of the plurality of processing threads than the determining the updated positions.

2. The portable electronic device of claim 1, wherein:
    the data indicating motion of the portable electronic device comprises data, for each successive image frame after the first image frame, indicating motion of the portable electronic device between a time when the successive image frame was captured and a time when the preceding image frame was captured;
    the data indicating motion of the portable electronic device between the time when the successive image frame was captured and the time when the preceding image frame was captured defines a zone of uncertainty; and
    identifying corresponding features in the portion of the preceding image frame preceding the successive image frame comprises searching for each corresponding feature at a location in the preceding image that is within the zone of uncertainty around a position predicted based on the data indicating motion of the portable electronic device between the time when the successive image frame was captured and the time when the preceding image frame was captured.

3. The portable electronic device of claim 1, wherein a match between the plurality of features and the corresponding features is determined by solving an equation that minimizes an error in aligning the plurality of features in the portion of the successive image frame and the corresponding features in the portion of the preceding image frame.

4. The portable electronic device of claim 1, wherein the plurality of image frames is of an object, and the portable electronic device is further configured to display a composite image of the plurality of image frames representing the object on the display screen.

5. The portable electronic device of claim 1, wherein the portable electronic device further comprises at least one inertial navigational sensor configured to obtain navigational information of the portable electronic device.

6. The portable electronic device of claim 5, wherein determining the initial position of the successive image frame further comprises estimating a pose of the successive image frame based on a change in the navigational information between a time when the preceding image frame is captured and a time when the successive image frame is captured.

7. A portable electronic device comprising a processor configured to:
    obtain an initial image frame and successive image frames after the initial image frame in conjunction with data indicating navigational information of the portable electronic device,
    iteratively process the successive image frames to determine a pose of each successive image frame by, for each successive image frame:
        selecting a portion of the successive image frame based on navigational information that indicates motion of the portable electronic device between a time associated with the successive image frame and a time associated with a preceding image frame; and determining a pose of the successive image frame based on aligning features in a portion of the preceding image frame with features identified in the selected portion of the successive image frame; and concurrently with the iteratively processing, select a subset of the successive image frames and compute an adjusted position of each of the image frames in the subset, wherein the subset comprises a plurality of the successive image frames.

8. The portable electronic device of claim 7, wherein the initial image frame and the successive image frames is of an object, and the portable electronic device is further configured to display a composite image representing the object on the display screen.

9. The portable electronic device of claim 7, wherein the portable electronic device further comprises at least one inertial navigational sensor configured to obtain navigational information of the portable electronic device.

10. The portable electronic device of claim 9, wherein determining the pose of the successive image frame further comprises estimating an initial pose of the successive image frame based on a change in the navigational information between a time when the preceding image frame is captured and a time when the successive image frame is captured.

11. The portable electronic device of claim 7, wherein the portable electronic device is a smart phone.

12. The portable electronic device of claim 7, wherein the portable electronic device is a tablet computer.

13. At least one non-transitory, tangible computer readable medium having computer-executable instructions, that when executed by a processor, perform a method of forming a composite image by combining a plurality of image frames, the method comprising:

obtaining the plurality of image frames from a camera of a portable electronic device in conjunction with data indicating navigational information of the portable electronic device generated by at least one inertial navigation sensor of the portable electronic device;

iteratively processing successive image frames after a first image frame of the plurality of image frames to determine an initial pose of each image frame based at least in part on the data indicating navigational information of the portable electronic device, wherein the initial pose of each image frame includes location information having at least two dimensions and orientation of the portable electronic device, wherein:

iteratively processing successive image frames to determine an updated pose of each frame by, for each successive image frame:

identifying a plurality of features in a portion of the successive image frame and corresponding features in a portion of a preceding image frame, the portion of the successive image frame and the portion of the preceding image frame being selected based on the data indicating navigational information of the portable electronic device; and determining the updated pose of the successive image frame based on a location in at least two dimensions relative to the preceding image frame, the location relative to the preceding image frame based on differences in pose of the successive image frame and the preceding image frame when the plurality of features and the corresponding features are matched; and concurrently with the iteratively processing, selecting a subset of the successive image frames and computing an adjusted position of each of the image frames in the subset, wherein the subset comprises a plurality of the successive image frames.

14. The computer readable medium of claim 13, wherein determining the initial position of the successive image frame is further based on an orientation of the portable electronic device when the successive image frame is captured.

15. The computer readable medium of claim 13, wherein:

the data indicating motion of the portable electronic device comprises data, for each successive image frame after the first image frame, indicating motion of the portable electronic device between a time when the successive image frame was captured and a time when a preceding image frame was captured;

the data indicating motion of the portable electronic device between the time when the successive image frame was captured and the time when a preceding image frame was captured defines a zone of uncertainty; and identifying corresponding features in the portion of the preceding image frame preceding the successive image frame comprises searching for each corresponding feature at a location in the preceding image that is within the zone of uncertainty around a position predicted based on the data indicating motion of the portable electronic device between the time when the successive image frame was captured and the time when the preceding image frame was captured.

16. The computer readable medium of claim 13, wherein a match between the plurality of features and the corresponding features is determined by solving an equation that minimizes an error in aligning the plurality of features in the portion of the successive image frame and the corresponding features in the portion of the preceding image frame.

17. The portable electronic device of claim 13, wherein the plurality of image frames is of an object, and the method further comprises displaying a composite image of the plurality of image frames representing the object on a display screen of the portable electronic device.

18. The portable electronic device of claim 13, wherein determining the initial position of the successive image frame further comprises estimating a pose of the successive image frame based on a change in navigational information between a time when the preceding image frame is captured and a time when the successive image frame is captured.

* * * * *